United States Patent
Mutoh et al.

(10) Patent No.: US 6,631,210 B1
(45) Date of Patent: Oct. 7, 2003

(54) IMAGE-PROCESSING APPARATUS AND IMAGE-PROCESSING METHOD

(75) Inventors: Takeshi Mutoh, Nara (JP); Setsuya Kobayashi, Ikoma-gun (JP); Takayuki Amagai, Yamatokoriyama (JP); Seiji Kohashikawa, Yamatokoriyama (JP); Takahiro Daido, Hirakata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/414,736

(22) Filed: Oct. 8, 1999

(30) Foreign Application Priority Data

Oct. 8, 1998 (JP) ............................................ 10-287053

(51) Int. Cl.⁷ ................................................ G06K 9/34
(52) U.S. Cl. ........................... 382/176; 358/1.9; 358/2.1
(58) Field of Search ................................. 382/173, 176, 382/237, 252, 270, 275, 164, 205, 272; 358/1.9, 2.1, 2.99, 3.24–3.27, 530–534, 462

(56) References Cited

U.S. PATENT DOCUMENTS

| | | | | |
|---|---|---|---|---|
| 4,903,316 | A | * 2/1990 | Hongo et al. | 382/272 |
| 5,109,436 | A | * 4/1992 | Machida et al. | 382/270 |
| 5,293,430 | A | 3/1994 | Shiau et al. | 382/173 |
| 5,850,474 | A | * 12/1998 | Fan et al. | 382/173 |
| 6,266,156 | B1 | * 7/2001 | Tanimura et al. | 358/1.9 |
| 6,466,693 | B1 | * 10/2002 | Otsu et al. | 382/176 |
| 6,473,202 | B1 | * 10/2002 | Kanata et al. | 358/2.1 |

FOREIGN PATENT DOCUMENTS

| | | | | |
|---|---|---|---|---|
| EP | 0 521 662 A1 | 1/1993 | | H04N/1/40 |
| EP | 0 831 637 A2 | 3/1998 | | H04N/1/40 |
| JP | 6-54180 | 2/1994 | | H04N/1/40 |
| JP | 8-56287 | 2/1996 | | H04N/1/40 |
| JP | 9-163166 | 6/1997 | | H04N/1/40 |

OTHER PUBLICATIONS

"Bi–level Rendition of Images Containing Text, Screened Halftone and Continuous Tone", M. Yoshida, et al. Proceedings of the Global Telecommunications Conference. (GLOBECOM), US, New York, IEEE, vol. –, Dec. 2, 1991, pp. 104–109, XP000325957 ISBN: 0–87942–697–7.

A Segmentation Method for Composite Text/Graphics (Halftone and Continuous Tone Photographs) Documents, S. Ohuchi, et al. Systems and Computers in Japan,US, Scripta Technica Journals, New York, vol. 24, No. 2, 1993, pp. 35–44, XP000417662 ISSN: 0882–1666.

* cited by examiner

Primary Examiner—Leo Boudreau
Assistant Examiner—Ishrat Sherali
(74) Attorney, Agent, or Firm—David G. Conlin; William J. Daley, Jr.; Edwards & Angell, LLP

(57) ABSTRACT

An image-processing apparatus, as well as an image-processing method, is provided with a first inspection circuit which, with respect to density values of pixels within a specific area consisting of a target pixel and pixels in a vicinity thereof in image data for each color component, calculates an average density value, the sum of density differences, that is, the sum of absolute values of differences between the target pixel and the peripheral pixels, and the number the peripheral pixels having the same density value as the target pixel, so that a judgement is made as to whether the target pixel is a maximum value or a minimum value, and also calculates a run-length and the degree of busy from the pixel forming the maximum value or the minimum value. Moreover, based on the run-length and the degree of busy, the second inspection circuit extracts a pixel weight switching signal for each of the color components, and detects the periodicity of meshes of image data by counting pixels not less than the standard value or not more than the standard value based on the pixel weight switching signal within a predetermined counting area. With this arrangement, it becomes possible to carry out the discrimination between character areas and mesh areas as well as the discrimination between black character areas and white character ares with high precision.

16 Claims, 32 Drawing Sheets

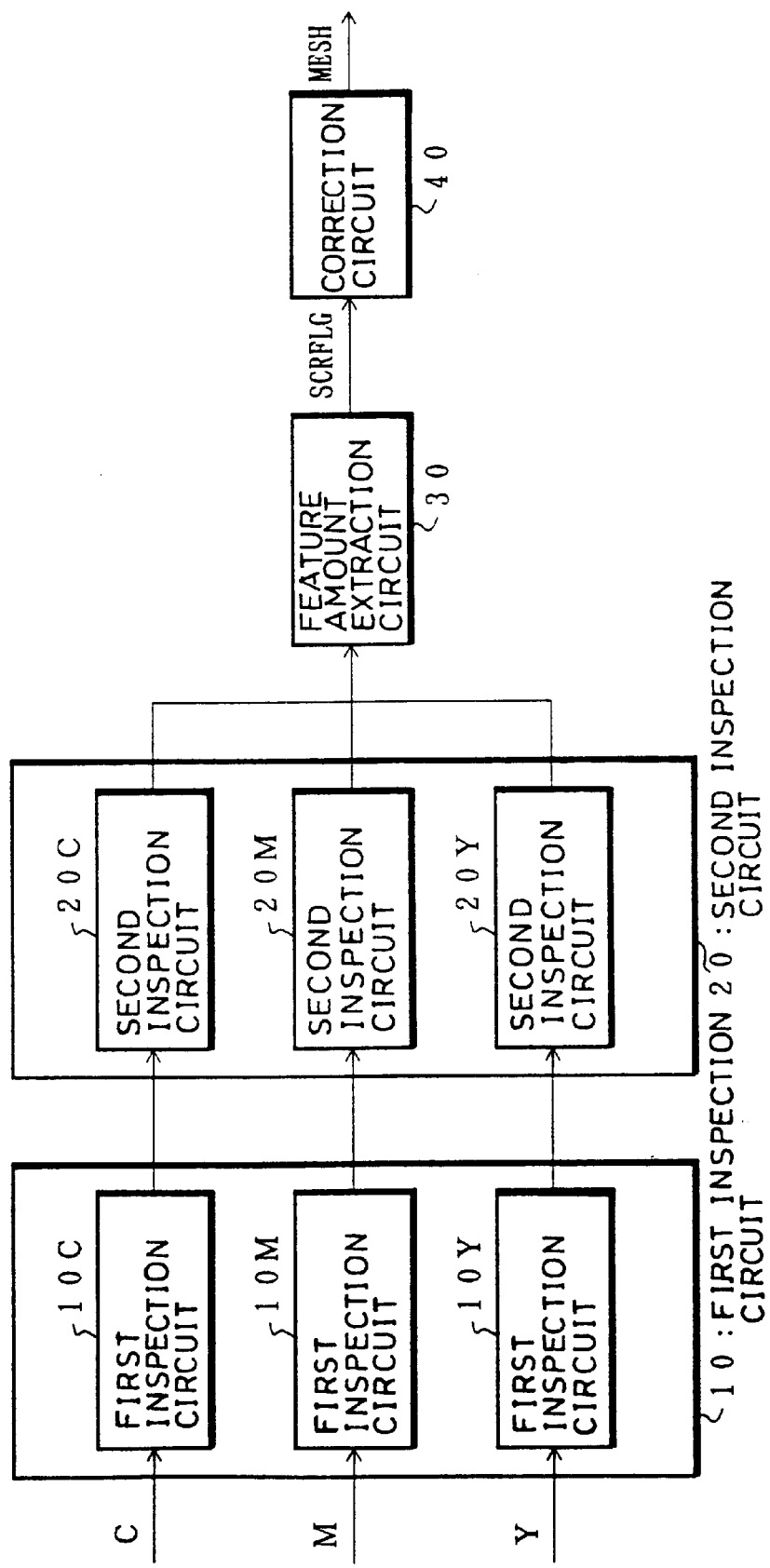

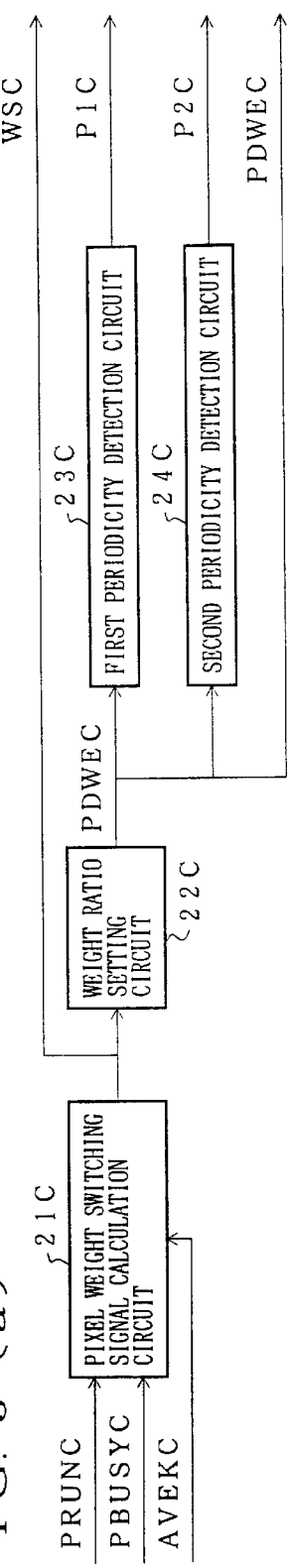
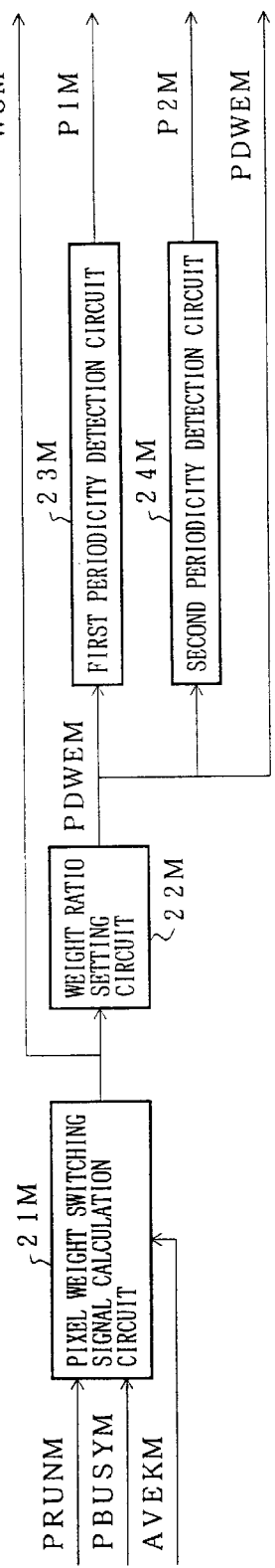
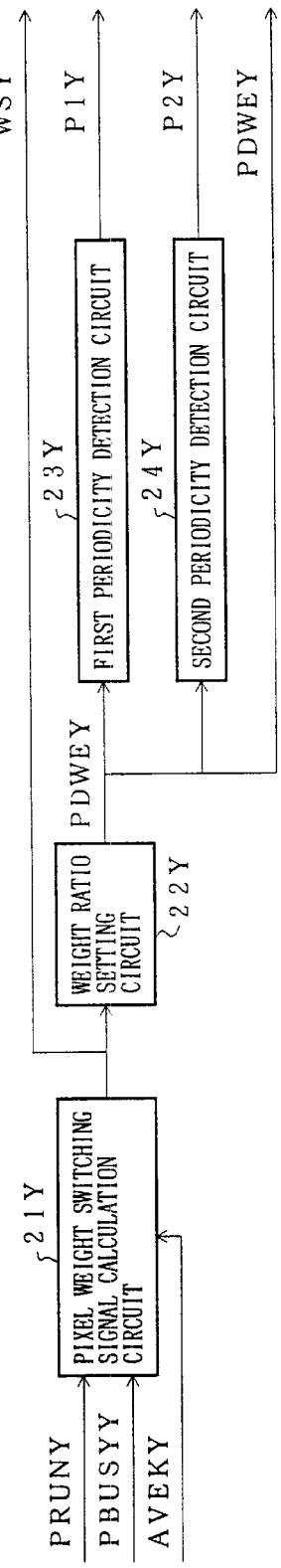
FIG. 3 (a)  FIG. 3 (b)  FIG. 3 (c)

30: FEATURE AMOUNT EXTRACTION CIRCUIT

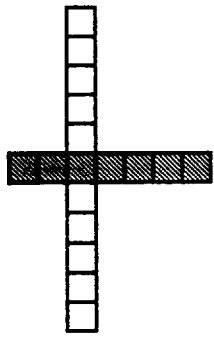
FIG.9(c)
TARGET PIXEL P
FIG.9(b)
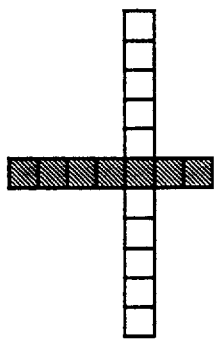
FIG.9(e)
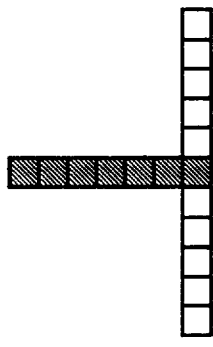
FIG.9(g)
FIG.9(a)
FIG.9(d)
FIG.9(f)

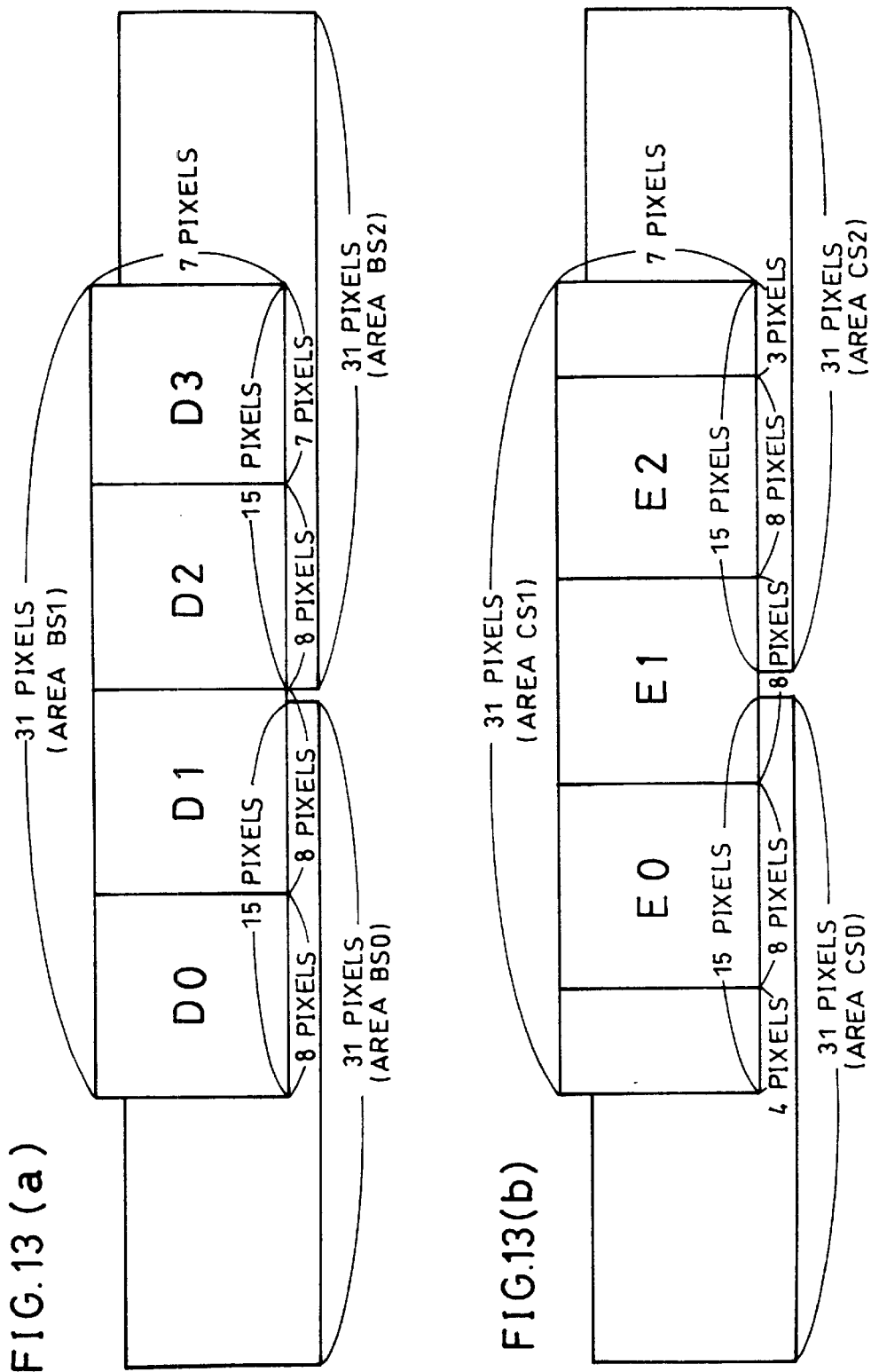

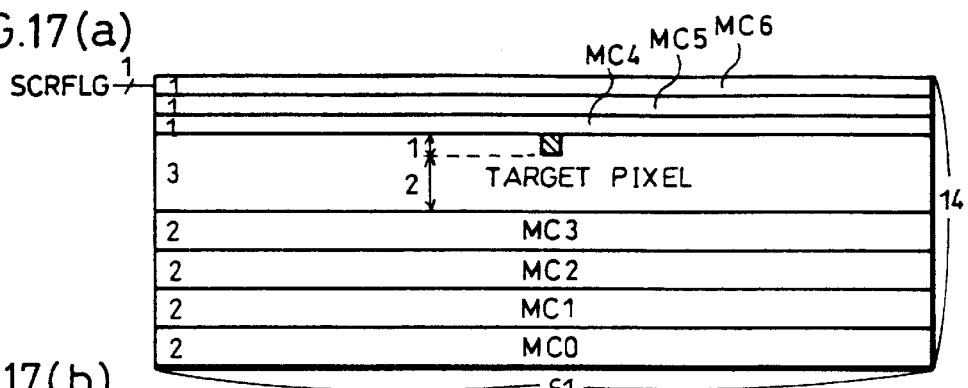
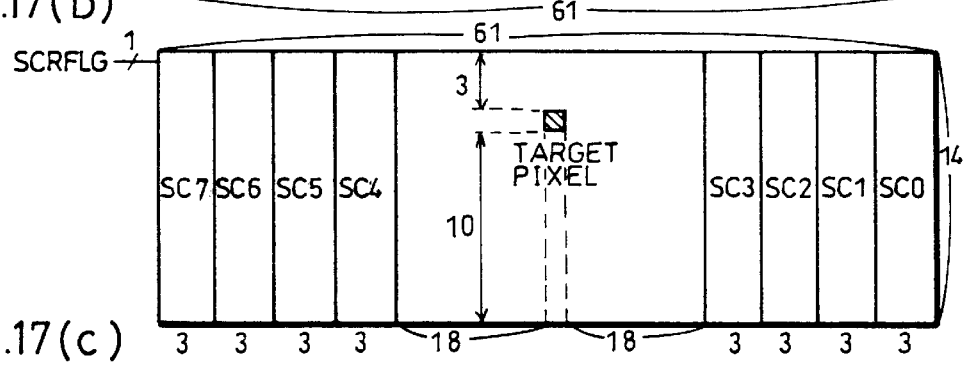
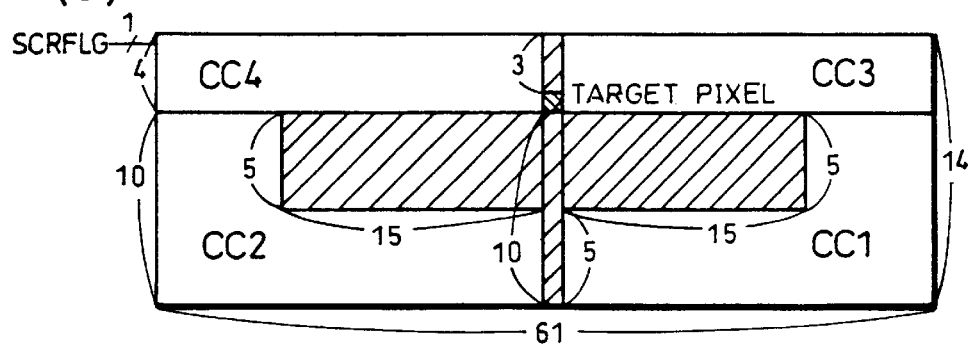

| W(m-1, n-1) | W(m, n-1) | W(m+1, n-1) |
|---|---|---|
| W(m-1, n) | W(m, n) | W(m+1, n) |
| W(m-1, n+1) | W(m, n+1) | W(m+1, n+1) |

|  |  | P(i-2, j) |  |  |
|---|---|---|---|---|
|  |  | P(i-1, j) |  |  |
| P(i, j-2) | P(i, j-1) | P(i, j) | P(i, j+1) | P(i, j+2) |
|  |  | P(i+1, j) |  |  |
|  |  | P(i+2, j) |  |  |

↙ ACONV

FIG.32(a)

| -1 | 0 | 1 |
|---|---|---|
| -2 | 0 | 2 |
| -1 | 0 | 1 |

FIG.32(b)

| 0 | 1 | 2 |
|---|---|---|
| -1 | 0 | 1 |
| -2 | -1 | 0 |

FIG.32(c)

| 1 | 2 | 1 |
|---|---|---|
| 0 | 0 | 0 |
| -1 | -2 | -1 |

FIG.32(d)

| 2 | 1 | 0 |
|---|---|---|
| 1 | 0 | -1 |
| 0 | -1 | -2 |

IMAGE-PROCESSING APPARATUS AND IMAGE-PROCESSING METHOD

FIELD OF THE INVENTION

The present invention relates to an image-processing apparatus which can discriminate image areas so as to carry out an optimal image process with respect to inputted multi-value image data, in digital color copying machines and color scanners, and also concerns an image processing method for such an apparatus.

BACKGROUND OF THE INVENTION

Conventionally, in image-processing apparatuses such as digital copying machines and facsimile machines, an image process is applied to image signals obtained by reading an original document by a CCD (charge coupled device) sensor, etc. so as to improve the image quality. In other words, mesh or dot areas, silver-lead photograph areas and character areas contained in the original document are respectively discriminated, and image processes suitable for image characteristics of the respective areas are carried out so as to improve the image quality. For example, a smoothing process for reducing moire is applied to the mesh or dot areas, and an emphasizing process for clearly displaying the characters is applied to the character areas.

With respect to the image area discrimination method carried out in such image processes so as to improve the image equality, the following methods have been proposed:

Japanese Laid-Open Patent Application No. 163166/1997 "Tokukaihei 9-163166 (published on Jun. 20, 1997)" discloses a processing method for black characters. In this method, an image is divided into respective predetermined areas, and the respective areas are discriminated by using feature parameters representing the characteristics of character and mesh images. In other words, within a predetermined area including a target pixel, the average value is found so as to be set as a threshold value, and the difference between the threshold value and the target pixel value is found so that a judgement is made as to the character area based upon sizes from the results. Moreover, a black character is discriminated from 8 pixels adjacent to the target pixel, and a distinction from the mesh or dot is extracted.

Japanese Laid-Open Patent Application No. 56287/1996 "Tokukaihei 8-56287 (published on Feb. 27, 1996)" discloses a method in which discriminations are made among character/ling drawing areas, mesh areas and photograph areas based upon differences in color distribution of image data of CMY (cyan, magenta, yellow).

Japanese Laid-Open Patent Application No. 54180/1994 "Tokukaihei 6-54180 (published on Feb. 25, 1994)" discloses a method in which the average value, the maximum value, etc. within a specific area are calculated, and by comparing these with threshold values, the character area and the photograph area are discriminated.

However, the above-mentioned conventional methods fail to provide sufficient precision to discriminate the character/line drawing areas, the mesh or dot areas and the photograph areas, causing the possibility of maldiscrimination.

Moreover, the above-mentioned conventional methods can carry out discrimination on color images; however, in particular, when an edge extraction and/or emphasizing process is carried out on color characters, a problem arises in which the color of an edge portion tends to be different from the original color.

SUMMARY OF THE INVENTION

The objective of the present invention is to provide an image-processing apparatus which can carry out discrimination between character areas and mesh or dot areas as well as discrimination between black character areas and line drawing areas with high precision with respect to areas to which pixels of multi-value image data belong, and also to provide an image-processing method thereof.

In order to achieve the above-mentioned objective, an image-processing apparatus in the present invention, which carries out area discrimination on image data, is provided with: a first inspection circuit which, with respect to image data within a specific area consisting of a target pixel and pixels in a vicinity thereof, calculates the number of pixels whose density value is coincident with that of the target pixel so as to judge whether the density value of the target pixel is a maximum value or a minimum value; and a feature-amount extraction circuit for discriminating whether or not the target pixel is in a dot area.

Moreover, in order to achieve the above-mentioned objective, an image-processing method in the present invention, which carries out area discrimination on image data, is provided with a first inspection step for, with respect to image data within a specific area consisting of a target pixel and pixels in the vicinity thereof, calculating the number of pixels whose density value is coincident with that of the target pixel so as to judge whether the density value of the target pixel is a maximum value or a minimum value; and a feature-amount extraction step for discriminating whether or not the target pixel is in a dot area.

With the above-mentioned arrangement and method, the first inspection circuit and/or process make it possible to discriminate whether the density value of the target pixel is a maximum value or a minimum value within a specific area consisting of a target pixel and pixels in the vicinity thereof, with respect to inputted image data. Therefore, the feature-amount extraction circuit and/or process can discriminate which area the area including the target pixel on the image belong to, a character area, dot area or a photograph area, with high precision.

Therefore, it is possible to apply an optimal image process to the area including the target pixel on the image, and consequently to achieve high image quality.

In order to achieve the above-mentioned objective, an image-processing apparatus in the present invention is provided with: a first color detection circuit for detecting black-color portions with respect to pixels within a first area consisting of a target pixel and pixels in the vicinity thereof; a count circuit for counting the respective numbers of the black pixels and pixels having colors other than black with respect to the pixels in the first area; an edge discrimination circuit for detecting whether or not an abrupt color change occurs at the target pixel, and a black color detection circuit which, based upon the results of outputs from these color detection circuit, count circuit and edge discrimination circuit, detects which area the target pixel belongs to, the black-letter area or the line-drawing area.

In order to achieve the above-mentioned objective, the image-processing method of the present invention, which is an image-processing method for discriminating image-data areas, is provided with: a first color detection process for detecting black-color portions with respect to pixels within the first area consisting of a target pixel and pixels in the vicinity of the target pixel; a count process for counting the respective numbers of the black pixels and pixels having colors other than black with respect to the pixels in the first area; an edge discrimination process for detecting whether or not an abrupt color change occurs at the target pixel; and a black color detection process which, based upon the results of outputs from these color detection process, count process and edge discrimination process, detects which area the target pixel belongs to, the black-letter area or the line-drawing area.

With the above-mentioned arrangement and method, with respect to the first area consisting of the target pixel and pixels adjacent thereto of image data for each color component, it is possible to discriminate whether or not the target pixel on the image is black, so that an optimal image process can be applied as the black area. Moreover, with the edge discrimination circuit and/or process, with respect to image data within the first area, it is possible to discriminate whether or not the target pixel on the image belongs to a black character edge area, so that an optimal image process can be applied as an edge portion of a black character, black line drawing, etc. Then, based upon the results of these and the respective numbers of the black pixels and pixels having colors other than black in the first area found in the count circuit and/or process, the black color detection circuit and/or process can carry out discrimination on the black character area and the line drawing area with high precision with respect to the area to which pixels of the image data belong.

Therefore, it is possible to apply an optimal image process to the area on the image to which the target pixel belong, and consequently to achieve high image quality. Thus, even when an edge extraction and/or emphasizing process is carried out on color characters, no change occurs in the color of edge portions thereof, which is distinct from the conventional apparatuses.

In other words, an image-processing apparatus and an image-processing method in the present invention, which relate to image processes in a digital color copying machine, a color scanner, etc., calculates the number of adjacent pixels whose density value is coincident with that of the target pixel within a specific area of image data for each color component so that character areas and dot areas (newspapers, etc.) are extracted. Thus, it becomes possible to carry out area separation with high precision by using a simple process, and consequently to carry out an optimal image process on each of the areas.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram that schematically shows the construction of a first image area discrimination circuit installed in an image-processing apparatus shown in FIG. 6.

FIG. 3(a) is a block diagram that schematically shows the construction of a second inspection circuit for cyan in the first image area discrimination circuit shown in FIG. 1.

FIG. 3(b) is a block diagram that schematically shows the construction of a second inspection circuit for magenta in the first image area discrimination circuit shown in FIG. 1.

FIG. 3(c) is a block diagram that schematically shows the construction of a second inspection circuit for yellow in the first image area discrimination circuit shown in FIG. 1.

FIG. 9(a) is an explanatory drawing that shows lengths and directions of run-lengths in the main and sub directions in a run-length detection carried out in the first image area discrimination circuit shown in FIG. 1.

FIG. 9(b) is an explanatory drawing that shows lengths and directions of run-lengths in the main and sub directions in a run-length detection carried out in the first image area discrimination circuit shown in FIG. 1.

FIG. 9(c) is an explanatory drawing that shows lengths and directions of run-lengths in the main and sub directions in a run-length detection carried out in the first image area discrimination circuit shown in FIG. 1.

FIG. 9(d) is an explanatory drawing that shows lengths and directions of run-lengths in the main and sub directions in a run-length detection carried out in the first image area discrimination circuit shown in FIG. 1.

FIG. 9(e) is an explanatory drawing that shows lengths and directions of run-lengths in the main and sub directions in a run-length detection carried out in the first image area discrimination circuit shown in FIG. 1.

FIG. 9(f) is an explanatory drawing that shows lengths and directions of run-lengths in the main and sub directions in a run-length detection carried out in the first image area discrimination circuit shown in FIG. 1.

FIG. 9(g) is an explanatory drawing that shows lengths and directions of run-lengths in the main and sub directions in a run-length detection carried out in the first image area discrimination circuit shown in FIG. 1.

FIG. 13(a) is an explanatory drawing that shows a calculation area for another periodicity detection used in the first image area discrimination circuit, shown in FIG. 1.

FIG. 13(b) is an explanatory drawing that shows a calculation area for another periodicity detection used in the first image area discrimination circuit, shown in FIG.

FIG. 17(a) is an explanatory drawing that shows another calculation area for feature amount used for a dot block correction that is carried out in the first image area discrimination circuit shown in FIG. 1.

FIG. 17(b) is an explanatory drawing that shows another calculation area for feature amount used for a dot block correction that is carried out in the first image area discrimination circuit shown in FIG. 1.

FIG. 17(c) is an explanatory drawing that shows another calculation area for feature amount used for a dot block correction that is carried out in the first image area discrimination circuit shown in FIG. 1.

FIG. 29 is a block diagram that schematically shows the construction of a judgment processing circuit in the second image area discrimination circuit shown in FIG. 18.

FIG. 31(a) is an explanatory drawing that shows a mask filter used in the first edge detection circuit shown in FIG. 24.

FIG. 31(b) is an explanatory drawing that shows a cross-shaped area corresponding to a processing range of the second edge detection circuit shown in FIG. 25.

FIG. 32(a), which shows an example of a mask filter used in the first edge detection circuit shown in FIG. 24, represents a filter coefficient used for an edge detection in the 0° direction.

FIG. 32(b), which shows an example of a mask filter used in the first edge detection circuit shown in FIG. 24, represents a filter coefficient used for an edge detection in the 45° direction.

FIG. 32(c), which shows an example of a mask filter used in the first edge detection circuit shown in FIG. 24, represents a filter coefficient used for an edge detection in the 90° direction.

FIG. 32(d), which shows an example of a mask filter used in the first edge detection circuit shown in FIG. 24, represents a filter coefficient used for an edge detection in the 135° direction.

DESCRIPTION OF THE EMBODIMENTS

Embodiment 1

Referring to FIGS. 1 through 17, the following description will discuss one embodiment of the present invention. Here, in FIGS. 1 through 17, each of signal lines, indicated with a thick line width, represents a signal line that can transmit multiple bits in parallel with each other.

First, an explanation will be given of the outline of an image-processing apparatus in accordance with the present embodiment. In order to provide optimal image-processing to inputted multi-value image data, the image-processing apparatus of the present embodiment can carry out an area discriminating operation with high precision on areas to which the pixels of the multi-value image data belong.

In particular, the discrimination is made based upon a plurality of factors obtained by extracting feature parameters, such as a feature parameter for high density, a feature parameter for granulation and a feature parameter for periodicity, and the results of the discrimination are subjected to block corrections; thus, it becomes possible to positively discriminate character, dot and photograph areas.

Here, the feature parameter for high density is used for judging how many color dots are located in a predetermined area. The feature parameter for a granulation is used for judging whether the color dots belong to points, lines or faces. The feature parameter for periodicity is used for judging periods in which specific color dots are repeated. Moreover, the block correction is made so as to improve sureness of the judgement by correcting those judgements that have not been made based upon the above-mentioned three feature parameters.

In the image-processing apparatus of the present embodiment, based upon multi-value image data for respective color components (for example, image data consisting of cyan, magenta and yellow) obtained by scanning an original document, a color-image area discrimination process is carried out so as to discriminate whether each of the areas in which respective pixels on the image are located belongs to a character area or a dot area. Additionally, with respect to discriminations on a black character area and a line drawing area, they will be explained in embodiment 2.

Figure 6:
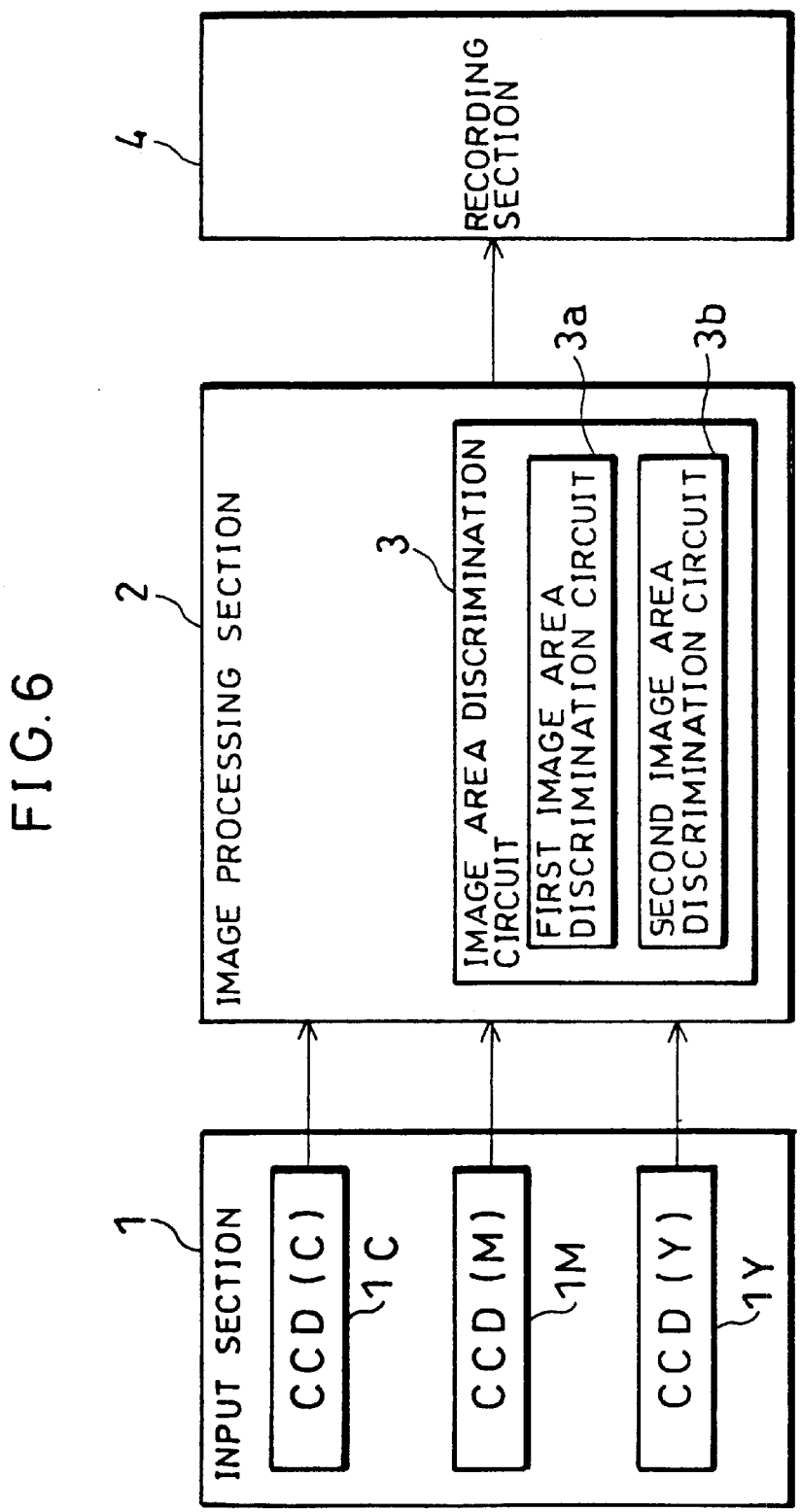
FIG. 6 is a block diagram that schematically shows the construction of an image-processing apparatus in accordance with one embodiment of the present invention.

First, as illustrated in FIG. 6, the above-mentioned image-processing apparatus is provided with, at least, an input section 1, an image-processing section 2 and a recording section 4.

The input section 1 is an input unit that scans a document image so as to obtain a digital signal of image data representative of the document. More specifically, the input section 1 is provided with CCD (charge coupled device) sensors (CCD sensor 1C, CCD sensor 1M and CCD sensor 1Y) for the respective color components of cyan, magenta and yellow, and outputs respective image data C, M and Y of digital image thus obtained to an image-processing section 2 for each of the colors. Here, the input unit for the multi-value image data is not intended to be limited by CCD sensors. Moreover, in the following description, cyan, magenta and yellow may be represented as C, M and Y respectively.

The above-mentioned image-processing section 2 is provided with an image area discrimination section 3 for discriminating each image area as a pretreatment before processing the digital image. In this image area discrimination section 3, at least a first image area discrimination circuit 3a and a second image area discrimination circuit 3b are installed. Moreover, the image-processing section 2 is also provided with a processing section (not shown) that carries out an aftertreatment (filter treatment) based upon the results of the pretreatment in the image area discrimination section 3.

The above-mentioned recording section 4 is a recording unit that records the digital image that has been treated in the image-processing section 2.

In the present embodiment, an explanation will be given of the first image area discrimination circuit 3a which discriminates whether each image area is a character area or a dot area. Additionally, with respect to the second image area discrimination circuit 3b which discriminates whether each image area is a black character area or a line drawing area, the explanation thereof will be given in embodiment 2.

Referring to FIG. 1, an explanation will be schematically given of the construction of the first image area discrimination circuit 3a. The first image area discrimination circuit 3a is provided with a first inspection circuit (a first inspection means, a first inspection process) 10 (10C, 10M and 10Y) and a second inspection circuit 20 (20C, 20M and 20Y) for each of the color components, cyan, magenta and yellow, and also provided with a feature amount extraction circuit, dot area discrimination means, dot area discrimination process) 30 and a correction circuit 40. These first inspection circuit 10, the second inspection circuit 20, the feature amount extraction circuit 30 and the correction circuit 40 are installed in series with each other in this order. The first image area discrimination circuit 3a, which has received as inputs the image data C, M and Y of digital image obtained in the CCD sensors 1C, 1M and 1Y, outputs the results of the dot discrimination MESH.

This is inputted to the aftertreatment (filter treatment) in the image-processing section 2, and the dot area is subjected to a smoothing process so as to reduce moire, while the character area is subjected to an emphasizing process for clearly displaying the characters; thus, it is possible to improve the image quality.

The first inspection circuit 10 calculates the feature parameter for high density by detecting the maximum and minimum values in the pixel density, and also calculates the feature parameter for granulation by detecting the run-length and the degree of busy, for each of the colors.

Figure 2A:
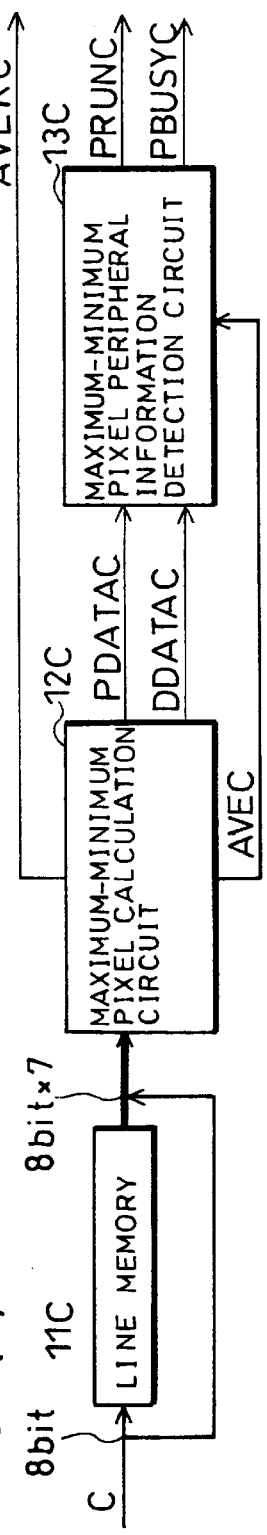
FIG. 2(a) is a block diagram that schematically shows the construction of a first inspection circuit for cyan in the first image area discrimination circuit shown in FIG. 1.
Figure 2B:
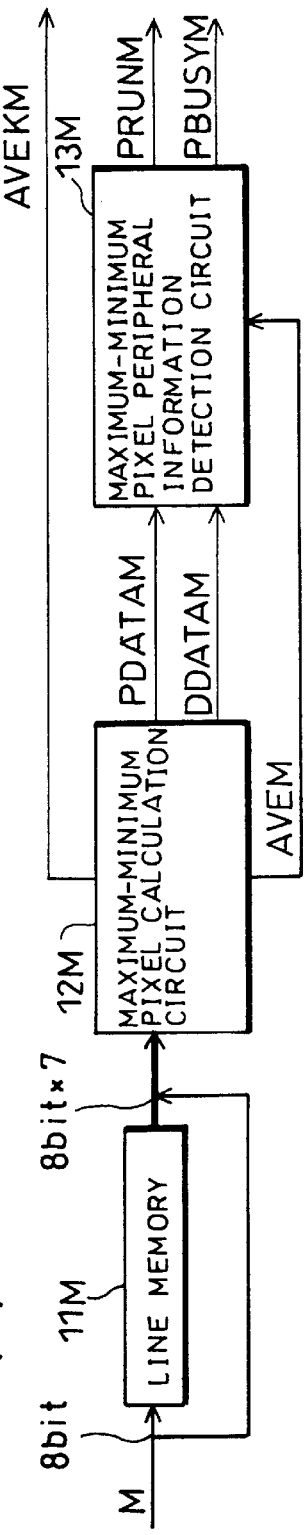
FIG. 2(b) is a block diagram that schematically shows the construction of a first inspection circuit for magenta in the first image area discrimination circuit shown in FIG. 1.
Figure 2C:
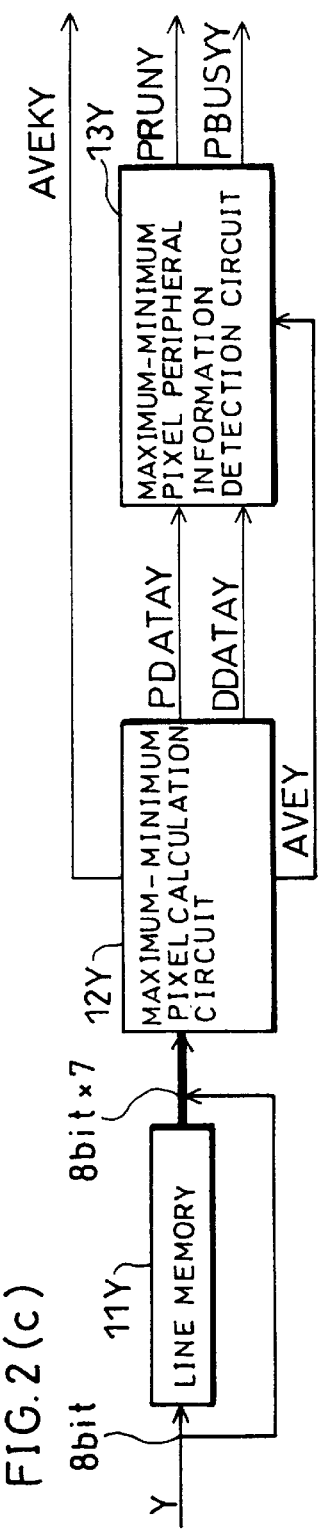
FIG. 2(c) is a block diagram that schematically shows the construction of a first inspection circuit for yellow in the first image area discrimination circuit shown in FIG. 1.

Here, the first inspection circuit 10C (FIG. 2 (a)), the first inspection circuit 10M (FIG. 2(b)) and the first inspection circuit 10Y (FIG. 2(c)) have identical constructions; therefore, the following description will discuss only the first inspection circuit 10C.

As illustrated in FIG. 2(a), the first inspection circuit 10C is constituted by a line memory 11C, a maximum-minimum pixel calculation circuit (maximum-minimum pixel calculation means, maximum-minimum pixel calculation process) 12C, and a maximum-minimum pixel peripheral information detection circuit (maximum-minimum pixel peripheral information detection means, maximum-minimum pixel peripheral information detection process) 13C.

The above-mentioned line memory 11C is a line memory having m lines aligned in parallel with each other. The line memory 11C stores image data C of cyan with 8 bits obtained by scanning a document image by using the CCD sensor 1C of the input section 1 in a manner so as to synchronize to the system clock, and also outputs image data C having m+1 lines constantly in parallel therewith.

The above-mentioned maximum-minimum pixel calculation circuit 12C, which has received the pixel density of the image data C outputted from the line memory 11C as an input, outputs a maximum judgement value PDATAC, a minimum judgement value DDATAC and a density average value AVEC of cyan to the maximum-minimum pixel peripheral information detection circuit 13C, and also outputs a flag signal AVEKC that is a result of comparison between the density average value AVEC and a threshold value to the second inspection circuit 20C. Here, the maximum judgement value PDATAC, the minimum judgement value DDATAC and the density average value AVEC correspond to the feature parameter for high density of cyan.

The contents of processes in the maximum-minimum pixel calculation circuit 12C are described as follows. Here, all the factor areas, such as ranges of specific areas, matrixes and calculation areas, that will be described below can be altered, and can be applied to all the areas. Moreover, the following description will discuss the image data C; however, the image data M and Y are processed in the same manner.

Here, all predetermined set values (threshold values) used in the following calculations and judging expressions are integers in the range of −255 to +255, and set by a CPU (not shown) in the image-processing section 2 as registered values. In this case, these predetermined set values may also be altered depending on formats of image data to be used and output devices.

The above-mentioned feature parameters for high density are calculated within specific judgement blocks of (m+1)×n. Therefore, based upon the feature parameters for high density, it is possible to judge how many color dots are located within the specific judgement blocks of (m+1)×n.

Figure 7:
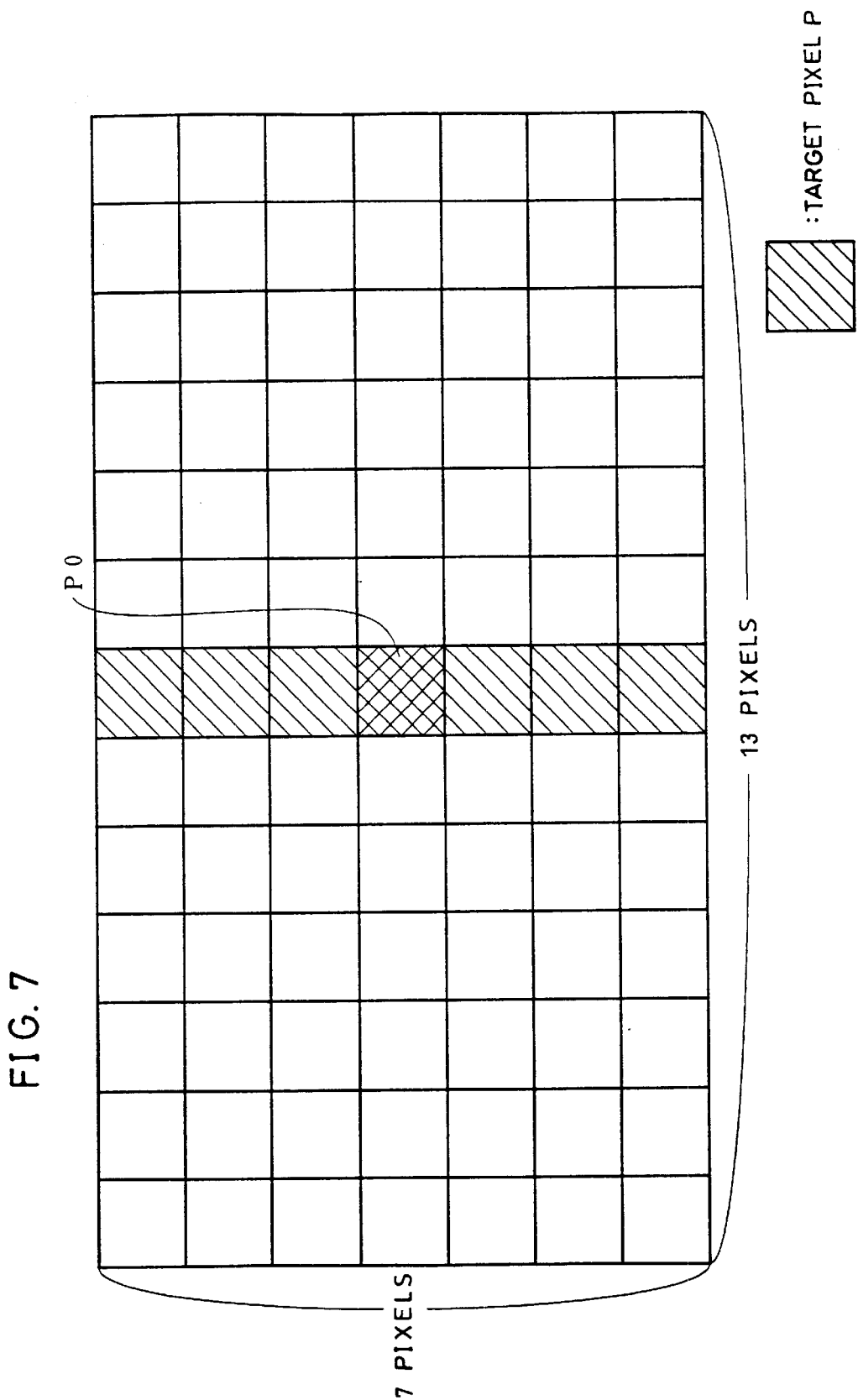
FIG. 7 is an explanatory drawing that indicates a range of a specific area used in the first image area discrimination circuit shown in FIG. 1.

In the present embodiment, within a range of a specific area shown in FIG. 7, that is, within blocks (corresponding to 6 steps of line memories) of 7 pixels×13 pixels centered on the center pixel P0, feature parameters for high density are calculated. The center column of FIG. 7 represents target pixels P and the pixel in the center is the center pixel P0. The density average value AVEC of cyan within 7 pixels×9 pixels centered on the center pixel P0 is to be calculated.

Figure 8:
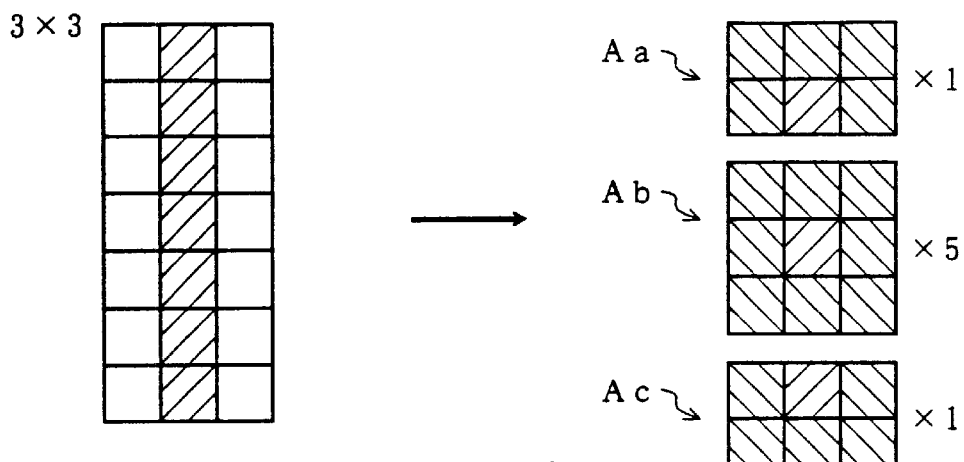
FIG. 8(a) is an explanatory drawing that indicates a 3×3 matrix used in a maximum-minimum pixel detection in the first image area discrimination circuit shown in FIG. 1.
FIG. 8(b) is an explanatory drawing that indicates a 5×5 matrix used in a maximum-minimum pixel detection in the first image area discrimination circuit shown in FIG. 1.
Figure 8B:
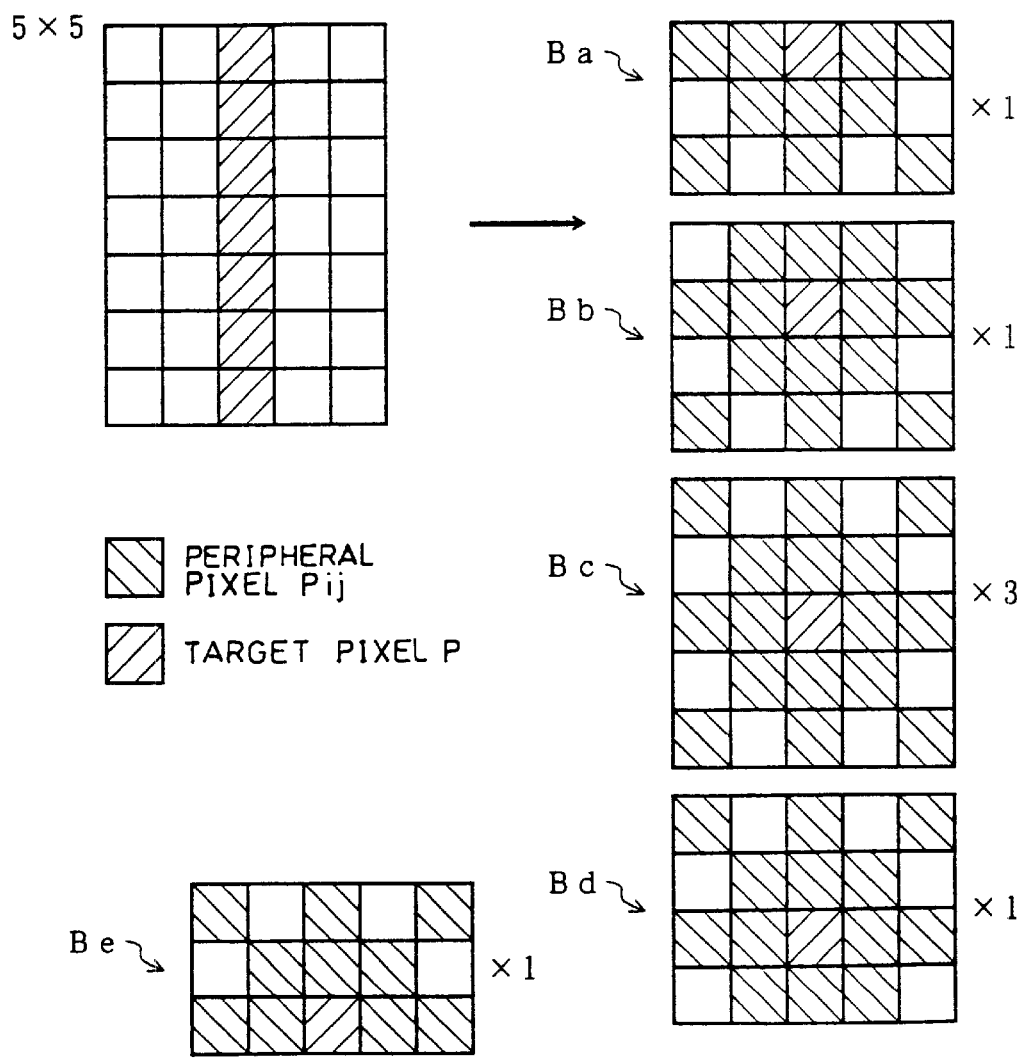

Moreover, maximum and minimum pixels are calculated by using a 3×3 matrix A (FIG. 8(a)) and a 5×5 matrix (FIG. 8(b)) centered on the target pixel P. In this case, those matrix pixels which can be taken are different in their number and kinds, depending on the position of the target pixel P.

As illustrated in FIG. 8(a), the 3×3 matrix A contains, a 2×3 matrix Aa corresponding to the upper end pixel, a 2×3 matrix Ac corresponding to the lower end pixel, and five 3×3 matrixes Ab corresponding to pixels located between these matrixes, among target pixels that are seven pixels aligned longitudinally.

Moreover, as illustrated in FIG. 8 (b), the 5×5 matrix B contains a 3×5 matrix Ba corresponding to the upper end pixel, a 4×5 matrix Bb corresponding to the second pixel from the top, a 3×5 matrix Be corresponding to the lower end pixel, a 4×5 matrix Bd corresponding to the second pixel from the bottom, and three 5×5 matrix Bc corresponding to pixels located between these matrixes, among target pixels that are seven pixels aligned longitudinally.

Then, the sum of the density differences of cyan PSC, which is the sum of absolute values of differences between the target pixels P and the peripheral pixels Pij of FIG. 8(a) and FIG. 8(b), is found. Moreover, the number of those peripheral pixels Pij that have the same density value as the target pixels P is counted and defined as the number of density-coincident pixels EQC of cyan.

Here, the average density value AVEC, the sum of density differences PSC and the number of density-coincident pixels EQC of cyan, thus obtained, are respectively applied to the average density value AVE, the sum of density differences PS, the number of density-coincident pixels EQ in the following conditional expressions (A)(B)(C); thus, a judgement as to whether or not each of the target pixels P has a maximum-minimum value is made, and a judgement as to the degree of density within the area is also made. As the results of the judgements, a maximum-judgement value PDATA, a minimum-judgement value DDATAC and a flag signal AVEKC of cyan are outputted from the maximum-minimum pixel calculation circuit 12C respectively as signals of 1 bit.

Conditional expression for target pixel maximum judgment (A):

$(P>AVE-AK1$ and $P \geq Pij$ and $PS>C3$ and $EQ<THEQ3)$ [3×3 matrix]

or $(P>AVE-AK1$ and $P \geq Pij$ and $PS>C5$ and $EQ<THEQ3)$ [3×3 matrix]

or $(P>AVE-AK1$ and $P \geq Pij$ and $PS>C5$ and $EQ<THEQ5)$ [5×5 matrix]

Conditional expression for target pixel minimum judgment (B):

$(P>AVE-AK2$ and $P \leq Pij$ and $PS>C3$ and $EQ<THEQ3)$ [3×3 matrix]

or $(P>AVE-AK2$ and $P \leq Pij$ and $PS>C5$ and $EQ<THEQ3)$ [3×3 matrix]

or $(P>AVE+AK2$ and $P \leq Pij$ and $PS>C5$ and $EQ<THEQ5)$ [5×5 matrix]

Conditional expressing for degree of density within the area (C):

$AVE>THAVE$ where

AK1: signed 8 bits

AK2: signed 8 bits

C3: TH3M×COUNT3

C5: TH5M×COUNT5

TH3M=THMM3 (AVE>THMM1)
=THMM5 (AVE>THMM2)
=THMM7 (except the above)

TH5M=THMM4 (AVE>THMM1)
=THMM6 (AVE>THMM2)
=THMM8 (except the above)

THMM1 to 9:threshold (set value by register:predetermined)
THMM3<THMM4, THMM5<THMM6, THMM7<THMM8

COUNT3: 5 or 8 (determined by the number of peripheral pixels in the matrix of FIG. 8(a))

COUNT5: 10 or 13 or 16 (determined by the number of peripheral pixels in the matrix of FIG. 8(b))

THAVE: threshold (set value by register: predetermined)

Here, if the above-mentioned conditional expression (A) is satisfied, the target pixel P is judged as a maximum value, and "1" is outputted as the maximum-judgement value PDATAC of cyan. In contrast, if the above-mentioned conditional expression (B) is satisfied, "1" is outputted as the minimum-judgement value DDATAC of cyan. In the other cases, "0" is outputted as the maximum-judgement value PDATAC and the minimum-judgement value DDATAC. Moreover, if the above-mentioned conditional expression (C) is satisfied, "1" is outputted as the flag signal AVEKC of cyan.

Next, the maximum-minimum pixel peripheral information detection circuit 13C, which has received as inputs the maximum-judgement value PDATA, the minimum-judgement value DDATAC and the average density value AVEC of cyan released from the maximum-minimum pixel calculation circuit 12C, calculates the run-length PRUNC and the degree of busy PBUSYC of cyan, and outputs these to the second inspection circuit 20C. Here, the run-length PRUNC and the degree of busy PBUSYC correspond to the feature parameters for granulation of cyan.

The contents of processes in the maximum-minimum pixel peripheral information detection circuit 13C are described as follows: Here, an explanation will be given of image data C, but the same processes are carried out also on the image data M and Y.

The maximum-minimum pixel peripheral information detection circuit 13C calculates the run-length (peripheral information) PRUNC with target pixel P within the specific processing area (FIG. 7) by using the maximum-judgement value PDATA, the minimum-judgement value DDATAC and the average density value AVEC obtained from the maximum-minimum pixel calculation circuit 12C, and outputs the resulting signal.

As illustrated in FIG. 9(a) to FIG. 9(g), although the main scanning direction is constant, the sub-scanning direction varies in the direction and number in which run-lengths PRUN (run-length PRUNC of cyan, run-length PRUNM of magenta and run-length PRUNY of yellow) can be set, depending on positions of the target pixels P. With respect to the way how the run-lengths PRUN are sets, there are seven ways for each of the target pixels as shown in FIG. 9(a) to FIG. 9 (g); however, the maximum value is 6 (see FIG. 9(a) and FIG. 9(g)).

In the specific judging method, the average density value of cyan AVEC, obtained in the maximum-minimum pixel calculation circuit 12C, is applied to the average density value AVE in the following conditional expression (D), and until the conditional expression (D) has been satisfied, the number of pixels in each of the four directions (directions 1 to 4 shown in FIG. 9(d)) of the main scanning direction and the sub scanning directions are counted as RUN1, RUN2, RUN3 and RUN4, and the resulting maximum value is outputted as the run-length (peripheral information) PRUNC of cyan. Conditional expression for run-length judgment (D):

$Pij \leq AVE \pm BK1$ (when $PDATA=1$)

$Pij > AVE \pm BK2$ (when $DDATA=1$)

where

BK1,BK2:   threshold   (set   value   by register:predetermined)

PRUN=MAX (RUN1,RUN2,RUN3,RUN4)

RUN1,RUN2,RUN3,RUN4: the number of pixels in 4 directions

Moreover, the maximum-minimum pixel peripheral information detection circuit 13C calculates the sum of absolute values of differences between the target pixels P and the peripheral pixels contained in the run-lengths in each of the four directions including the main scanning direction and sub-scanning directions, as BUSY1, BUSY2, BUSY3 and BUSY4, and outputs the value related to run-length PRUNC forming the maximum value among the run-lengths as the degree of busy PBUSYC.

Conditional expression for judging the degree of busy (E):

| |
|---|
| PBUSY = PBUSY1 (when PRUN = RUN1) |
| = PBUSY2 (when PRUN = RUN2) |
| = PBUSY3 (when PRUN = RUN3) |
| = PBUSY4 (when PRUN = RUN4) |

Here, if there are a plurality of values that are equal to run-length PRUNC, the minimum value of the sum of absolute values of differences is outputted as PBUSY. For example, when run-lengths of direction 1 and direction 2 are identical and both have the maximum value, among those degrees of busy with respect to run-lengths in the two directions, the one having the minimum value is outputted as the degree of busy PBUSYC. Moreover, if the run-lengths in all the directions are 0, 0 is outputted as the degree of busy PBUSYC.

Example PBUSY=MIN(BUSY1,BUSY2) (when PRUN= RUN1=RUN2) PBUSY=0 (when PRUN=0)

As described the above-mentioned, the first inspection circuit 10, upon receipt of image data C, M and Y from the respective CCD sensors 1 in the input section 1 as inputs, outputs flag signals AVEKC, AVEKM and AVEKY, run-lengths PRUNC, PRUNM and PRUNY, and the degrees of busy PBUSYC, PBUSYM and PBUSYY to the second inspection circuit 20. Moreover, during these processes, the maximum-minimum pixel calculation circuit (maximum-minimum pixel calculation means, maximum-minimum pixel calculation process) 12 calculates the feature parameters for high density. The maximum-minimum pixel peripheral information detection circuit (maximum-minimum pixel peripheral information detection means, maximum-minimum pixel peripheral information detection process) 13 finds run-length PRUN and the degree of busy PBUSY, and calculates the feature parameters for granulation.

The above-mentioned second inspection circuit 20 sets up weight ratios and detects the periodicity. Here, since the second inspection circuit 20C (FIG. 3(a)), the second inspection circuit 20M (FIG. 3(b)) and the second inspection circuit 20Y (FIG. 3(c)) have the same construction, an explanation will be given only of the second inspection circuit 20C below.

As illustrated in FIG. 3(a), the above-mentioned second inspection circuit 20C is constituted by a pixel weight switching signal calculation circuit (pixel weight switching signal calculation means) 21C, a weight ratio setting circuit (pixel weight-applying means, pixel weight-applying process) 22C, a first periodicity detection circuit (first periodicity calculation means, first periodicity calculation process) 23C and a second periodicity detection circuit (second periodicity calculation means, second periodicity calculation process) 24C.

The above-mentioned pixel weight switching signal calculation circuit 21C, which has received the flag signal AVEKC, the run-length PRUNC and the degree of busy PBUSYC of image data C of cyan outputted from the first inspection circuit 10c as inputs, calculates a pixel weight switching signal WSC and outputs it.

More specifically, the pixel weight switching signal calculation circuit 21C respectively applies the maximum judgment value PDATAC, the minimum judgment value DDATAC, the run-length PRUNC and the degree of busy PBUSYC of cyan to the maximum judgment value PDATA, the minimum judgment value DDATA, the run-length PRUN, the degree of busy PBUSY in the following expressions so as to find a pixel weight switching signal, and outputs this to the weight ratio setting circuit 22C and the weight switching signal count circuit 31 of the feature amount extraction circuit 30. Here, an explanation will be given only of the image data C; however, the same processes are carried out also on the image data M and Y.

Conditional expression (F) for pixel weight switching signal judgment:

```
WS =0 (when PDATA = 0 or DDATA = 0)
   =1 (when PDATA = 1 and PRUN > THPRO and PB < THPB0)
   =1 (when PDATA = 1 and PRUN > THPR1 and PB < THPB1)
   =1 (when PDATA = 1 and PRUN > THPR2 and PB < THPB2)
   =2 (when PDATA = 1 and PRUN < THPR3 and PB >THPB3)
   =2 (when PDATA = 1 and PRUN < THPR4 and PB >THPB4)
   =2 (when PDATA = 1 and PRUN < THPR5 and PB >THPB5)
   =3 (when PDATA = 1, and other than the above)
   =4 (when DDATA = 1 and PRUN > THPR6 and PB < THPB6)
   =4 (when DDATA = 1 and PRUN > THPR7 and PB < THPB7)
   =4 (when DDATA = 1 and PRUN > THPR8 and PB < THPB8)
   =5 (when DDATA = 1 and PRUN < THPR9 and PB >THPB9)
   =5 (when DDATA = 1 and PRUN < THPR10 and PB >THPB10)
   =5 (DDATA = 1 and PRUN < THPR11 and PB >THPB11)
   =6 (DDATA = 1, and other than the above)
   where
PB = "100000000" (when PRUN=0) [binary notation]
   = PBUSY (when PRUN = 1)
   = PBUSY/2 (PRUN=2)
   = PBUSY x (1/4 + 1/16 + 1/64) (when PRUN = 3)
   = PBUSY/4 (when PRUN = 4)
   = PBUSY x (1/8 + 1/16 + 1/64) (when PRUN=5)
   = PBUSY x (1/8 + 1/32 + 1/64) (when PRUN=6)
```

THPB0 to 11,THPR0 to 11:threshold (set value by register: predetermined)

THPB3>THPB4>THPB0>THPB1>THPB2>THPB5

THPB9>THPB10>THPB6>THPB7>THPB8>THPB11

THPR0>THPR1>THPR2>THPR3>THPR4>THPR5

THPR6>THPR7>THPR8>THPR9>THPR10>THPR11

Next, the above-mentioned weight ratio setting circuit 22C, which has received the pixel switching signal WSC of cyan from the pixel weight switching signal calculation circuit 21C as an input, finds a dot classification flag PDWEC based upon the following expression (G), and outputs this to the first periodicity detection circuit 23C, the second periodicity detection circuit 24C, and the OR circuit 33 of the feature amount extraction circuit 30. Here, with respect to image data M and Y, the same processes are also carried out in the weight ratio setting circuits 22M and 22Y.

Figure 10C:
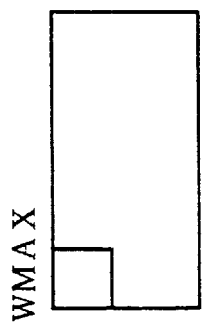
FIG. 10(c) is an explanatory drawing that shows a pixel weight distribution for each plane in weight ratio setting that is carried out in the first image area discrimination circuit shown in FIG. 1.
Figure 10B:
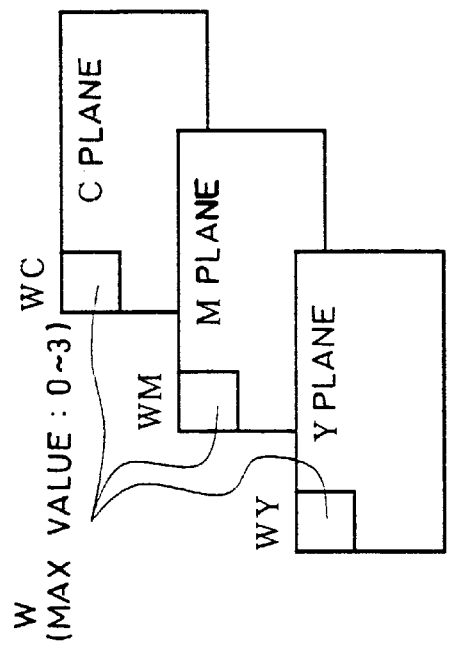
FIG. 10(b) is an explanatory drawing that shows a pixel weight distribution for each plane in weight ratio setting that is carried out in the first image area discrimination circuit shown in FIG. 1.
Figure 10A:
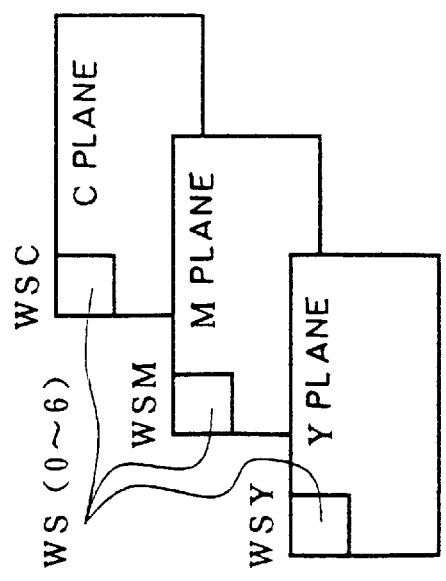
FIG. 10(a) is an explanatory drawing that shows a pixel weight distribution for each plane in weight ratio setting that is carried out in the first image area discrimination circuit shown in FIG. 1.

In other words, in planes of respective colors shown in FIG. 10(a), the number of pixels that satisfy the pixel weight switching signal WS(WSC, WSM, WSY)>0 and are defined as maximum values or minimum values and the number of pixels that satisfy the pixel weight switching signal WS=2 or 5 and are defined as being closer to dot are respectively found, and a dot classification flag PDWE (PDWEC, PDWEM, PDWEY) is then found based upon the following conditional expression (G):

Conditional expression (G) for weight ratio judgment:

```
PDWEC = 1 (when (number of pixels satisfying WSC = 2 or 5) x 64
          >
          (number of pixels satisfying WSC = 0) x THWS0C)
      = 0 (other than the above)
PDWEM = 1 (when (number of pixels satisfying WSM = 2 or 5) x
          64 > (number of pixels satisfying WSM = 0) x THWS0M)
      = 0 (other than the above)
```

-continued

```
PDWEY = 1 (when (number of pixels satisfying WSY = 2 or 5) x 64
          >
          (number of pixels satisfying WSY = 0) x THWS0Y)
      = 0 (other than the above)
      where
PDWEC = 0 (when number of pixels satisfying WSC > 0 < THWS1)
PDWEM = 0 (when number of pixels satisfying WSM > 0 < THWS1)
PDWEY = 0 (when number of pixels satisfying WSY > 0 < THWS1)
THWS0, 1: threshold (set value by register: predetermined)
```

Moreover, when AVEK=1, obtained from maximum-minimum pixel calculation circuits 12C, 12M and 12Y, is satisfied, (number of pixels satisfying WSC, WSM, WSY=2 or 5) equals 0. Furthermore, (number of pixels satisfying WSC, WSM, WSY=2 or 5) is defined to have 127 as the upper limit, and values not less than 127 are defined to be converged.

Next, the above-mentioned first periodicity detection circuit 23C calculates the periodicity A of color dots by using the pixel weight switching signal WSC. The first periodicity detection circuit 23C, which has received the dot classification flag PDWEC of cyan from the weight ratio setting circuit 22C as an input, finds the results of calculation P1C as to the periodicity A of cyan, and outputs this to the OR circuit 32C of the feature amount extraction circuit 30.

The above-mentioned "periodicity A of color dots" refers to a parameter used for carrying out dot discrimination within a narrow area. Here, an explanation will be given of image data C, but the same processes are carried out also on the image data M and Y.

Figure 11:
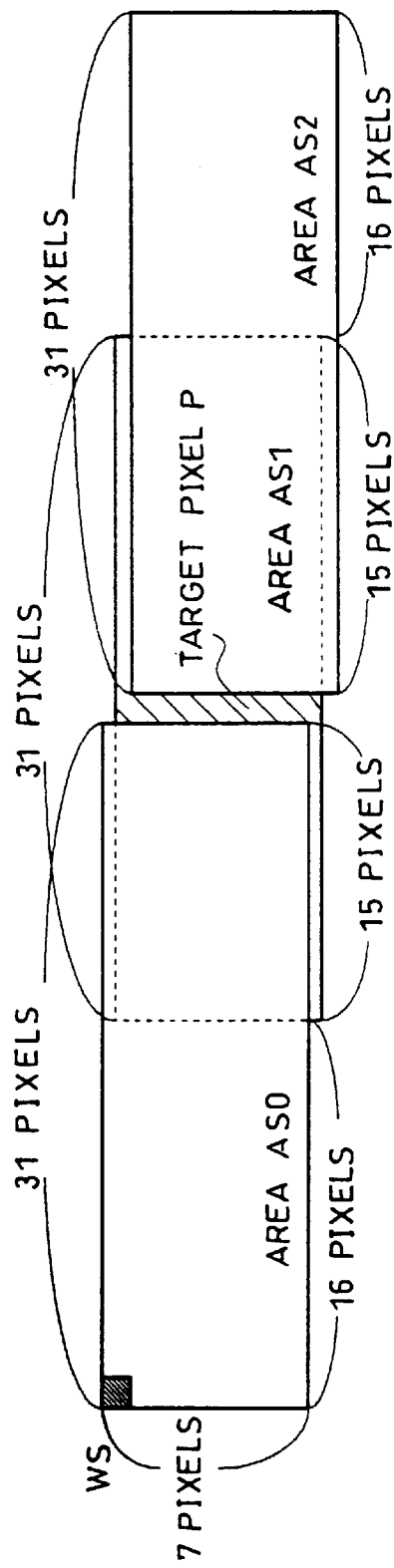
FIG. 11 is an explanatory drawing that shows a calculation area for feature amount used in the first image area discrimination circuit shown in FIG. 1.

In this case, calculation areas, as shown in FIG. 11, are set. An area consisting of lateral 31 pixels×longitudinal 7 pixels with the target pixel P located in the center is set as area AS1. An adjacent area having the same size located on the left of the target pixel P is set as area AS0, and an adjacent area located on the right of the target pixel P is set as area AS2. Therefore, 15 pixels on the left of area AS1 correspond to 15 pixels located on the right of area AS0, and 15 pixels on the right of area AS1 correspond to 15 pixels located on the left of area AS2.

Figure 12:
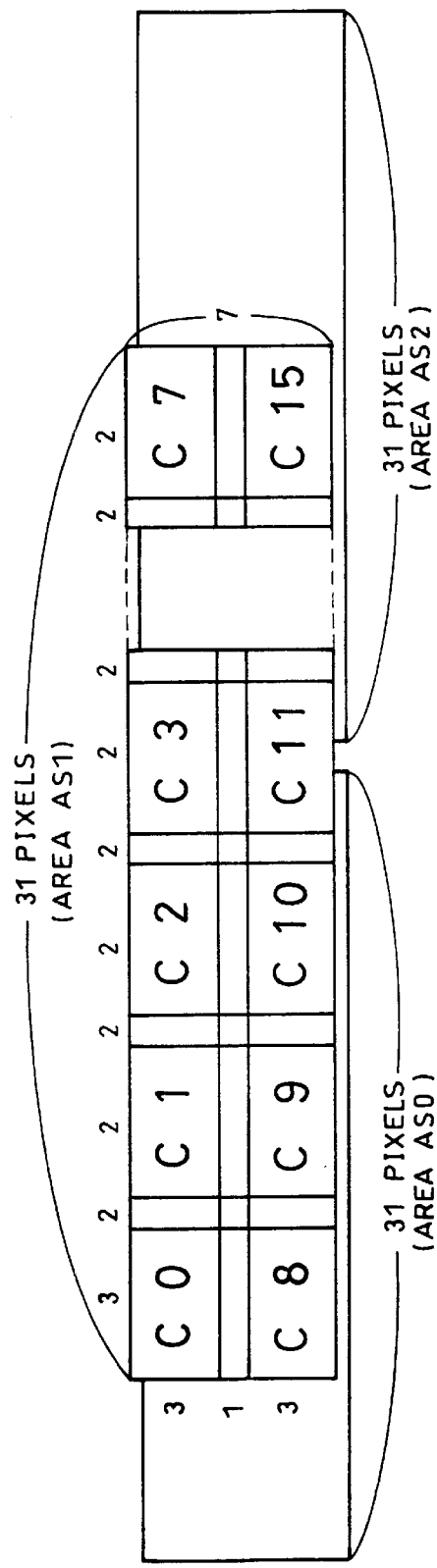
FIG. 12 is an explanatory drawing that shows a calculation area for a periodicity detection used in the first image area discrimination circuit shown in FIG. 1.
Figure 14A:
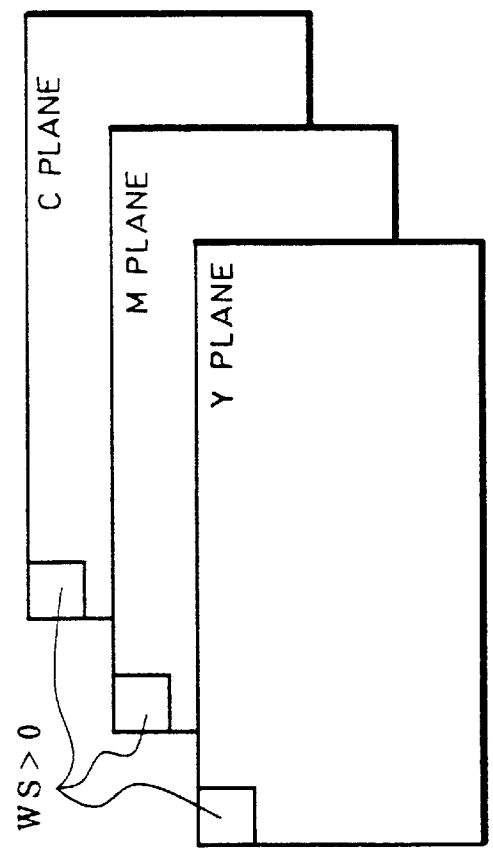
FIG. 14(a) is an explanatory drawing that shows a calculation method for a parameter RJ used for a periodicity detection that is carried out in the first image area discrimination circuit shown in FIG. 1.
Figure 14B:
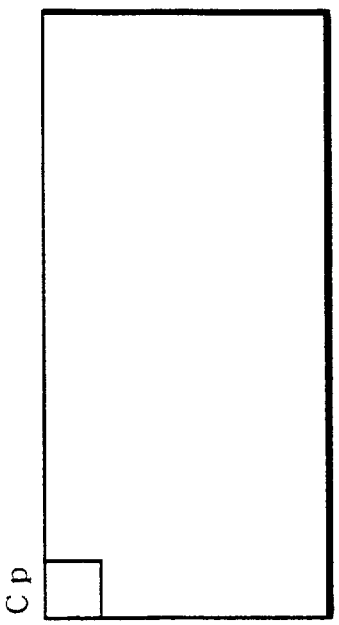
FIG. 14(b) is an explanatory drawing that shows a calculation method for a parameter RJ used for a periodicity detection that is carried out in the first image area discrimination circuit shown in FIG. 1.
Figure 15:
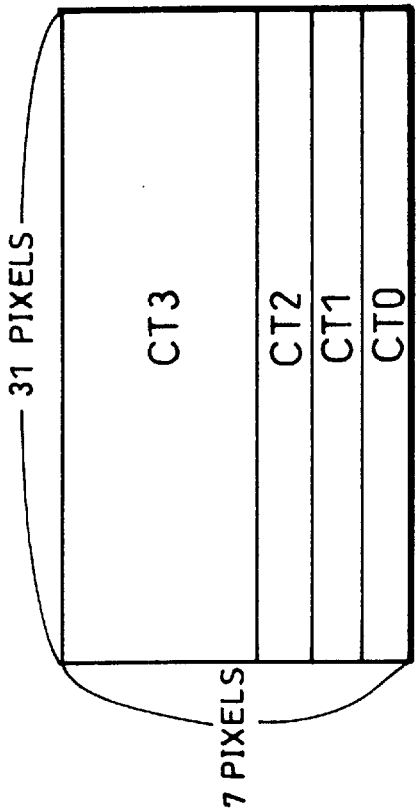
FIG. 15(a) is an explanatory drawing that shows a calculation area for a parameter RJ used for a periodicity detection that is carried out in the first image area discrimination circuit shown in FIG. 1.
FIG. 15(b) is an explanatory drawing that shows a calculation area for a parameter RJ used for a periodicity detection that is carried out in the first image area discrimination circuit shown in FIG. 1.
Figure 15:
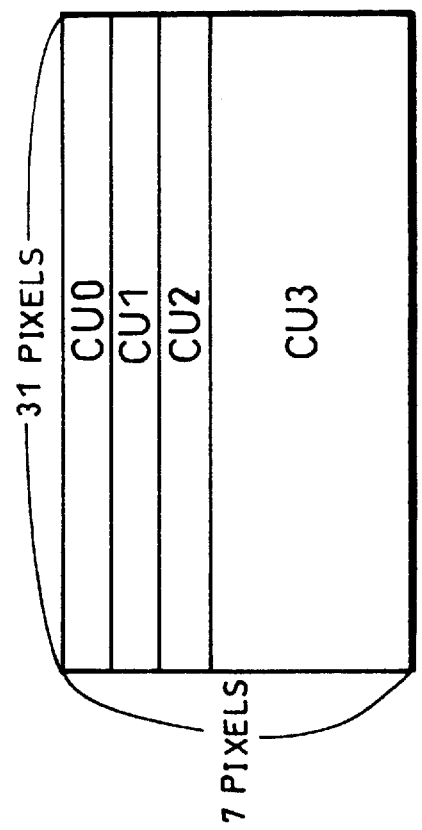

Moreover, as shown in FIG. 12, in order to calculate the amount of feature for periodicity A, areas (calculation areas) C0 to C15, consisting of 2 longitudinal columns and 8 lateral rows, are set within area AS1. Area C0 is an area consisting of longitudinal 4 pixels×lateral 5 pixels having two shared pixels on the right and one shared pixel on the bottom with adjacent areas, areas C1 to C6 are areas, each consisting of longitudinal 4 pixels×lateral 6 pixels having two shared pixels respectively on the right and on the left and one shared pixel on the bottom with adjacent areas, area C7 is an area consisting of longitudinal 4 pixels×lateral 4 pixels having two shared pixels on the left and one shared pixel on the bottom with adjacent areas, area C8 is an area consisting of longitudinal 4 pixels×lateral 5 pixels having two shared pixels on the right and one shared pixel on the top with adjacent areas, areas C9 to C14 are areas, each consisting of longitudinal 4 pixels×lateral 6 pixels having two shared pixels respectively on the right and on the left and one shared pixel on the top with adjacent areas, and area C15 is an area consisting of longitudinal 4 pixels×lateral 4 pixels having two shared pixels on the left and one shared pixel on the top with adjacent areas.

Here, the above-mentioned areas C0 to C7 (C8 to C15) are allocated within area AS1 in the following sequence. For convenience of explanation, in the following description, the pixels within area AS1 are numbered in an increasing order from left to right, starting with the first pixel on the left end.

First, area AS1 having a width of 31 pixels is longitudinally divided into 8 regions by seven division lines in the longitudinal direction along its pixel borders. For example, it is divided into 7 regions, each having a width of 4 pixels, and one region having a width of 3 pixels, from left. In other words, the division lines are positioned on the right of the respective fourth pixel, eighth pixel, . . . , and 28th pixel.

Next, the area in which the calculation is done is specificed to a range encompassing the divided region and additional pixel column on each side of the region. In other words, in FIG. 12, area C0(C8) is constituted by pixels from the first to the fifth, area C1(C9) is constituted by pixels from the eighth to the 13th, . . . , area C6(C14) is constituted by pixels from the 24th to the 29th, and area C7(C15) is constituted by pixels from the 28th to the 31st. The method for allocating areas C0 to C15 to area AS1, that is, the shape and layout of the areas to be calculated, may be desirably set.

The contents of processes in the first periodicity detection circuit 23C are described as follows: First, within the respective areas C0 to C15 (FIG. 12) in area AS1, the number of pixels CSP0 to CSP15 satisfying pixel weight switching signal WSC=2 or 3 (maximum) and the number of pixels CSD0 to CSD15 satisfying pixel weight switching signal WSC=5 or 6 (minimum) are found. Then, based upon the following conditional expression (H), the maximum value API(I=0 to 15)(AP0 to AP15) and the minimum value ADI (I=0 to 15) (AD0 to AD15) are calculated with respect to areas C0 to C15.

Conditional expression (H) for judgment as to the presence of extremal value:

---

API = 1 (when CSPI > 0 and CSPI < CW0) (I = 0 to 15)
    = 0 (other than the above)
ADI = 1 (when CSDI > 0 and CSDI < CW0) (I = 0 to 15)
    = 0 (other than the above)
where
CW0: threshold (set value by register: predetermined)

---

Next, the sum of the maximum values API and minimum values ADI (I=0 to 15) is found for each of the areas AS0, AS1 and AS2.

$$ASPJ = \sum_{I=0}^{15} API \ (J=0, 1, 2) \qquad \text{[Equation 2]}$$

$$ASDJ = \sum_{I=0}^{15} ADI \ (J=0, 1, 2)$$

Successively, the periodicity A is calculated by the following equation so as to output the results of calculation P1 (one bit) for periodicity A.

$$P1 = 1 \left[\left(\sum_{J=0}^{2} ASPJ > THAS\right) \text{ or } \left(\sum_{J=0}^{2} ASPJ > THAS\right)\right] \qquad \text{[Equation 1]}$$

$$= 0 \ [\text{except the above}]$$

THAS: threshold value (set value by register: preredetermined)

The results of calculation P1 (one bit) for periodicity A, which are the results of the above-mentioned calculations, are respectively outputted with respect to the image data C, M and Y. Here, when parameter RPJ=1(J=0, 1, 2) is satisfied, the parameter being related to the maximum state and used for making a judgment as to whether or not the dot periodicity is suitable, the sum of the maximum values ASPJ=0 (J=0, 1, 2) is satisfied (the maximum values being respectively obtained with respect to image data C, M, Y), and when parameter RDJ=1(J=0, 1, 2) is satisfied, the parameter being related to the minimum state and used for making a judgment as to whether or not the dot periodicity is suitable, the sum of the minimum values ASDJ=0(J=0, 1, 2) is satisfied. Moreover, when parameter RJ=1(J=0, 1, 2) is satisfied, the parameter being related to the extremal value and used for making a judgment as to whether or not the dot periodicity is suitable, ASPJ=ASDJ=0(J=0, 1, 2) holds, and it is defined that ASPJ=ASDJ=0 is satisfied with respect to all the output values of image data C, M and Y. Here, the calculation methods of the respective parameters RPJ, RDJ and RJ will be described later.

Successively, the above-mentioned second periodicity detection circuit 24C calculates the periodicity B of color dots by using the pixel weight switching signal WSC. The second periodicity detection circuit 24C, which has received the dot classification flag PDWEC of cyan from the weight ratio setting circuit 22C as an input, finds the results of calculation P2C as to the periodicity B of cyan, and outputs this to the OR circuit 32C of the feature amount extraction circuit 30.

The above-mentioned "periodicity B of color dots" refers to a parameter used for carrying out dot discrimination within a wide area. Here, an explanation will be given of image data C, but the same processes are carried out also on the image data M and Y.

In this case, as illustrated in FIG. 13(a), areas (calculation areas) D0 to D3 are set within area AS1. Area AS1 is divided into four by areas D0 to D3. Areas D0 to D2, each of which is an area consisting of lateral 8 pixels×longitudinal 7 pixels, are placed in succession from the left end of area AS1. Area D3, which is an area consisting of lateral 7 pixels× longitudinal 7 pixels, is placed on the right end of area AS1 adjacent to area D2. Therefore, the target pixel P is located on the right end of area D1. Here, such an area on which areas D0 to D3 are placed is referred to as area BS1, and right and left areas, each sharing the half of its area with area BS1, are referred to as areas BS0 and BS2.

Moreover, as illustrated in FIG. 13(b), areas (calculation areas) E0 to E2 are set within area AS1. Areas E0 to E2, each of which consists of lateral 8 pixels×longitudinal 7 pixels, are placed in succession from a position spaced from the left end of area AS1 by 4 pixels. Therefore, there is a space corresponding to three pixels between the right end of area E2 and the right end of area AS1. Here, such an area on which areas E0 to E2 are placed is referred to as area CS1, and right and left areas, each sharing the half of its area with area CS1, are referred to as areas CS0 and CS2.

The contents of processes in the second periodicity detection circuit 24C are described as follows: First, within the respective areas D0 to D3 (FIG. 13(a)) in area BS1, the number of pixels DSP0 to DSP3 satisfying pixel weight switching signal WSC=2 or 3 (maximum) and the number of pixels DSD0 to DSD3 satisfying pixel weight switching signal WSC=5 or 6 (minimum) are found.

In the same manner, within the respective areas E0 to E2 (FIG. 13(b)) in area CS1, the number of pixels ESP0 to ESP2 satisfying pixel weight switching signal WSC=2 or 3 (maximum) and the number of pixels ESD0 to ESD2 satisfying pixel weight switching signal WSC=5 or 6 (minimum) are found.

Successively, based on the following equations (I), maximum pixel detection flags BSP and CSP, each of which indicates the presence of the maximum pixel within the area, and minimum pixel detection flags BSD and CSD, each of which indicates the presence of the minimum pixel within the area, are found.

Conditional expressions (I) for judging the presence of an extremal value:

$$
\begin{aligned}
BSPI &= 1 \text{ (when DSPI > 0 and DSPI < CW2) (I = 0 to 3)} \\
&= 0 \text{ (other than the above)} \\
BSDI &= 1 \text{ (when DSDI > 0 and DSDI < CW2) (I = 0 to 3)} \\
&= 0 \text{ (other than the above)} \\
CSPI &= 1 \text{ (when ESPI > 0 and ESPI < CW2) (I = 0 to 2)} \\
&= 0 \text{ (other than the above)} \\
CSDI &= 1 \text{ (when ESDI > 0 and ESDI < CW2) (I = 0 to 2)} \\
&= 0 \text{ (other than the above)}
\end{aligned}
$$

[Equation 3]
$$BSP = \sum_{I=0}^{3} BSPI$$

$$BSD = \sum_{I=0}^{3} BSDI$$

$$CSP = \sum_{I=0}^{2} CSPI$$

$$CSD = \sum_{I=0}^{2} CSDI$$

Next, based upon the following expressions (J), the number of flags for maximum pixels SSP, the number of flags for minimum pixels SSD, the number of areas NNP within areas D0 to D3 and the number of areas NND within area E0 to E2 are found by using the sums BSP and BSD of the respective areas BS0 to BS2 and CS0 to CS2 calculated the above-mentioned (I).

Conditional expressions (J) for judging which area to select, area of FIG. 13(a) or area of FIG. 13(b):
SPJ=BSPJ, NPJ=4 (when BSPJ>CSPJ)
SPJ=CSPJ, NPJ=3 (when BSPJ≦CSPJ)
SDJ=BSDJ, NDJ=4 (when BSDJ>CSDJ)
SDJ=CSDJ, NDJ=3 (when BSDJ≦CSDJ)
where
J=0, 1, 2.

[Equation 4]
$$SSP = \sum_{J=0}^{2} SPJ$$

$$SSD = \sum_{J=0}^{2} SDJ$$

$$NNP = \sum_{J=0}^{2} NPJ$$

$$NND = \sum_{J=0}^{2} NDJ$$

Successively, the periodicity B is calculated by the following expressions (K) so as to output the results of calculation P2 (one bit) for periodicity B.

Conditional expressions (K) for periodicity judgment:

P2=1 (when (SSP×16>THBS×NNP) or (SSD×16>THBS×NND))
P2=0 (other than the above)

where
THBS: threshold (set value by register: predetermined)

Moreover, when RPJ=1(J=0,1,2), SPJ=0 and NPJ=4(J=0,1,2) are satisfied, and when RDJ=1(J=0,1,2), SDJ=0 and NDJ=4(J=0,1,2) are satisfied. Furthermore, when RJ=1(J=0,1,2), SPJ=SDJ=0 and NPJ=NDJ=4(J=0,1,2) are satisfied, but SPJ=SDJ=0 and NPJ=NDJ=4 are defined with respect to the full output values of C, M and Y.

Here, the following description will discuss the calculation method of parameter RPJ at the time of the maximum state, parameter RDJ at the time of the minimum state and parameter RJ at the time of the extremal value that are used in the above-mentioned operations. First, the above-mentioned parameters RPJ and RDJ are calculated based upon the following conditional expressions (L).

Conditional expressions (L) for periodicity judgment:

RPJ = 1 (when (the number satisfying WS = 2 or 3) × 64 < THRU × (the number satisfying WS = 1, 2, or 3))
     = 0 (other than the above)
RDJ = 1 (when (the number satisfying WS = 4 or 5) × 64 < THRU × (the number satisfying WS = 4, 5, or 6))
     = 0 (other than the above)
where
J = 0, 1, 2
THRU: threshold (set value by register: predetermined)

Moreover, the above-mentioned parameter RJ is calculated as follows. First, if there is at least any one value that satisfies WS=1, 2 or 3 (at maximum), or WS=4, 5 or 6 (at minimum) on the respective planes (FIG. 14(a)) of image data C, M and Y, CP=1 (at maximum) or CD=1 at minimum is defined (FIG. 14(b)).

In this case, RJ calculation areas as shown in FIGS. 15(a) and 15(b) are provided. In FIG. 15(a), the range of the specific area (FIG. 7) is divided into four areas CU0 to CU3. Areas CU0 to CU2, each consisting of longitudinal 1 pixel× lateral 31 pixels, are placed in this order from the upper end of the range of the specific area. Area CU3 consisting of longitudinal 4 pixels×lateral 31 pixels is placed adjacent to area CU2 at the lower end of the range of the specific area. The division shown in FIG. 15(a) is used so as to prevent misjudgments in the dot discrimination at the lower portion of an image.

Moreover, in FIG. 15(b), the range of the specific area (FIG. 7) is divided into four areas CT0 to CT3. Areas CT0 to CT2, each consisting of longitudinal 1 pixel×lateral 31 pixels, are placed in this order from the lower end of the range of the specific area. Area CT3 consisting of longitudinal 4 pixel×lateral 31 pixels is placed adjacent to area CT2 at the upper end of the range of the specific area. The division shown in FIG. 15(b) is used so as to prevent misjudgments in the dot discrimination at the upper portion of an image.

Then, with respect to the areas shown in FIGS. 15(a) and 15(b), the following conditional processes are carried out so as to calculate the above-mentioned parameters RPJ and RDJ.

Conditional expressions (M) for judgements on the presence of an extremal value:
at the time of maximum,
RPJ=1(J=0,1,2) if the following conditions are satisfied:

(CTP0>THCT0 and CTP1<THCT1 and CTP2<THCT2 and CTP3<THCT3)

or ($CUP0>THCU0$ and $CUP1<THCU1$ and $CUP2<THCU2$ and $CUP3<THCU3$)

RPJ=0(J=0,1,2) in cases other than the above-mentioned, and at the time of minimum,
RDJ=1(J=0,1,2) if the following conditions are satisfied:

($CTD0>THCT0$ and $CTD1<THCT1$ and $CTD2<THCT2$ and $CTD3<THCT3$) or ($CUD0>THCU0$ and $CUD1<THCU1$ and $CUD2<THCU2$ and $CUD3<THCU3$)

RDJ=0(J=0,1,2) in cases other than the above-mentioned,
where
CTP0 to 3: the number of CP=1 in areas CT0 to 3,
CTD0 to 3: the number of CD=1 in areas CT0 to 3,
CUP0 to 3: the number of CP=1 in areas CU0 to 3,
CUD0 to 3: the number of CD=1 in areas CU0 to 3,
THCT0 to 3: threshold (set value by register: predetermined), and
THCU0 to 3: threshold (set value by register: predetermined).

Next, based upon the results thus obtained, the above-mentioned parameter RJ is calculated by an OR circuit as a logical add of the parameter RPJ and parameter RDJ.

RJ=(RPJ)OR(RDJ)

As described the above-mentioned, with respect to each of the colors, the second inspection circuit 20, which has received the flag signal AVEK, the run-length PRUN, the degree of busy PBUSY inputted from the maximum-minimum pixel calculation circuit 12 and the maximum-minimum pixel peripheral information detection circuit 13 of the first inspection circuit 10C, outputs the results P1 of calculation for periodicity A, the results P2 of calculation for periodicity B, a pixel weight switching signal WS and a dot classification flag PDWE to the feature amount extraction circuit 30. Moreover, during this process, the pixel weight switching signal calculation circuit 21C counts the weight ratio WS so as to find periodicity A and periodicity B; thus, the feature parameters for periodicity are calculated.

Figure 4:
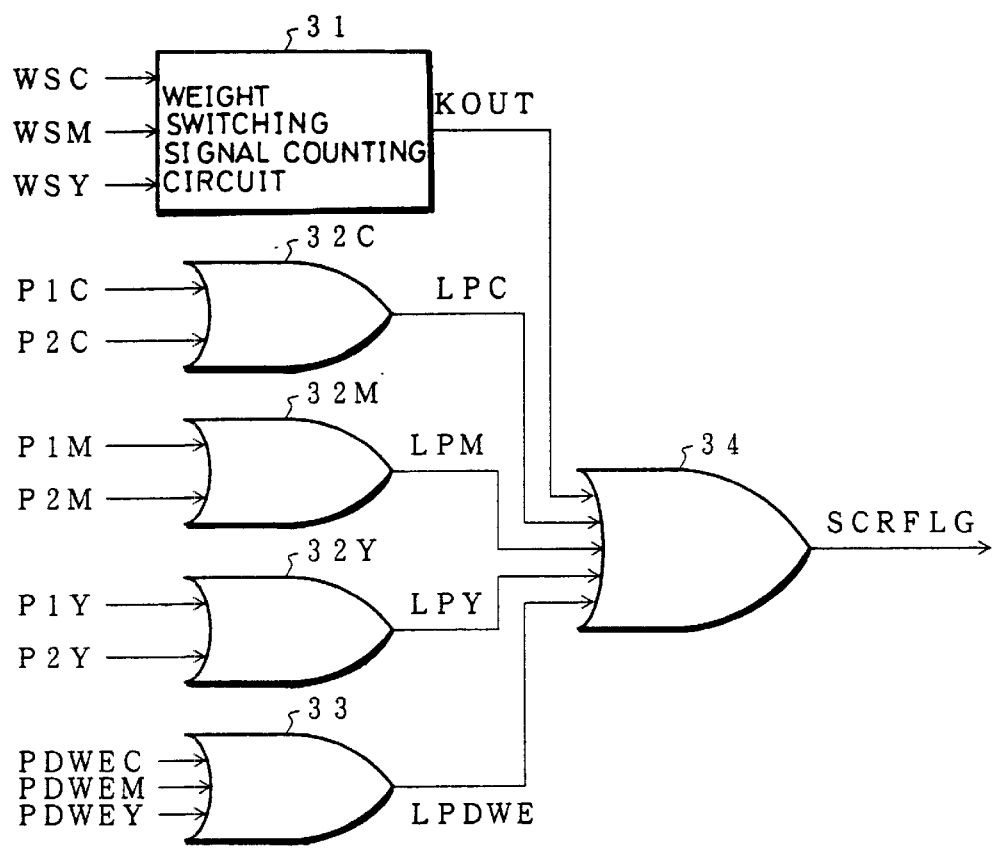
FIG. 4 is a block diagram that schematically shows the construction of a feature amount extraction circuit in the first image area discrimination circuit shown in FIG. 1.

As illustrated in FIG. 4, the above-mentioned feature amount extraction circuit 30 is constituted by the weight switching signal counting circuit 31, an OR circuit 32C, an OR circuit 32M, an OR circuit 32Y, an OR circuit 33 and an OR circuit 34.

The above-mentioned feature amount extraction circuit 30, which has received the results P1 of calculation for periodicity A, the results P2 of calculation for periodicity B, the pixel weight switching signal WS and the dot classification flag PDWE inputted from the second inspection circuits 20C, 20M and 20Y, finds a dot discrimination result flag SCRFLG, and outputs this to the correction circuit 40.

FIGS. 10(a) to 10(c) are explanatory drawings each of which shows a pixel weight distribution for each plane in weight ratio setting that is carried out in the weight switching signal count circuit 31. Based upon the pixel weight switching signal WS(WSC, WSM and WSY) (see FIG. 10(a)) obtained by the pixel weight switching signal calculation circuit (pixel weight switching signal calculation means) 21 (21C, 21M, 21Y) of the second inspection circuit 20 for each plane, the above-mentioned weight switching signal count circuit 31 finds a pixel weight W (WC, WM, WY)(FIG. 10(b)) for each plane in accordance with the following conditional expressions (N), and represents its maximum value as a pixel weight WMAX on one plane (FIG. 10(b)). Here, the square located on the upper left corner of each plane represents a unit of one pixel having the value of the pixel weight switching signal WS or the pixel weight W.

Conditional expressions (N) for pixel weight judgments (N):

WMAX=MAX(WC,WM,WY), where
W=0(when WS=0)
W=0(when WS=1 or 4)
W=3(when WS=2 or 5)
W=1(when WS=3 or 6).

Moreover, the weight switching signal count circuit 31 finds the greatest number of continuous lines NRUN which makes W=0 in the pixel weight of 7 continuous pixels in the sub scanning direction (longitudinal direction) for each of areas AS0, AS1 and AS2 shown in FIG. 11. Then, it finds a dot discrimination flag KOUT (1 bit) that represents the results of dot discrimination based upon the following expressions (O), and outputs this to the OR circuit 34.

Conditional expressions (O) for judgments on weight switching signal count flags:

If NRUN≦THRUN,
  the number of W=1 of PDSUM0=AREA0/Ks (where, when PDSUM0≧128,PDSUM0=127),
  the number of W=1 of PDSUM1=AREA1/Ks (where, when PDSUM1≧128,PDSUM1=127),
  the number of W=1 of PDSUM2=AREA2/Ks (where, when PDSUM2≧128,PDSUM2=127), If NRUN>THRUN,
  the number of W=1 of PDSUM0=AREA0/Ks (where, when PDSUM0≧128,PDSUM0=127),
  the number of W=1 of PDSUM1=AREA1/Ks (where, when PDSUM1≧128,PDSUM1=127),
  the number of W=1 of PDSUM2=AREA2/Ks (where, when PDSUM2≧128,PDSUM2=127), where
Ks=2 or 4 (set value of register)
PDSUM=(PDSUM0+PDSUM1*X+PDSUM2)
X=2 or 3 or 4 (set value of register)

$$KOUT = 1 \text{(when } PDSUM > THCSUM)$$
$$= 0 \text{(other than the above)}.$$

The above-mentioned OR circuit 33 finds a logical add LPDWE of dot classification flags PDWEC, PDWEM and PDWEY that are inputted from the weight ratio setting circuits 22C, 22M and 22Y for each plane, and outputs this to the OR circuit 34.

The above-mentioned OR circuit 34, which has received the dot discrimination flag KOUT from the weight switching signal count circuit 31, the logical adds LPC, LPM, LPY from the OR circuit 32C, 32M, 32Y and the logical add LPDWE from OR circuit 33 as inputs, calculates a dot discrimination result flag SCRFLG (1 bit) that is a logical add of these, and outputs this to the correction circuit 40.

Here, by inserting a selector on the signal line of the feature amount extraction circuit 30, it becomes possible to alternate the number and kinds of the amount of feature to be used depending on specifications of the image data and the image-processing apparatus.

As described the above-mentioned, the feature amount extraction circuit 30, which has received the results P1 of calculation for periodicity A, the results P2 of calculation for periodicity B, the pixel weight switching signal WS and the dot classification flag PDWE as inputs respectively from the pixel weight switching signal calculation circuit 21, the weight ratio setting circuit 22, the first periodicity detection circuit 23 and the second periodicity detection circuit 24 of the second inspection circuit 20, calculates a dot discrimination result flag SCRFLG, and outputs this to the correction circuit 40.

The above-mentioned correction circuit 40 extracts the feature parameters for high density, the feature parameters for granulation and the feature parameters for periodicity, and corrects the results of image area discrimination obtained by the respective factors for each block. Thus, the application of the correction circuit 40 makes it possible to reduce misjudgments on the final image area discrimination.

Figure 5:
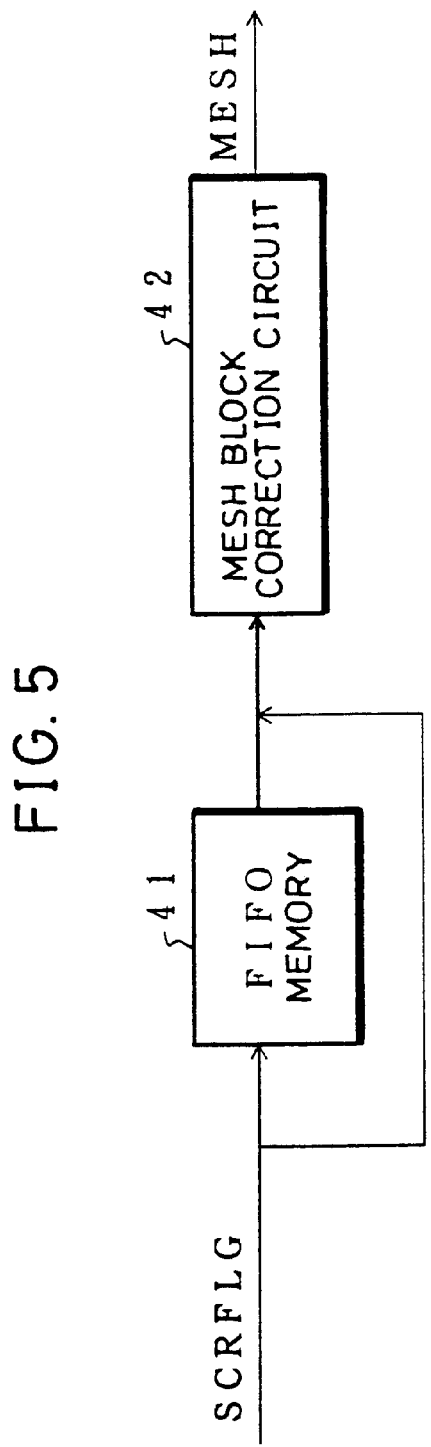
FIG. 5 is a block diagram that schematically shows the construction of a correction circuit in the first image area discrimination circuit shown in FIG. 1.

As illustrated in FIG. 5, the above-mentioned correction circuit 40 is constituted by an FIFO memory 41 and a dot block correction circuit 42.

The above-mentioned dot block correction circuit 42, which has received the dot discrimination result flag SCR-FLG from the FIFO memory 41, calculates a dot discrimination result MESH, and outputs this. Here, to the dot block correction circuit 42 is inputted as a bus a signal that is inputted together with the signal from the above-mentioned FIFO memory 41 on a real-time basis.

Figure 16A:
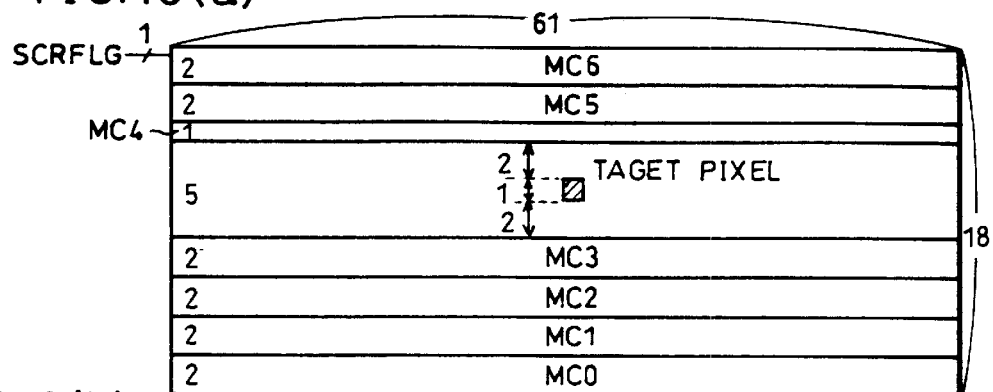
FIG. 16(a) is an explanatory drawing that shows a calculation area for feature amount used for a dot block correction that is carried out in the first image area discrimination circuit shown in FIG. 1.
Figure 16B:
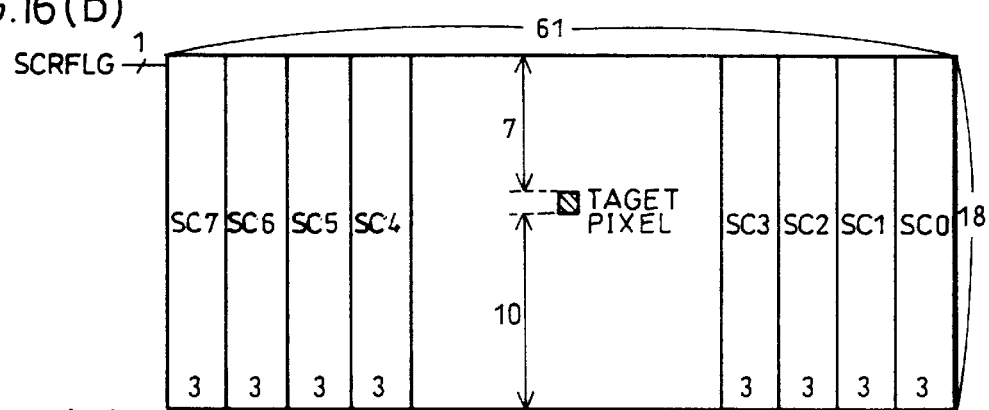
FIG. 16(b) is an explanatory drawing that shows a calculation area for feature amount used for a dot block correction that is carried out in the first image area discrimination circuit shown in FIG. 1.
Figure 16C:
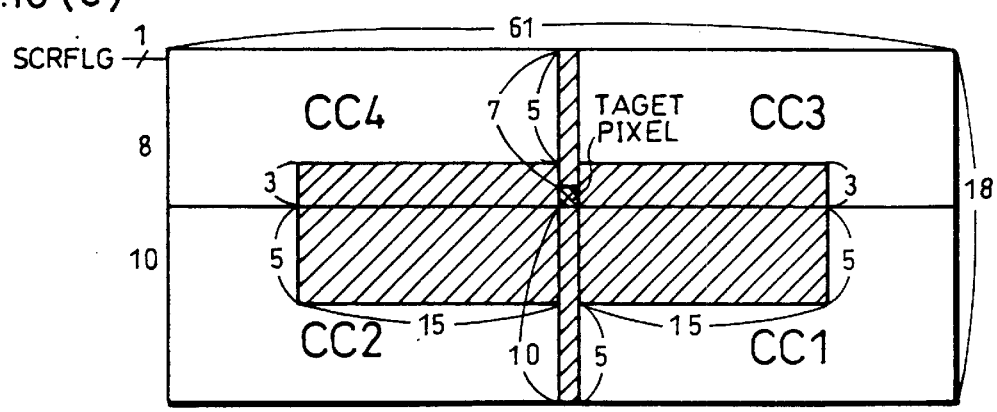
FIG. 16(c) is an explanatory drawing that shows a calculation area for feature amount used for a dot block correction that is carried out in the first image area discrimination circuit shown in FIG. 1.

In this case, dot block correction areas, as shown in FIGS. 16(a) through 16(c) and FIGS. 17(a) through 17(c), are provided so as to be used for processes in the dot block correction circuit 42. With respect to the dot block correction areas, two kinds of matrix modes, each having three kinds of areas, are provided. Here, with respect to the modes of FIGS. 16(a) to 16(c) and FIGS. 17(a) to 17(c), those modes of FIGS. 16(a) to 16(c) are superior in precision, while those modes of FIGS. 17(a) to 17(c) are superior in cost performance. Here, the dot block correction area of each mode is set based on the target pixel.

FIGS. 16(a) through 16(c) show the dot block correction areas in the mode in which a block correction is carried out on a matrix consisting of 18×61 pixels. Here, in FIGS. 16(a) to 16(c), the target pixel is positioned at the 8th pixel from the top in the central column (the 31th pixel from right side) in each of the areas including the target pixel.

FIG. 16(a) shows an area that is divided so as to correct dot blocks in the main scanning direction. More specifically, the area of 18×61 pixels is divided into 8 stages in the main scanning direction (lateral direction). In other words, in the area of 18×61 pixels, areas MC0 to MC3 with a two-pixel width, an area with a five-pixel width including the target pixel, area MC4 with a one-pixel width, and areas MC5, MC6 having a two-pixel width, are successively arranged from the bottom along the sub-scanning direction. Here, the target pixel is positioned at the center of each area containing the target pixel.

FIG. 16(b) shows an area that is divided so as to correct dot blocks in the sub scanning direction. More specifically, the area of 18×61 pixels is divided into 9 columns in the sub-scanning direction (longitudinal direction). More specifically, in the area of 18×61 pixels, areas SC0 to SC3 having a three-pixel width, an area having a 37-pixel width including the target area, and areas SC4 to SC7 having a three-pixel width are arranged from the right side along the main scanning direction.

FIG. 16(c) shows an area that is divided so as to correct dot blocks in the main scanning direction and the sub scanning direction in a combined manner. More specifically, the area of 18×61 pixels is divided into an area having a 30-pixel width from the right end and an area having a 30-pixel width from the left end in the main scanning direction, and these areas are further divided into areas, each having a 10-pixel width, and areas, each having a 8-pixel width, from the bottom along the sub-scanning direction. Moreover, in the center of the area having 18×61 pixels, a proximity area having 8×31 pixels, the number of pixels of which is not counted, is set. In other words, in the area having 18×61 pixels, the following areas are placed: an L-letter-shape area CC1 obtained by excluding the proximity area having 5×15 pixels on the upper left from the area having 10×30 pixels on the lower right, an L-letter-shape area CC2 obtained by excluding the proximity area having 5×15 on the upper right from the area having 10×30 pixels on the lower left, an L-letter-shape area CC3 obtained by excluding the proximity area having 3×15 pixels on the lower left from the area having 8×30 pixels on the upper right, and an L-letter-shape area CC4 obtained by excluding the proximity area having 3×15 pixels on the lower right from the area having 8×30 pixels on the upper left.

FIGS. 17(a) through 17(c) show dot block correction areas in a mode in which a block correction is carried out on a matrix consisting of 14×61 pixels. Here, in FIGS. 17(a) to 17(c), the target pixel is positioned on the 4th pixel from the top in the center column (the 31th pixel from the right side) in the area including the target pixel.

FIG. 17(a) shows an area that is divided so as to correct dot blocks in the main scanning direction. More specifically, the area of 14×61 pixels is divided into 8 stages in the main scanning direction (lateral direction). In other words, in the area of 14×61 pixels, areas MC0 to MC3 with a two-pixel width, an area with a three-pixel width including the target pixel, and areas MC4 to MC6 having a one-pixel width, are successively arranged from the bottom along the sub-scanning direction.

FIG. 17(b) shows an area that is divided so as to correct dot blocks in the sub-scanning direction. More specifically, the area of 14×61 pixels is divided into 9 columns in the sub-scanning direction (longitudinal direction). More specifically, in the area of 14×61 pixels, areas SC0 to SC3 having a three-pixel width, an area having a 37-pixel width including the target area, and areas SC4 to SC7 having a three-pixel width are arranged from the right side along the main scanning direction.

FIG. 17(c) shows an area that is divided so as to correct dot blocks in the main scanning direction and the sub scanning direction in a combined manner. More specifically, the area of 14×61 pixels is divided into an area having a 30-pixel width from the right end and an area having a 30-pixel width from the left end in the main scanning direction, and these areas are further divided into areas, each having a 10-pixel width, and areas, each having a 4-pixel width, from the bottom along the sub-scanning direction. Moreover, in the center of the area having 14×61 pixels, a proximity area having 5×31 pixels, the number of pixels of which is not counted, is set. In other words, in the area having 14×61 pixels, the following areas are placed: an L-letter-shape area CC1 obtained by excluding the proximity area having 5×15 pixels on the upper left from the area having 10×30 pixels on the lower right, an L-letter-shape area CC2 obtained by excluding the proximity area having 5×15 on the upper right from the area having 10×30 pixels on the lower left, a rectangular area CC3 having 4×30 pixels on the upper right, and a rectangular area CC4 having 4×30 pixels on the upper left.

Here, the dot block correction circuit 42 is a circuit for making a judgement as to whether or not the target pixel belongs to a dot area. Therefore, the image data (8 bits) has to be maintained until the results of the judgement is obtained. In other words, line memories corresponding to 8 lines are required in the cases of FIGS. 16(a) to 16(c), and line memories corresponding to 4 lines are required in the cases of FIGS. 17(a) to 17(c). Therefore, in order to make the number of line memories that tend to increase costs as small as possible, within a range that gives no adverse effects on the results of the judgement, those dot block correction areas are set so as to allow the target pixel to be located higher than the center.

Upon actually carrying out a dot block correction, the dot block correction circuit 42, based upon which priority should be given to, the processing speed or the high image quality, with respect to the two kinds of modes (FIGS. 16(a) through 16(c))(FIGS. 17(a) through 17(c)), selects and uses either of them. In the three kinds of areas contained in the dot block correction area of the selected mode, the number of pixels that make the dot discrimination result flag SCRFLG=1 is found. Then, if the number satisfies the following conditional expressions (P), the dot discrimination result MESH is defined as "1", and in the other cases, it is defined as "0"; thus, the final output is formed. In other words, if the dot discrimination result MESH=1, the corresponding pixel is judged as a dot.

Conditional expressions (P) for dot discrimination:

(MC0>THMC0 and MC1>THMC1 and MC2>THMC2 and MC3>THMC3)

or (MC4>THMC4 and MC5>THMC5 and MC6>THMC6)

or (SC0>THSC0 and SC1>THSC1 and SC2>THSC2 and SC3>THSC3)

or (SC4>THSC4 and SC5>THSC5 and SC6>THSC6 and SC7>THSC7)

or (CC1>THCC1 and CC2>THCC2 and CC3>THCC3 and CC4>THCC4), where

THMC0 to 6: threshold (set value by register: predetermined)

THSC0 to 7: threshold (set value by register: predetermined)

THCC1 to 4: threshold (set value by register: predetermined).

Here, the above-mentioned threshold values are set so as to carry out a filling process on a data-loss portion in the dot area and an extension process on an edge portion therein, and also to carry out an eliminating process on a maldetection portion therein, with respect to the results of discrimination prior to the dot-block correction process. The settable range, the appropriate set range, and the optimal value for each of the above-mentioned threshold values, which are set in the present embodiment, are described as follows:

Threshold values of FIGS. 16(a) to 16(c)

| | Settable Range | Optical Value | Appropriate Set Value |
|---|---|---|---|
| THMC0 | 0 to 122 | 100 | optimal value ± 5 |
| THMC1 | 0 to 122 | 100 | optimal value ± 5 |
| THMC2 | 0 to 122 | 0 | optimal value ± 5 |
| THMC3 | 0 to 122 | 0 | optimal value ± 5 |
| THMC4 | 0 to 61 | 0 | optimal value ± 5 |
| THMC5 | 0 to 122 | 100 | optimal value ± 5 |
| THMC6 | 0 to 122 | 100 | optimal value ± 5 |
| THSC0 | 0 to 54 | 45 | optimal value ± 5 |
| THSC1 | 0 to 54 | 45 | optimal value ± 5 |
| THSC2 | 0 to 54 | 33 | optimal value ± 5 |
| THSC3 | 0 to 54 | 0 | optimal value ± 5 |
| THSC4 | 0 to 54 | 0 | optimal value ± 5 |
| THSC5 | 0 to 54 | 33 | optimal value ± 5 |
| THSC6 | 0 to 54 | 45 | optimal value ± 5 |
| THSC7 | 0 to 54 | 45 | optimal value ± 5 |
| THCC1 | 0 to 225 | 160 | optimal value ± 5 |
| THCC2 | 0 to 225 | 160 | optimal value ± 5 |
| THCC3 | 0 to 195 | 160 | optimal value ± 5 |
| THCC4 | 0 to 195 | 160 | optimal value ± 5 |

Threshold values of FIGS. 17(a) to 17(c)

| | Settable Range | Optical Value | Appropriate Set Value |
|---|---|---|---|
| THMC0 | 0 to 122 | 100 | optimal value ± 5 |
| THMC1 | 0 to 122 | 100 | optimal value ± 5 |
| THMC2 | 0 to 122 | 0 | optimal value ± 5 |
| THMC3 | 0 to 122 | 0 | optimal value ± 5 |
| THMC4 | 0 to 61 | 0 | optimal value ± 5 |
| THMC5 | 0 to 61 | 50 | optimal value ± 5 |
| THMC6 | 0 to 61 | 50 | optimal value ± 5 |
| THSC0 | 0 to 42 | 33 | optimal value ± 5 |
| THSC1 | 0 to 42 | 33 | optimal value ± 5 |
| THSC2 | 0 to 42 | 21 | optimal value ± 5 |
| THSC3 | 0 to 42 | 0 | optimal value ± 5 |
| THSC4 | 0 to 42 | 0 | optimal value ± 5 |
| THSC5 | 0 to 42 | 21 | optimal value ± 5 |
| THSC6 | 0 to 42 | 33 | optimal value ± 5 |
| THSC7 | 0 to 42 | 33 | optimal value ± 5 |
| THCC1 | 0 to 225 | 145 | optimal value ± 5 |
| THCC2 | 0 to 225 | 145 | optimal value ± 5 |
| THCC3 | 0 to 120 | 75 | optimal value ± 5 |
| THCC4 | 0 to 120 | 75 | optimal value ± 5 |

Therefore, the correction circuit 40, which has received the dot discrimination result flag SCRFLG from the OR circuit 34 of the feature amount extraction circuit 30, outputs the dot discrimination result MESH to the image-processing section 2.

As described above, in the image-processing apparatus of the present embodiment, upon discriminating a characteristic of an area to which each pixel on an image belongs from multi-value image data C, M and Y obtained by scanning a document, the feature parameters for high density, the feature parameters for granulation and the feature parameters for periodicity are extracted, and based upon these respective factors, the image area discrimination is carried out.

With this arrangement, the above-mentioned image-processing apparatus extracts respective feature parameters from a specific area consisting of a target pixel and adjacent pixels with respect to the multi-value image data C, M and Y obtained by scanning a document by a CCD sensor, etc., and based upon these parameters, it is possible to more positively discriminate whether the area on the image to which the target pixel belongs is a character area, a dot area or a photograph area. Thus, it becomes possible to carry out better image processing and consequently to achieve high image quality.

Moreover, the above-mentioned image-processing apparatus is provided with a maximum-minimum detection circuit which detects a maximum-minimum pixel from the multi-value image data obtained by scanning a document, for each of the color components C, M and Y; thus, the feature parameters for high density are calculated. With this arrangement, the above-mentioned image-processing apparatus detects a maximum-minimum pixel for each of the color components C, M and Y of image data, and can discriminate character, dot and photograph areas based upon the feature parameters for high density.

Moreover, the above-mentioned image-processing apparatus is provided with a maximum-minimum pixel peripheral information calculation circuit which extracts a run-length and the degree of busy from a maximum-minimum pixel obtained from the maximum-minimum detection circuit for each of the color components C, M and Y of image data; thus, the feature parameters for granulation are calculated. With this arrangement, the above-mentioned image-processing apparatus extracts a run-length and the degree of busy from a maximum-minimum pixel for each of the color components C, M and Y of image data so that it can discriminate dot areas and the other areas (continuous dots and lines) based upon the feature parameters for granulation.

Furthermore, the above-mentioned image-processing apparatus pixel is provided with a weight switching signal calculation circuit which extracts a pixel weight switching signal from the run-length and the degree of busy obtained from the maximum-minimum pixel peripheral information calculation circuit, for each of the color components C, M and Y of image data.

With this arrangement, the above-mentioned image-processing apparatus extracts a pixel weight switching signal from the run-length and the degree of busy, for each of the color components C, M and Y of image data, and by counting the ratio of weight within a specific area, extracts the amount of feature of image data so that it becomes possible to discriminate character, dot and photograph areas.

Moreover, the above-mentioned image-processing apparatus is provided with a periodicity calculation circuit which extracts periodicity for each of the color components C, M and Y of image data of a pixel weight switching signal obtained from the pixel weight switching signal calculation circuit; thus, the feature parameters for periodicity are calculated.

With this arrangement, the above-mentioned image-processing apparatus extracts periodicity for each of the color components C, M and Y of image data of the pixel weight switching signal, and by calculating the feature parameters for periodicity, confirms the periodicity, if the relevant portion is dot, thereby making it possible to discriminate the character, dot and photograph areas.

Furthermore, the above-mentioned image-processing apparatus is provided with a pixel weight-applying circuit for composing pixel weight switching signals obtained from the pixel weight switching signal calculation circuit, for each of the color components C, M and Y of image data; thus, the amount of features for area discrimination is extracted.

With this arrangement, the above-mentioned image-processing apparatus composes the pixel weight switching signals, and extracts the amount of features for area discrimination, thereby making it possible to discriminate the character, dot and photograph areas.

In the above-mentioned image-processing apparatus, upon discriminating a characteristic of an area to which each pixel on an image belongs from multi-value image data obtained by scanning a document, the feature parameter for high density, the feature parameter for granulation and the feature parameter for periodicity are extracted, and among these respective factors, the parameter to be used for discriminating an image area is selected depending on image data.

With this arrangement, the above-mentioned image-processing apparatus selects the parameter to be used for discriminating an image area depending on image data so that it becomes possible to discriminate the character, dot and photograph areas with respect to various image data efficiently at high speeds.

Moreover, the above-mentioned image-processing apparatus is provided with a block correction circuit which, upon discriminating a characteristic of an area to which each pixel on an image belongs from multi-value image data obtained by scanning a document, extracts the feature parameter for high density, the feature parameter for granulation and the feature parameter for periodicity, and subjects the results of image-area discrimination obtained by the respective factors to a block correction.

With this arrangement, the above-mentioned image-processing apparatus extracts the respective parameters and subjects the results of image-area discrimination obtained by the respective factors to a block correction, thereby making it possible to reduce misjudgments on the final image area discrimination.

The image-processing apparatus in accordance with the present invention is preferably provided with a maximum-minimum pixel calculation means which, with respect to density values of pixels within a specific area that consists of a target pixel in image data and pixels adjacent to the target pixel, finds an average density value of pixels located within the specific area, the sum of density differences, that is, the sum of absolute values of differences between the target pixel and the peripheral pixels extracted within the specific area, and the number of density coincident pixels that is the number of the peripheral pixels having the same density value as the target pixel, for each of the color components, so that it judges whether or not the density value of the target pixel is a maximum value or a minimum value.

In the above-mentioned arrangement, with respect to inputted image data, the average density value, the sum of density differences and the number of density coincidence pixels are extracted by the maximum-minimum pixel calculation means from the specific area consisting of the target pixel and the pixels adjacent thereto so that it is judged whether or not the density value of the target pixel is a maximum value or a minimum value.

Therefore, it becomes possible to discriminate whether the area to which the target pixel on an image belongs is a character area, a dot area or a photograph area with high precision. Consequently, it becomes possible to carry out an optimal image processing on the area to which the target pixel on the image belongs, and consequently to achieve high image quality.

Moreover, the image-processing apparatus in accordance with the present invention is preferably provided with a maximum-minimum pixel peripheral information detection means which calculates a run-length that is a maximum value of the number of pixels that continue in the main scanning direction or in the sub scanning direction with respect to pixels having not less than the standard value or not more than the standard value, the standard value being defined based upon the average density value, and the degree of busy that is the sum of absolute values of differences between the respective pixels having the run-length and the target pixel, from the target pixel having the maximum value or the minimum value among the density values within the above-mentioned specific area, obtained by the above-mentioned maximum-minimum pixel calculation means.

In the above-mentioned arrangement, by using the maximum-minimum pixel peripheral information detection means, the run-length and the degree of busy are extracted based upon the maximum/minimum pixel of image data for each of the respective colors.

Therefore, it becomes possible to discriminate whether the area to which the target pixel on an image belongs is a dot area or an area other than the dot area, having continuous dots or lines, with high precision. Consequently, it becomes possible to carry out an optimal image processing on the area to which the target pixel on the image belongs, and consequently to achieve high image quality.

Furthermore, the image-processing apparatus of the present invention is preferably provided with: a pixel weight switching signal calculation means which, based upon the run-length and the degree of busy of the target pixel having the maximum value or the minimum value of the density values within the above-mentioned specific area, obtained by the above-mentioned maximum-minimum pixel calculation means and the maximum-minimum pixel peripheral information detection means, extracts a pixel weight switching signal for each of the color components; and a periodicity calculation means which detects the periodicity of dots of image data by counting pixels not less than the standard value or not more than the standard value based on the pixel weight switching signal within a predetermined counting area.

With the above-mentioned arrangement, the pixel weight switching signal calculation means extracts a pixel weight switching signal for image data of each color component based upon the run-length and the degree of busy, and extracts the amount of feature of the image data by counting the ratio of weight within a certain area, so that it becomes possible to discriminate the character, dot and photograph areas. Moreover, it is possible to extract the periodicity of the pixel weight switching signal for image data of the respective components by using the periodicity calculation means.

Thus, it becomes possible to discriminate whether or not an area on an image to which the target pixel belongs is a dot area with high precision. Therefore, it is possible to carry out an optimal image processing on the area on the image to which the target pixel belongs, and consequently, to achieve high image quality.

Moreover, the image-processing method in accordance with the present invention is preferably provided with: a maximum-minimum pixel calculation process in which, with respect to density values of pixels within a specific area that consists of a target pixel in image data for each of the color components and pixels adjacent to the target pixel, an average density value of pixels located within the specific area, the sum of density differences, that is, the sum of absolute values of differences between the target pixel and the peripheral pixels extracted within the specific area, and the number of density coincident pixels that is the number of the peripheral pixels having the same density value as the target pixel, are found, so that it is possible to judge whether or not the density value of the target pixel is a maximum value or a minimum value; a maximum-minimum pixel peripheral information detection process, in which a run-length that is a maximum value of the number of pixels that continue in the main scanning direction or in the sub scanning direction with respect to pixels having not less than the standard value or not more than the standard value, the standard value being defined based upon the average density value, and the degree of busy that is the sum of absolute values of differences between the respective pixels having the run-length and the target pixel, are calculated from the target pixel having the maximum value or the minimum value among the density values within the above-mentioned specific area, obtained by the above-mentioned maximum-minimum pixel calculation process; and a periodicity calculation process in which the periodicity of dots of image data is detected by extracting a pixel weight switching signal for each of the color components based upon the run-length and the degree of busy of the target pixel having the maximum value or the minimum value of the density values within the above-mentioned specific area, obtained by the above-mentioned maximum-minimum pixel calculation process and the maximum-minimum pixel peripheral information detection process, as well as by counting pixels not less than the standard value or not more than the standard value based on the pixel weight switching signal within a predetermined counting area.

With the above-mentioned method, in the maximum-minimum pixel calculation process, with respect to inputted image data, the average density value, the sum of density differences and the number of density coincident pixels are extracted from the specific area that consists of a target pixel and pixels adjacent to the target pixel, so that it is possible to judge whether or not the density value of the target pixel is a maximum value or a minimum value. In the maximum-minimum pixel peripheral information detection process, the run-length and the degree of busy can be extracted based upon the maximum-minimum pixel of image data for each of the color components. In the pixel weight switching signal calculation process, based upon the run-length and the degree of busy, a pixel weight switching signal is extracted for each of the color components, and the amount of feature of the image data is extracted by counting the ratio of weights within a certain area so that it is possible to discriminate the character, dot and photograph areas. Moreover, in the periodicity calculation process, the periodicity is extracted for image data of each color component of the pixel weight switching signal.

Thus, it becomes possible to discriminate whether an area on an image to which the target pixel belongs is a character area, a dot area, or a photograph area, with high precision. Therefore, it is possible to carry out an optimal image processing on the area on the image to which the target pixel belongs, and consequently to achieve high image quality. Moreover, since any parameter to be used for discriminating an image area can be selected depending on image data, it is possible to efficiently discriminate the character, dot and photograph areas at high speeds in response to various image data.

Embodiment 2

Referring to FIG. 6, and FIGS. 18 through 32, the following description will discuss another embodiment of the present invention. Here, for convenience of explanation, those members that have the same functions and that are described in embodiment 1 are indicated by the same reference numerals and the description thereof is omitted. Moreover, in FIG. 18, FIG. 19 and FIGS. 22 through 27, each of the signal lines indicated by a thick line width is a signal line that can transmit multiple bits in parallel with each other.

In the image-processing apparatus of the present embodiment, based upon multi-value image data for respective color components CMY obtained by scanning an original document, a color-image area discrimination process is carried out so as to discriminate whether or not each of the areas to which respective pixels on the image belong is a black character area.

In the present embodiment, an explanation will be given of a second image area discrimination circuit 3b installed in an image area discrimination section 3 shown in FIG. 6.

Figure 18:
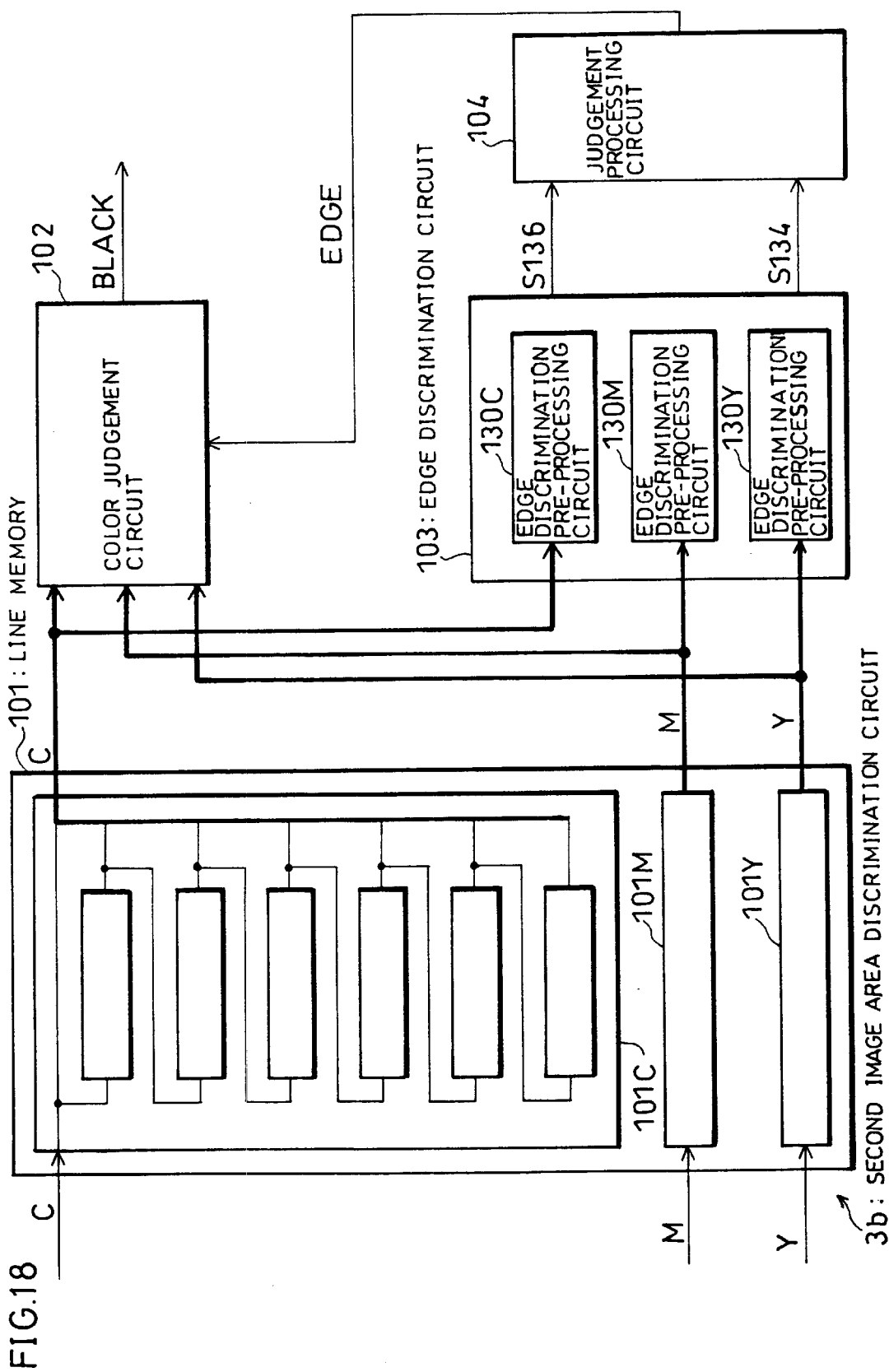
FIG. 18 is a block diagram that schematically shows the construction of a second image area discrimination circuit installed in the image-processing apparatus shown in FIG. 6.

Referring to FIG. 18, an explanation will be given of the outline of the construction of the second image area discrimination circuit 3b. The above-mentioned second image area discrimination circuit 3b is constituted by a line memory 101, a color judgment circuit 102, an edge discrimination circuit (edge discrimination means, edge discrimination process) 103 and a judgment processing circuit 104.

In the second image area discrimination circuit 3b, image data C, M, Y, which are obtained in CCD sensors 1C, 1M, 1Y of the input section 1 for each of the colors of cyan, magenta and yellow, are inputted to line memories 101C, 101M, 101Y, where they are converted to a format of 7 lines and 8 bits for each color, and then inputted to the color judgment circuit 102 and the edge discrimination circuit 103. In the edge discrimination circuit 103, an edge detection signal S134 and an edge discrimination signal S136 are found, and based upon these, the judgment processing circuit 104 calculates a result of edge discrimination EDGE, and this is inputted to the color judgment circuit 102. The color judgment circuit 102 uses image data C, M, Y from the line memories 10C, 101M, 101Y and the result of edge discrimination EDGE from the judgement processing circuit 104 as inputs, and outputs a result of black character discrimination BLACK.

The above-mentioned line memory 101 (101C, 101M, 101Y) is a line memory consisting of parallel 6 lines. The line memory 101 stores image data for respective colors C, M, Y, each having 8 bits, that is, document image data obtained by scanning an original image by using CCD sensor 1 (1C, 1M, 1Y) (FIG. 6) of the input section 1, in parallel 6 lines in synchronism with a system clock, and also always outputs image data C, M, Y of 7 lines in parallel with each other. For example, in the case of image data of A3, 600 dpi having 8 bits for each color, it is necessary to provide a capacity of approximately 7K bytes per 1 line. Here, the present embodiment exemplifies a case having a specific area of 7 pixels×7 pixels; however, the present invention is not intended to be limited thereby. Therefore, the construction of the line memory 101 also is not intended to be limited thereby.

In this manner, the line memories 101C, 101M, 101Y convert the image data C, M, Y having 8 bits for each color released from the CCD sensors 1 (1C, 1M, 1Y) into a format having 7 lines with 8 bits for each color, and outputs these to the color judgment circuit 102 and the edge discrimination circuit 103.

The above-mentioned color judgment circuit 102, which uses image data C, M, Y having 7 lines and 8 bits for each color and the edge discrimination results from the edge judgment processing circuit 104 as inputs, carries out an unification process on these so as to the results EDGE of black character discrimination BLACK.

Figure 19:
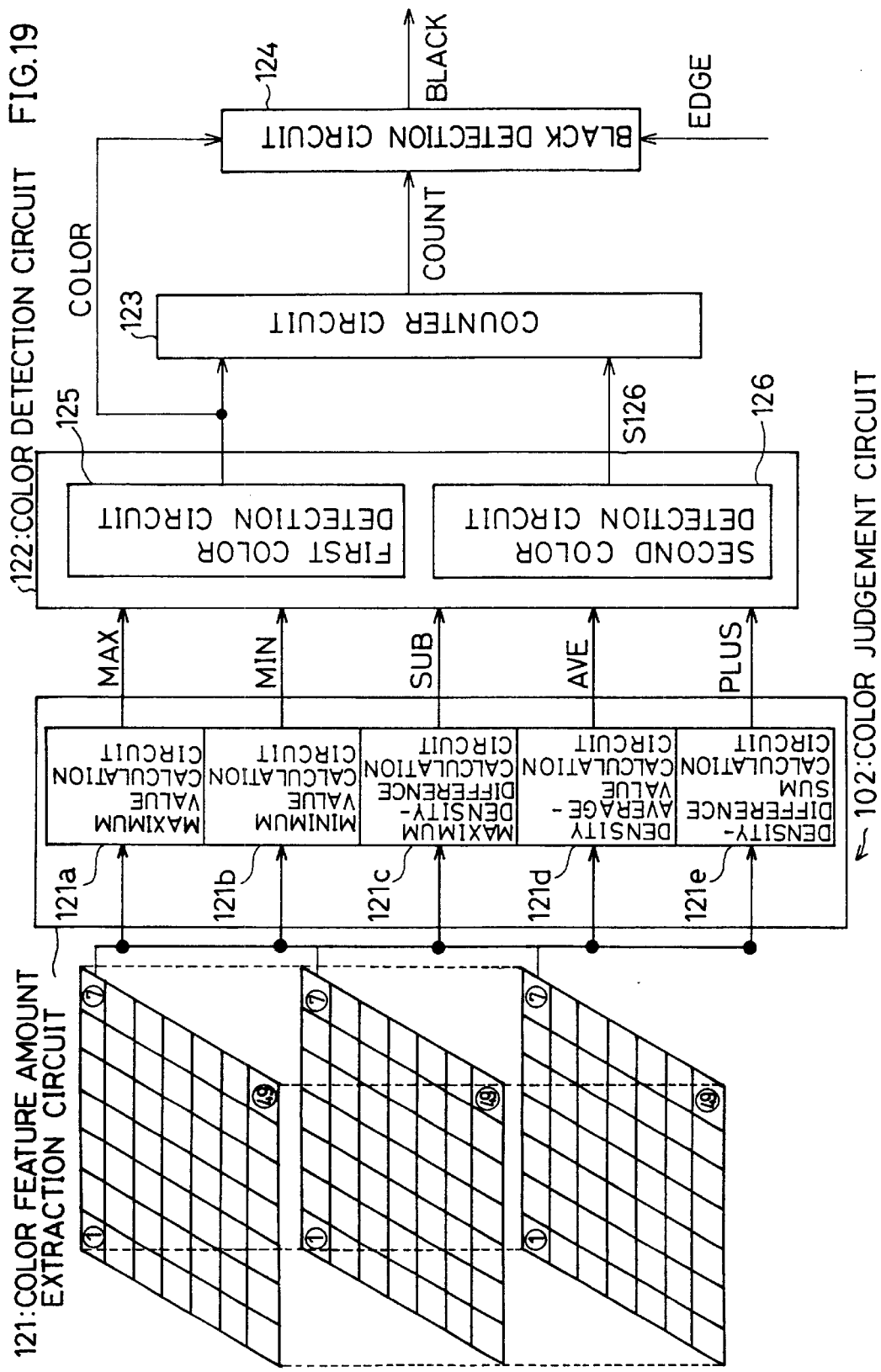
FIG. 19 is a block diagram that schematically shows the construction of a color judgement circuit in the second image area discrimination circuit shown in FIG. 18.

As illustrated in FIG. 19, the above-mentioned color judgment circuit 102 is provided with a color feature amount extraction circuit (a color feature amount extraction means) 121, a color detection circuit (color detection means, color detection process) 122, a count circuit (count means, count process) 123 and a black detection circuit (black detection means, black detection process) 124.

The above-mentioned color feature amount extraction circuit 121 is provided with a maximum value calculation circuit (maximum value calculation means) 121a, a minimum value calculation circuit (minimum value calculation means) 121b, a maximum density difference calculation circuit (maximum density difference calculation means) 121c and a density average calculation circuit (density average calculation means)121d and a density difference sum calculation circuit (density difference sum calculation means)121e.

The above-mentioned maximum value calculation circuit 121a, minimum value calculation circuit 121b, maximum density difference calculation circuit 121c, density average calculation circuit 121d and density difference sum calculation circuit 121e respectively calculate a maximum value feature amount MAX, a minimum value feature amount MIN, a maximum density difference feature amount SUB, a density difference average value feature amount AVE and a density difference sum feature amount PLUS with respect to image data that is located in the same coordinates for C, M, Y within a specific area.

Here, the maximum value calculation circuit 121a, the minimum value calculation circuit 121b and the maximum density difference calculation circuit 121c calculate a maximum value and a minimum value in the density levels of all the pixels and a maximum density difference of them within a specific area centered on the target pixel for each image data C, M, Y. The density average calculation circuit 121d finds the average of the density levels of all the pixels within the specific area. The density difference sum calculation circuit 121e finds an addition of the sum of absolute values of density level differences between pixels adjacent in the main scanning direction and the sum of absolute values of density level differences between pixels adjacent in the sub-scanning direction within the specific area.

In this case, the above-mentioned feature amounts MAX, MIN, SUB, AVE and PLUS are found by calculating and comparing image data C, M, Y on the same coordinates within an area of 7 pixel×7 pixel for each color. Therefore, the above-mentioned feature amounts are respectively found by the number of 49 (7×7).

The above-mentioned color detection circuit 122, which uses the respective feature amounts calculated in the calculation circuit 121a to 121e of the color feature amount extraction circuit 121 and image data C, M, Y as inputs, compares them with threshold values that are respectively set so that it outputs the first color detection result COLOR and the second color detection result signal S126 to the count circuit 123 and the black detection circuit 124.

As illustrated in FIG. 19, the above-mentioned color detection circuit 122 is constituted by a first color detection circuit 125 and a second color detection circuit 126.

Figure 20:
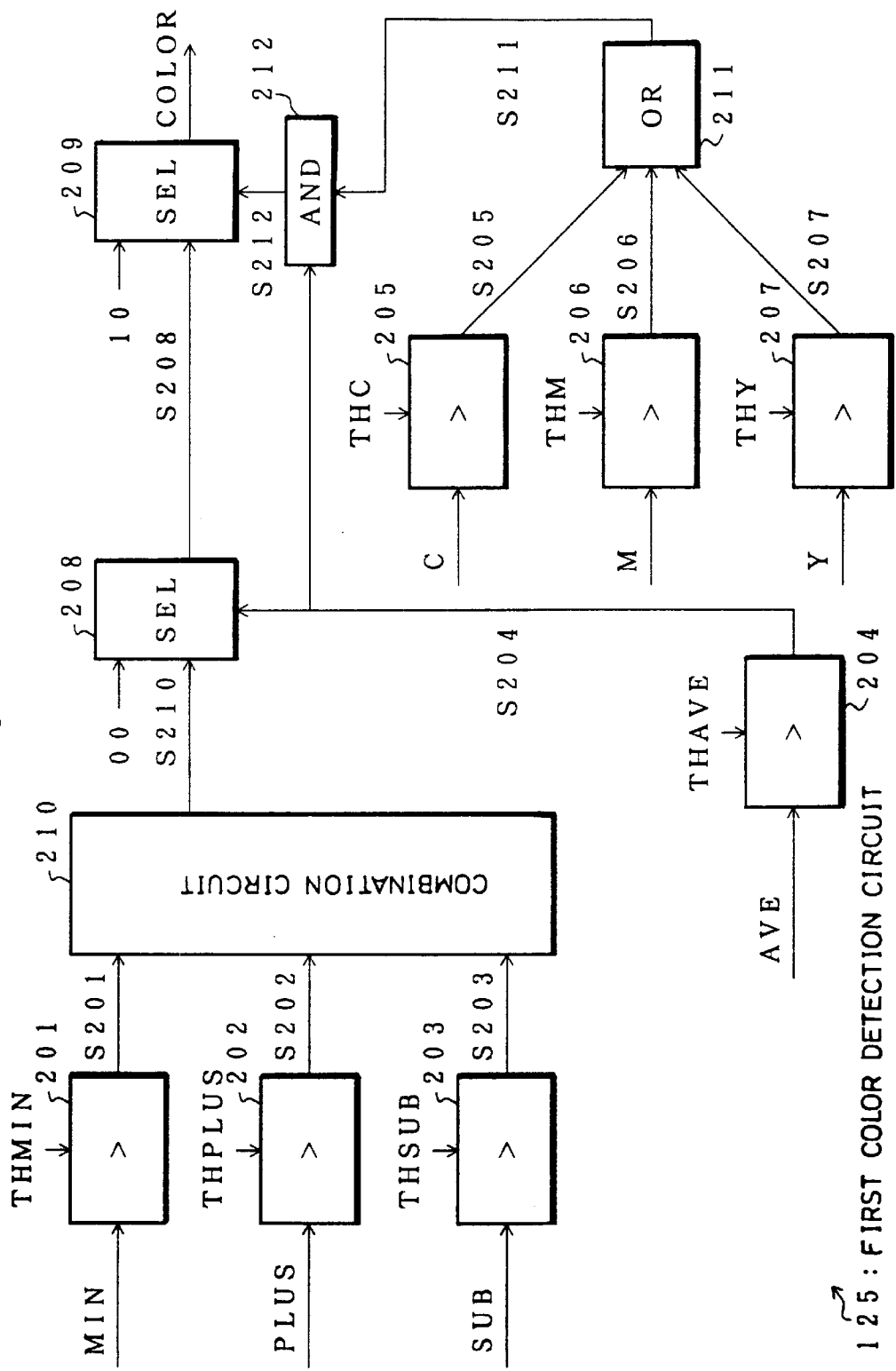
FIG. 20 is a block diagram that schematically shows the construction of a first color detection circuit in the color judgement circuit shown in FIG. 19.

As illustrated in FIG. 20, the above-mentioned first color detection circuit 125 is constituted by seven comparators 201 to 207, two selectors 208 and 209, a combination circuit 210, an OR circuit 211 and an AND circuit 212.

The above-mentioned comparator 201 compares the minimum value feature amount MIN calculated in the minimum value calculation circuit 121b with a threshold value THMIN, and in the case when the minimum value feature amount MIN is not less than the threshold value THMIN, outputs "1" and in the other cases, outputs "0" to the combination circuit 210 as a signal S201.

The above-mentioned comparator 202 compares the density difference sum feature amount PLUS calculated by the density difference sum calculation circuit 121e with the threshold value THPLUS, and in the case when the density difference sum feature amount PLUS is not less than the threshold value THPLUS, outputs "1" and in the other cases, outputs "0" to the combination circuit 210 as a signal S202.

The above-mentioned comparator 203 compares the maximum density difference feature amount SUB calculated in the maximum density difference calculation circuit 121c with a threshold value THSUB, and in the case when the maximum density difference feature amount SUB is smaller than the threshold value THSUB, outputs "1", and in the other cases, outputs "0" to the combination circuit 210 as a signal S203.

The above-mentioned compound circuit 210 uses signals S201, S202, S203 from the respective comparators 201 to 203 as inputs, and in the case when all are "1", outputs "01(2 bits)", and in the other cases, outputs "10 (2 bits)" to the selector 208 as a signal S210.

The above-mentioned comparator 204 compares the density average feature amount AVE calculated in the density average calculation circuit 121d with a threshold value THAVE, and in the case when the density average feature amount AVE is smaller than the threshold value THAVE, outputs "1", and in the other cases, outputs "0" to the selector 208 and the AND circuit 212 as a signal S204.

The above-mentioned selector 208 uses the signal S204 from the comparator 204 as a control signal, and in the case when the signal S204 is "0", outputs "01" or "10" that is the signal S210 from the combination circuit 210, and in the other cases, outputs "00" to the selector 209 as a signal S208 with 2 bits.

The above-mentioned comparator 205 compares image data C of a pixel with a threshold value THC, and in the case when the image data C is not less than the threshold value THC, outputs "1", and in the other cases, outputs "0" to the OR circuit 211 as a signal S205.

The above-mentioned comparator 206 compares image data M of a pixel with a threshold value THM, and in the case when the image data M is not less than the threshold value THM, outputs "1", and in the other cases, outputs "0" to the OR circuit 211 as a signal S206.

The above-mentioned comparator 207 compares image data Y of a pixel with a threshold value THY, and in the case when the image data Y is not less than the threshold value THY, outputs "1", and in the other cases, outputs "0" to the OR circuit 211 as a signal S207.

The above-mentioned OR circuit 211 calculates a logical OR of signals S205, S206, S207 from the respective comparators 205 to 207, and outputs the result to the AND circuit 212 as a signal S211.

The above-mentioned AND circuit 212 calculates a logical product of the signal S204 from the comparator 204 and the signal S211 from the OR circuit 211, and outputs the result to the selector 209 as a signal S212.

The above-mentioned selector 209 uses the signal S212 from the AND circuit 212 as a control signal, and in the case when the signal S212 is "1", outputs "01 (2 bits)" that is the signal S208 from the selector 208, and in the other cases, outputs "10 (2 bits)" to the count circuit 123 and the black detection circuit 124 as the first color detection result COLOR that is the output of the first color detection circuit 125.

With the above-mentioned construction, the first color detection circuit 125 compares the minimum value feature amount MIN, the maximum density difference feature amount SUB, the density difference average value feature amount AVE, the density difference sum feature amount PLUS and image data C, M, Y in the same coordinates in the specific area with the threshold values that are set for the respective factors, and outputs the first color detection result COLOR in three ways in accordance with the combinations. In other wards, "01" of the first color detection result COLOR represents "black character area (in which emphasis processing is required)", "10" thereof represents "black character area (in which no emphasis processing is required), and "00" thereof represents "area other than the black character area". That is, the first color detection result COLOR detects black portions.

Figure 21:
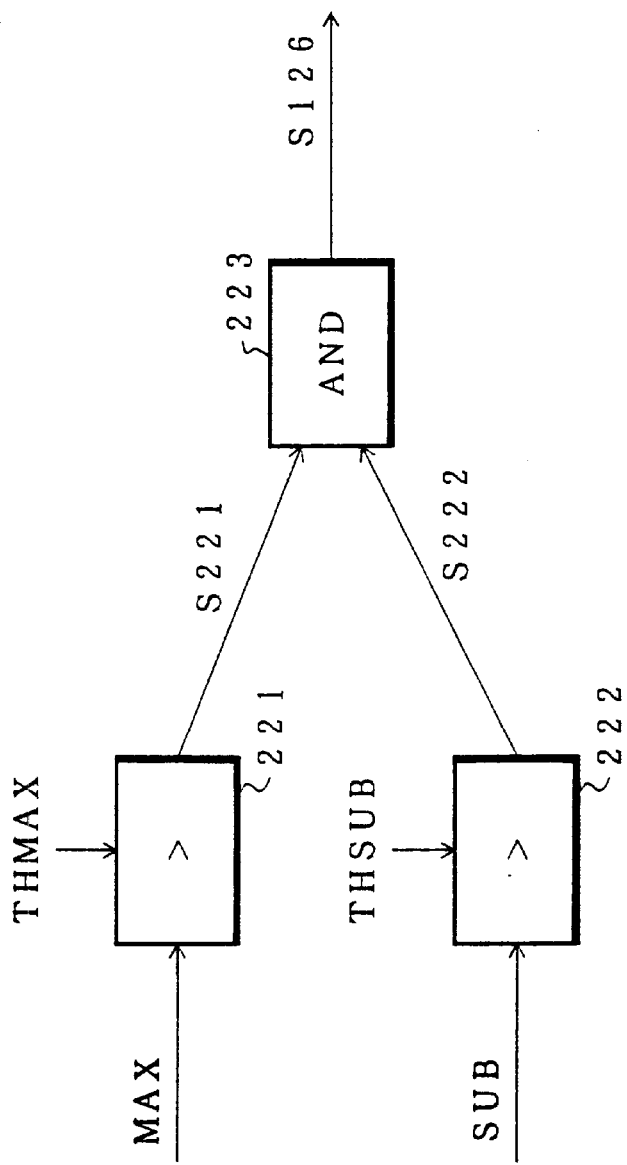
FIG. 21 is a block diagram that schematically shows the construction of a second color detection circuit in the color judgement circuit shown in FIG. 19.

As illustrated in FIG. 21, the above-mentioned second color detection circuit 126 is provided with two comparators 221 and 222, and an AND circuit 223.

The above-mentioned comparator 221 compares the maximum value feature amount MAX calculated in the maximum value calculation circuit 121a(FIG. 19) with a threshold value THMAX, and in the case when the maximum value feature amount MAX is not less than the threshold value THMAX, outputs "1", and in the other cases, outputs "0" to the AND circuit 223 as a signal S221.

The above-mentioned comparator 222 compares the maximum density difference feature amount SUB calculated in the maximum density difference calculation circuit 121c (FIG. 19) with a threshold value THSUB, and in the case when the maximum density difference feature amount SUB is not less than the threshold value THSUB, outputs "1", and in the other cases, outputs "0" to the AND circuit 223 as a signal S222.

The above-mentioned AND circuit 223 calculates a logical product of the signals signal S221 and S222 from the comparators 221 and 222, and outputs the result to the count circuit 123 as the second color detection result signal S126 that is the output of the second color detection circuit 126.

With the above-mentioned construction, the second color detection circuit 126 compares the maximum value feature amount MAX and the maximum density difference feature amount SUB in the same coordinates in the specific area with the threshold values set for the respective factors, and outputs the second color detection result signal S126 in two ways. That is, "1" of the second color detection result signal S126 represents "deep color area" and "0" thereof represents "area other than the deep color area".

The following description will discuss optimal values of the respective threshold values that are set in the first color detection circuit 125 and the second color detection circuit 126: Here, all the values are based upon the decimal notation. Moreover, with respect to the range, etc. of the numerical values, they can be all set within 8 bits (0 to 255) except the threshold value THPLUS that is a signal with 10 bits. The standard of the setting varies depending on conditions (CCD, etc.) of the image-processing apparatus.

THMIN=26,THPLUS=73,THSUB=25,THAVE=88,TH (THC,THM,THY)=25,THMAX=60

The above-mentioned count circuit 123 (FIG. 19) counts the total numbers of the first color detection results COLOR and the second color detection result signals S126 within the specific area, and outputs the count result COUNT to the black detection circuit 124. In other words, the count result COUNT shows the numbers of black and colors other than black.

The above-mentioned black detection circuit 124 (FIG. 19) uses the first color detection result COLOR from the first color detection circuit 125, the count result COUNT from the count circuit 123 and an edge discrimination result EDGE from a judgement processing circuit 104, which will be described later, as inputs, and outputs a black character discrimination result BLACK with respect to the target pixel as the result of the second image area discrimination circuit 3b.

Figure 22:
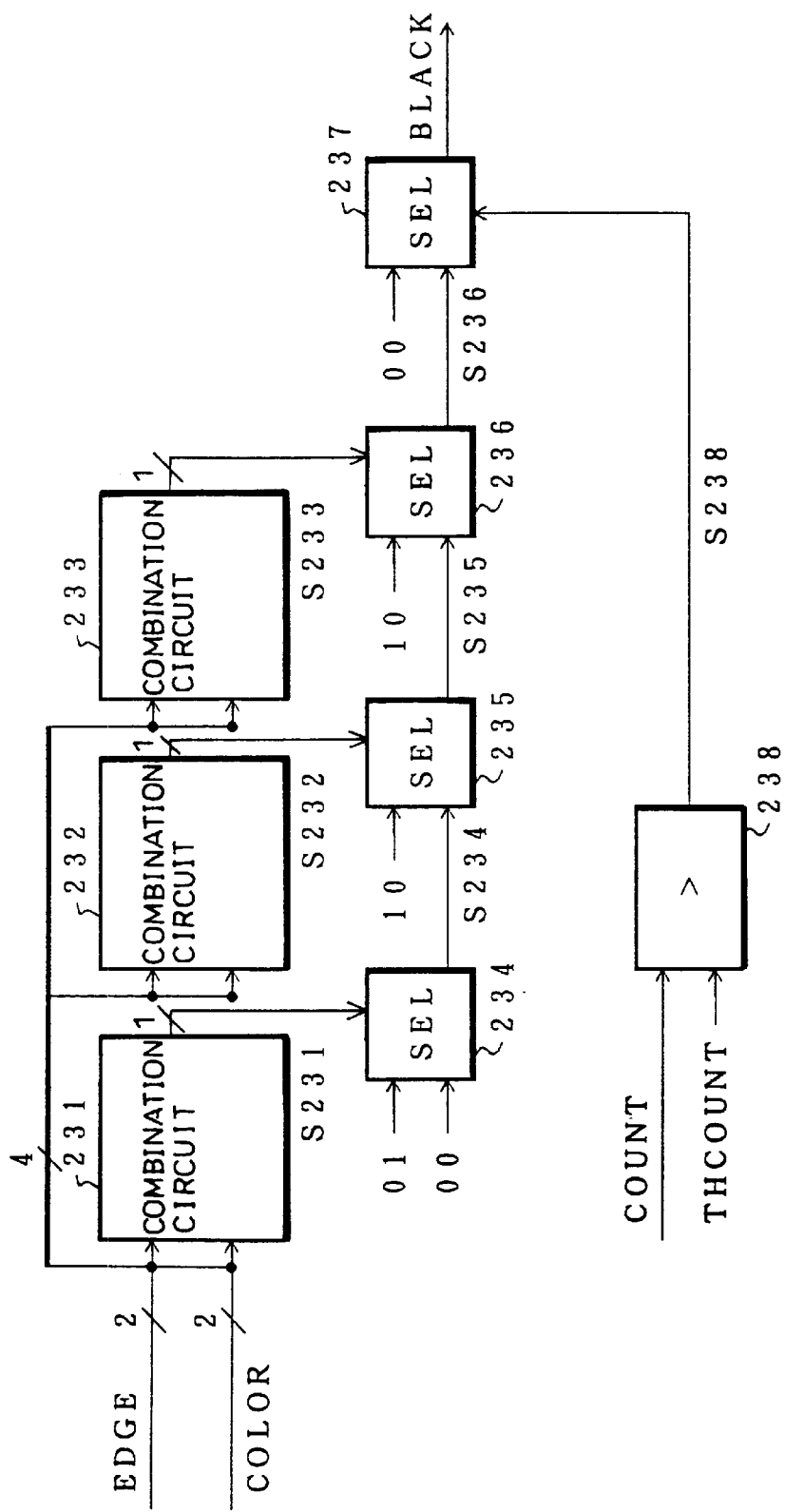
FIG. 22 is a block diagram that schematically shows the construction of a black detection circuit in the color judgement circuit shown in FIG. 19.

As illustrated in FIG. 22, the black detection circuit 124 is constituted by three combination circuits 231 to 233, four selectors 234 to 237 and a comparator 238.

The above-mentioned combination circuit 231, which uses the edge discrimination result EDGE and the first color detection result COLOR that are transmitted in a 2-bit parallel format as inputs, outputs "1" in the case when EDGE =01 and COLOR=01, and outputs "0" in the other cases, to the selector 234 as a signal S231 with one bit.

The above-mentioned combination circuit 232, which uses the edge discrimination result EDGE and the first color detection result COLOR that are transmitted in a 2-bit parallel format as inputs, outputs "1" in the case when EDGE =10 and COLOR=01, and outputs "0" in the other cases, to the selector 235 as a signal S232 with one bit.

The above-mentioned combination circuit 233, which uses the edge discrimination result EDGE and the first color detection result COLOR that are transmitted in the 2-bit parallel format as inputs, outputs "1" in the case when "EDGE=01 and COLOR=10" or when "EDGE=10 and COLOR=10", and outputs "0" in the other cases, to the selector 236 as a signal S233 with one bit.

The above-mentioned selector 234, which uses the signal S231 from the combination circuit 231 as a control signal, outputs "01 (2 bits)" in the case when the signal S231 is "1", and outputs "00 (2 bits)" in the other cases, to the selector 235 as a signal S234.

The above-mentioned selector 235, which uses the signal S232 from the combination circuit 232 as a control signal, outputs "10 (2 bits)" in the case when the signal S232 is "1", and outputs "01" or "00" that is the signal S234 from the selector 234 in the other cases, to the selector 236 as a signal S235.

The above-mentioned selector 236, which uses the signal S233 from the combination circuit 233 as a control signal, outputs "10 (2 bits)" in the case when the signal S233 is "1", and outputs any one of "10", "01" and "00" that is the signal S235 from the selector 235 in the other cases, to the selector 237 as a signal S236.

The above-mentioned comparator 238 compares the count result COUNT with a threshold value THCOUNT, and in the case when the count result is not less than the threshold value THCOUNT, outputs "1", and in the other cases, outputs "0" to the selector 237 as a signal S238.

The above-mentioned selector 237, which uses the signal S238 from the comparator 238 as a control signal, outputs "00 (2 bits)" in the case when the signal S238 is "1", and outputs any one of "10", "01" and "00" that is the signal S236 from the selector 236 in the other cases, as the black character discrimination result BLACK that is the output of the black detection circuit 124.

With the above-mentioned arrangement, the black detection circuit 124 carries out detection of black characters, especially, detection of edge portions of black characters, based upon combinations of the edge discrimination result EDGE which is the result of discrimination as to a portion having a drastic color change, the first color detection result COLOR which has detected black portions and the count result COUNT that shows the numbers of black and colors other than black.

Here, the threshold value THCOUNT, used in the comparator 238, is preferably set at a numeric value in the range of 10 to 20, and the optimal value is 14 (decimal notation). Here, with respect to the range, etc. of the numeric value, it can be set within the range of 8 bits (0 to 255). The standard of setting may vary depending of conditions (CCD, etc.) of the image-processing apparatus.

The black character discrimination result BLACK is inputted from the second image area discrimination circuit 3b to a post-processing (filter processing) program in the image-processing section 2, in which the image is subjected to an edge emphasis processing.

As illustrated in FIG. 18, the above-mentioned edge discrimination circuit 103, which uses image data C, M, Y with 7 lines and 8 bits from the line memory 101 as inputs, carries out a detection as to whether or not the target pixel is an edge, and outputs the resulting edge detection signal S134 and edge discrimination signal S136 that will be described later to the judgment processing circuit 104. Then, the judgment processing circuit 104 obtains an edge discrimination result EDGE based upon the inputted edge detection signal S134 and edge discrimination signal S136, and outputs this to the color judgment circuit 102.

Figure 23:
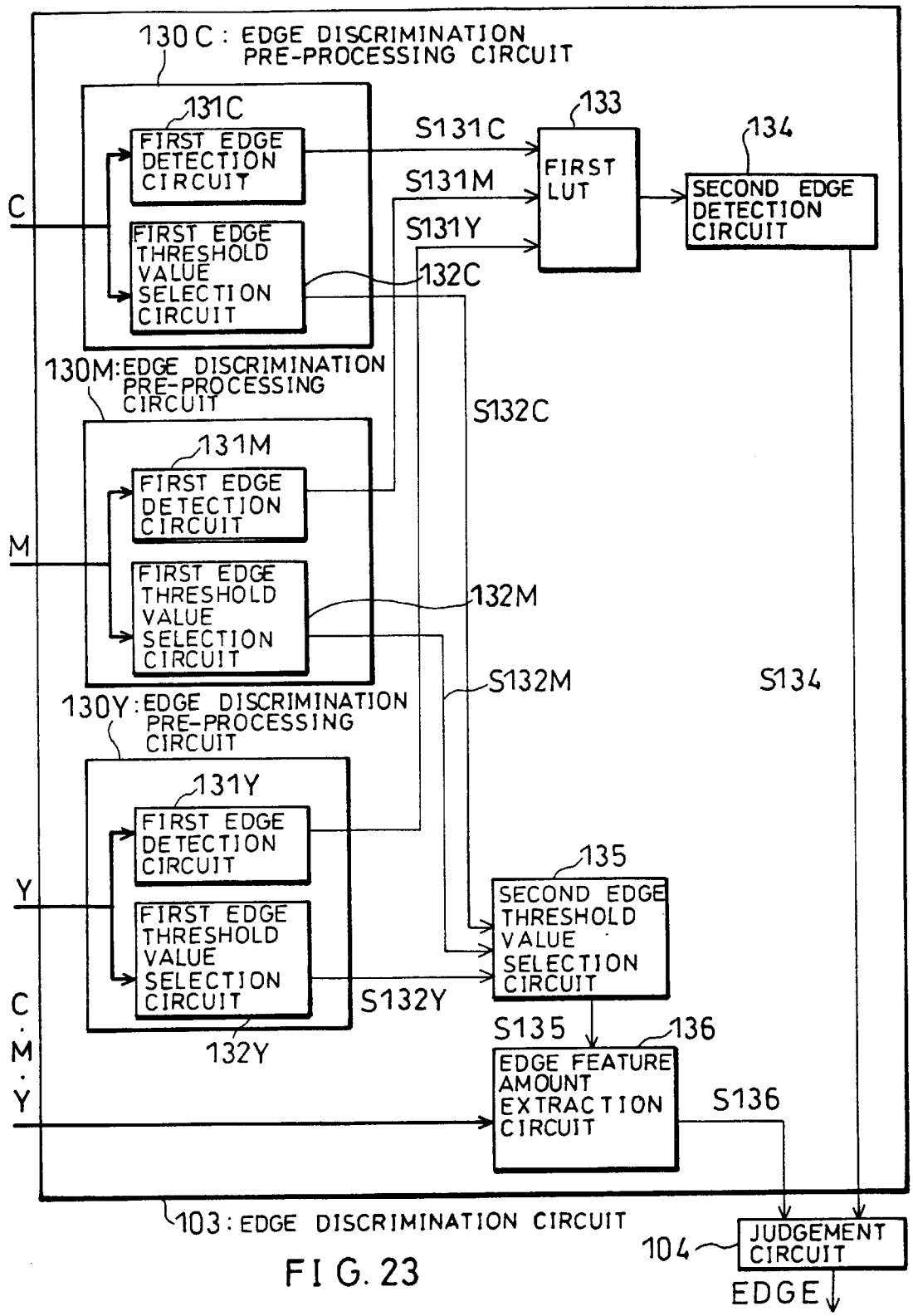
FIG. 23 is a block diagram that schematically shows the construction of an edge discrimination circuit installed in the second image area discrimination circuit in FIG. 18.

As illustrated in FIG. 23, the above-mentioned edge discrimination circuit 103 is constituted by edge discrimination pre-processing circuits 130C, 130M, 130Y installed for the respective colors, a first LUT (look up table) 133, a second edge detection circuit 134, a second edge threshold selection circuit (edge threshold selection means) 135 and an edge feature amount extraction circuit (edge feature amount extraction means) 136.

Since the above-mentioned edge discrimination pre-processing circuit 130C, 130M, 130Y has the same construction, an explanation will be given only of the edge discrimination pre-processing circuit 130C as an example.

The above-mentioned edge discrimination pretreatment circuit 130C is provided with a first edge detection circuit 131C, and carries out an convolution calculation on mask filter MF (which will be discussed later) for edge extraction together with image data C with 7 lines and 8 bits from the line memory 101C used as an input so that an edge detection result signal S131C on the image data C is obtained and this is outputted to the first LUT 133. Here, the above-mentioned edge discrimination pre-processing circuit 130M, 130Y are also provided with first edge detection circuits 131M, 131Y respectively.

Moreover, the above-mentioned edge discrimination pre-processing circuit 130C, which has a first edge threshold selection circuit (edge threshold selection means) 132C, binarizes the image data C in an area centered on the target image by using the image data C with 7 lines and 8 bits from the line memory line memory 101C as an input; thus, the resulting binarized image data S132C is outputted to the second edge threshold selection circuit 135. Here, the above-mentioned edge discrimination pretreatment circuits 130M, 130Y are also provided with first edge threshold selection circuits (edge threshold selection means) 132M, 132Y, respectively.

Figure 24:
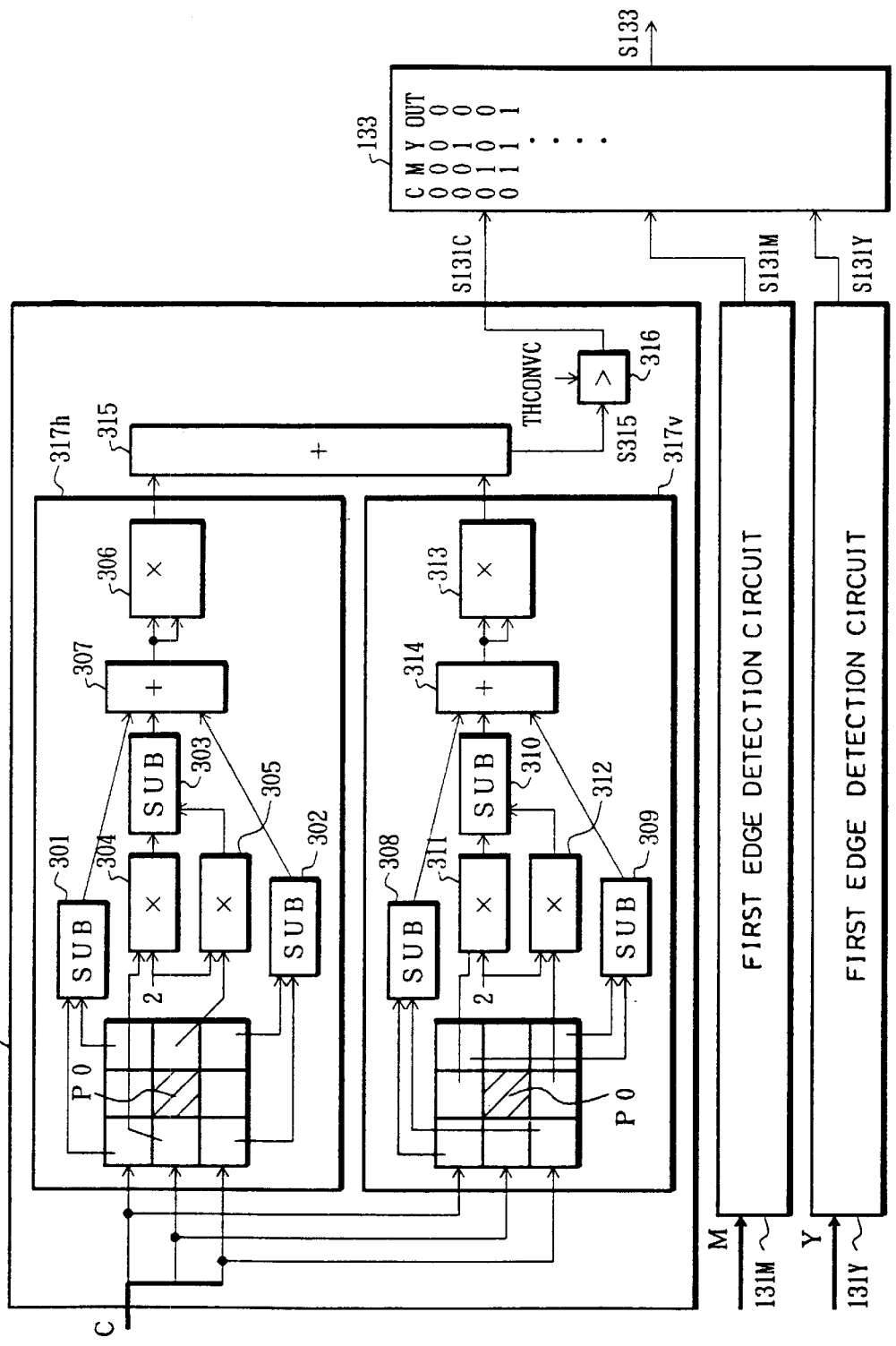
FIG. 24 is a block diagram that schematically shows the constructions of a first edge detection circuit and a first LUT installed in the second image area discrimination circuit in FIG. 23.

As illustrated in FIG. 24, by using image data C with 7 lines and 8 bits from the line memory 101C as an input, the above-mentioned first edge detection circuit 131C carries out an convolution calculation on mask filter MF for edge extraction together with the image data C having 9 pixels (3 pixels×3 pixels) centered on the target pixel P0 (slash part) within a specific area, and compares the resulting value with a threshold value THCONVC; thus, the result of the comparison is outputted to the first LUT 133 as an edge detection result signal S131C.

Here, the first edge detection circuit 131C is constituted by two operation systems 317h, 317v, an adder 315 and a comparator 316.

The above-mentioned operation system 317h is constituted by three subtracters 301 to 303, three integrators 304 to 306, and an adder 307. Moreover, the above-mentioned operation system 317v is constituted by three subtracters 308 to 310, three integrators 311 to 313, and an adder 314. Here, the operation system 317h and the operation system 317v have virtually the same construction, and are only different in directions in which pixels are combined during calculating processes.

More specifically, in the operation system 317h, first, with respect to the image data C, pixel values of pixels P and filter coefficients W (FIG. 31(a)) of the mask filter MF are multiplied for each of the corresponding matrix positions. Next, the result of a subtraction in the subtracter 301 between the value (m−1, n−1) and the value (m+1, n−1), the result of a subtraction in the subtracter 302 between the value (m−1, n+1) and the value (m+1, n+1), and the result of a subtraction in the subtracter 303 between the value (m−1, n) and the value (m+1, n), multiplied by 2 at the integrators 304 and 305 respectively, are added by the adder 307. The result of the adder 307 is raised to the 2nd power by the integrator 306, and this is outputted to the adder 315.

In the same manner, in the operation system 317v, first, with respect to the image data C, pixel values of pixels P and filter coefficients W (FIG. 31(a)) of the mask filter MF are multiplied for each of the corresponding matrix positions. Next, the result of a subtraction in the subtracter 308 between the value (m−1, n−1) and the value (m+1, n−1), the result of a subtraction in the subtracter 309 between the value (m−1, n+1) and the value (m+1, n+1), and the result of a subtraction in the subtracter 310 between the value (m, n−1) and the value (m, n+1), multiplied by 2 at the integrators 311 and 312 respectively, are added by the adder 314. The result of the adder 314 is raised to the 2nd power by the integrator 313, and this is outputted to the adder 315.

The above-mentioned adder 315 adds the results of the operation systems 317h and 317v so as to calculate the final result of the convolution operation of the mask filter MF, and outputs the resulting convolution operation result signal S315 to the comparator 316.

As described above, the mask filter MF used in the present embodiment is a mask filter in which filter coefficients are disposed in a 3×3 matrix format. For example, with respect to the mask filter MF, mask filters having filter coefficients as shown in FIGS. 32(a) to 32(d) may be adopted. Here, FIG. 32(a) to 32(d) show mask filters that are respectively used for edge detections in 0° direction, 45° direction, 90° direction and 135° direction.

The above-mentioned comparator 316 compares the convolution operation result signal S315 calculated by the adder 315 with a threshold THCONVC, and in the case when the convolution operation result signal S315 is greater than the threshold value THCONVC, outputs "1", and in the other cases, outputs "0" to the first LUT 133 as an edge detection result signal S131C for image data C.

Here, the above-mentioned threshold value THCONVC has a setting range of 21 bits. The threshold value THCONVC is preferably set at a numeric value in the range of 20000 to 25000, and the optimal value is 24025 (decimal notation). However, the standard of setting of the threshold value THCONVC varies depending on the conditions of the CCD sensor 1, etc. of the image-processing apparatus.

The above-mentioned first LUT133, which uses as inputs the edge detection result signals S131C, S131M, S131Y that have been found from image data C, M, Y for the respective colors in the first edge detection circuits 131C, 131M, 131Y, extracts values (for example, "0" or "1") corresponding to these combinations from a value table that has been preliminarily set and stored in the RAM, etc., and outputs these to the second edge detection circuit 134 as an edge information signal S133.

With this arrangement, in the case when not less than two inputs among the edge detection result signals S131C, S131M, S131Y are "1", the first LUT 133 outputs "1", and in the other cases, outputs "0" to the second edge detection circuit 134.

The above-mentioned second edge detection circuit 134 (FIG. 23) uses the edge information signal S133 of the target pixel P0 and its peripheral pixels obtained in the LUT133 as an input, and based upon combinations of these, finds the edge discrimination result EDGE for the target pixel P0 so as to output this to the judgement processing circuit 104 as an edge detection signal S134.

Figure 25:
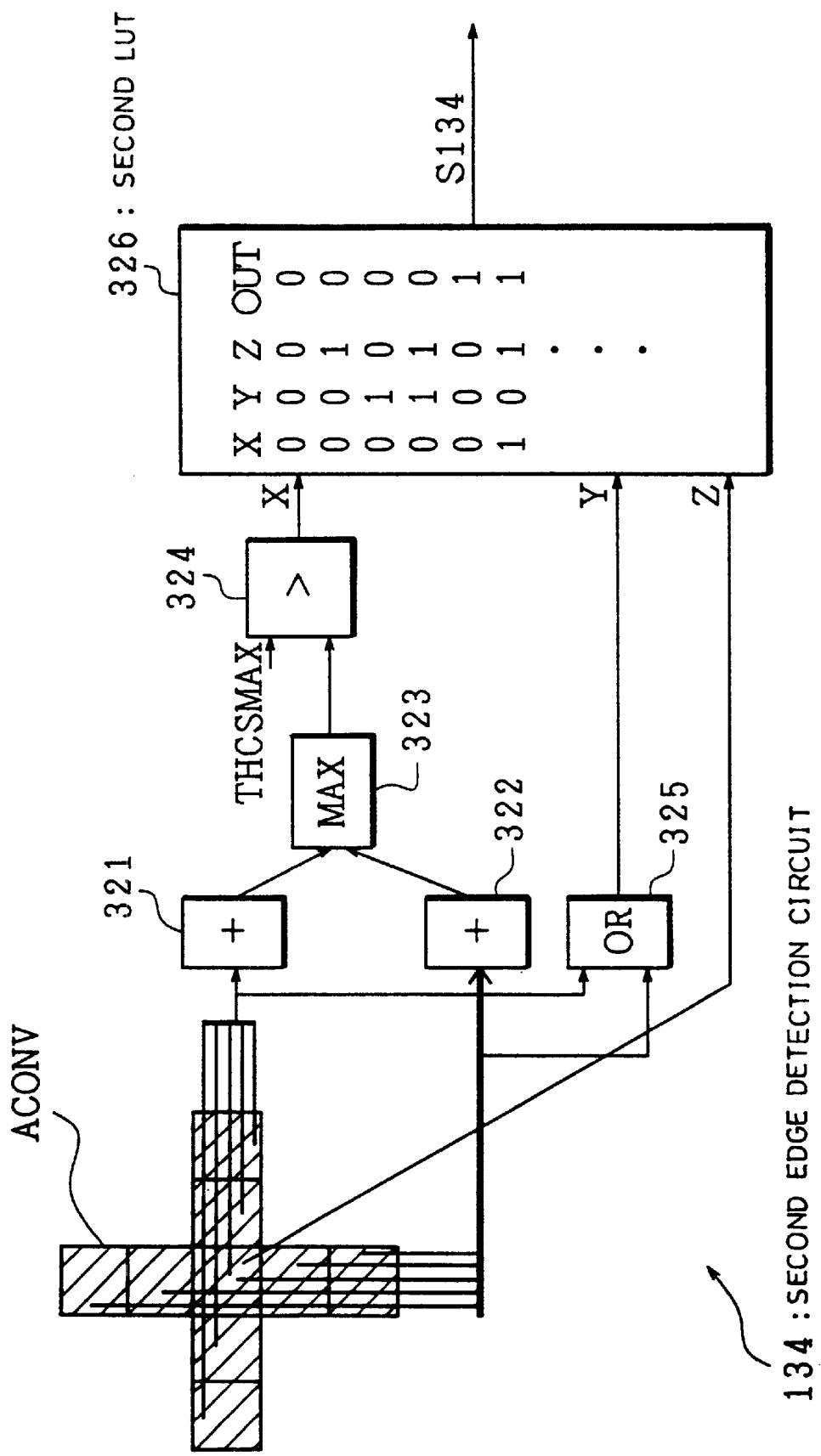
FIG. 25 is a block diagram that schematically shows the construction of a second edge detection circuit installed in the edge discrimination circuit shown in FIG. 23.

As illustrated in FIG. 25, the second edge detection circuit 134 is constituted by two adders 321, 322, a maximum value calculator 323, a comparator 324, an OR circuit 325 and a second LUT326.

In the operation in the second edge detection circuit 134, first, as illustrated in FIG. 30(a), with respect to the target pixel P0 in a specific area, a cross-shaped area ACONV, centered on the target pixel P0, that consisting of 9 pixels is set. In other words, the cross-shaped area ACONV, centered on the target pixel P0=P(i, j) consists of pixels (i−2, j), P(i−1, j), P(i+1, j), P(i+2, j) aligned on a j row and pixels P(i, j−2), P(i, j−1), P(i, j+1), P(i, j+2) aligned on an i column.

Here, the edge detection signal S134 for the target pixel P0 is found based upon the edge information signal S133 found by the first LUT133 for each pixel P of the 9 pixels contained in the cross-shaped area ACONV centered on the target pixel P0.

More specifically, with respect to the edge information signal S133, the following calculations are carried out: The maximum value calculator 323 finds the greater value between the result of addition of the pixels P on the j row, P(i−2, j), P(i−1, j), P(i, j), P(i+1, j), P(i+2, j) made by the adder 321, and the result of addition of the pixels P on the i column, P(i, j−2), P(i, j−1), P(i, j), P(i, j+1), P(i, j+2) made by the adder 322. Then, the comparator 324 compares the result of the maximum value calculator 323 with a threshold value THCSMAX, and if the result of the maximum value calculator 323 is not more than the threshold value THCSMAX, outputs "1", and in the other cases, outputs "0" to a second LUT326 as a signal X.

Moreover, the OR circuit 325 calculates a logical add of the values of all pixels P included in the cross-shaped area ACONV, and outputs the result of this to the second LUT326. Furthermore, the value of the target value P0 is outputted to the second LUT326 as a signal Z.

The above-mentioned second LUT326 extracts values (for example, "0" or "1") corresponding to combinations of the inputted signals X, Y and Z from a value table that has been preliminarily set and stored in the RAM, etc., and outputs these to the judgment processing circuit 104 as an edge detection signal S134 that is the result of the edge discrimination circuit 103.

As described above, the first edge detection circuits 131C, 131M, 131Y, the first LUT133 and the second edge detection circuit 134 are used to detect whether or not the target pixel P0 is a pixel that is being subjected to a drastic change in its color; thus, the result is outputted as the edge detection signal S134.

In other words, with respect to the target pixel P0 in a specific area, the cross-shaped area ACONV is set (FIG. 30(a)), and with respect to all the pixels P included in the cross-shaped area ACONV, convolution operations are carried out together with the 3×3 mask filters MF (FIG. 31(a)) so as to find the edge information signal S133 for each pixel. More specifically, in order to find the edge detection signal S134 of a pixel P(i, j), as illustrated in FIG. 30(b), the mask filters MF are set so as to make the pixel P(i, j−2) coincident with the filter coefficient W (m, n) that forms the center of the mask filters MF, thereby carrying out convolution operations so as to obtain the edge information signal S133 of the pixel P(i, j). Consequently, the edge detection signal S134 is extracted based upon the edge information signals S133 of all the 9 pixels within the cross-shaped area ACONV by reference to the second LUT326.

The above-mentioned edge feature amount extraction circuit 136 (FIG. 23) uses the image data C, M, Y for the respective colors from the line memory 101 as inputs, and finds the sum of the maximum value, the minimum value, the maximum density difference, and the standard deviation (only for the first area A1) with respect to an area of 7 pixels×7 pixels (first area A1) and an area of 7 pixels×31 pixels (second area A2) that are centered on the target pixel, and compares this serving as edge information with an edge threshold selected by a main edge threshold selection signal S135 calculated by the second edge threshold selection circuit 135 (FIG. 28), which will be described later, thereby obtaining an edge discrimination signal S136 that is outputted to the judgement processing circuit 104 as the result of the edge discrimination circuit 103.

Figure 26:
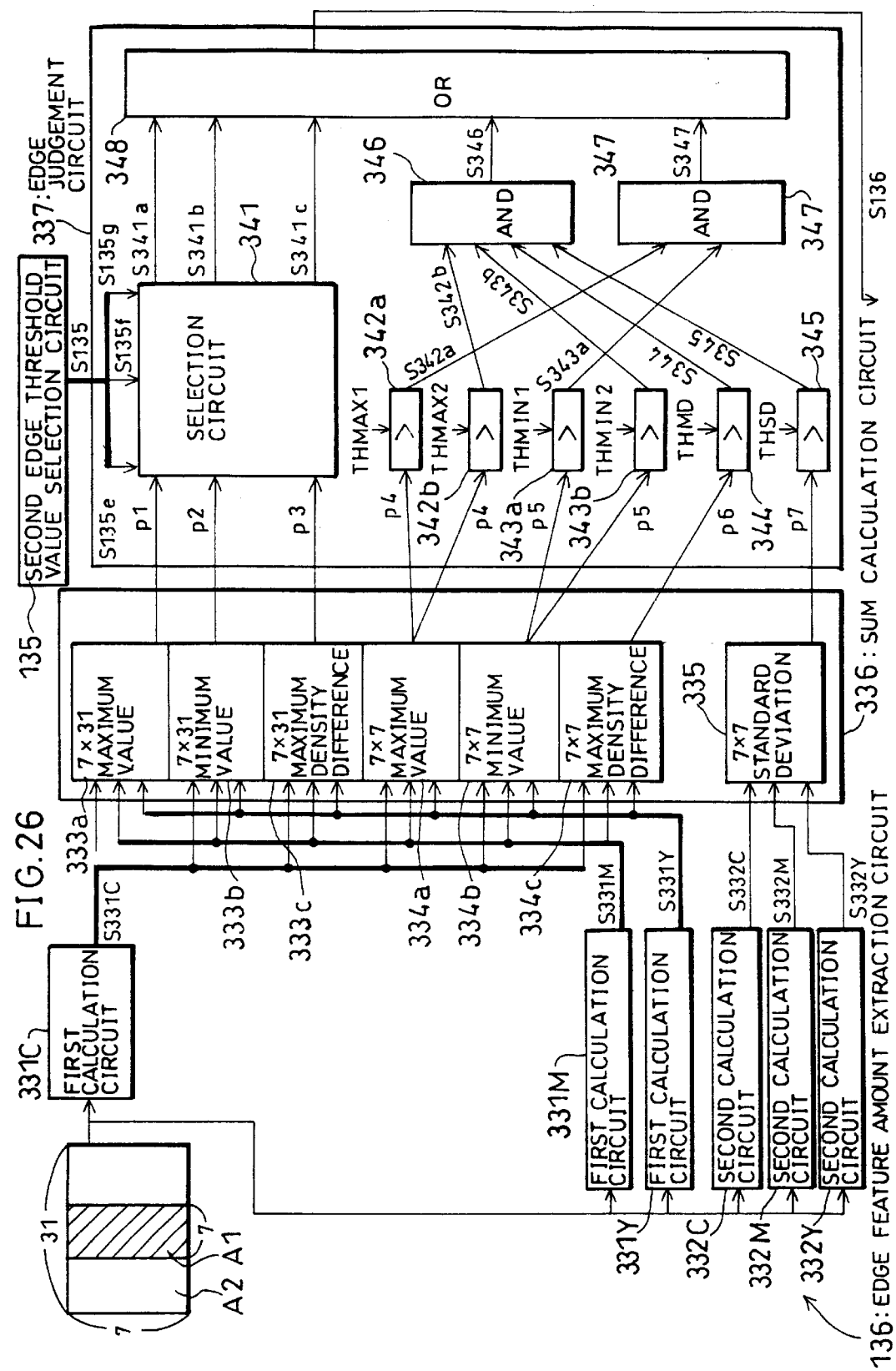
FIG. 26 is a block diagram that schematically shows the construction of an edge feature amount extraction circuit installed in the edge discrimination circuit shown in FIG. 23.

As illustrated in FIG. 26, the edge feature amount extraction circuit 136 is constituted by first calculation circuits 331C, 331M, 331Y and second calculation circuits 332C, 332M, 332Y, which are provided for the respective colors, a sum calculation circuit 336 and an edge judgment circuit 337.

The above-mentioned first calculation circuits 331C, 331M, 331Y and the second calculation circuits 332C, 332M, 332Y are designed to have the same construction for each of the image data C, M, Y; therefore, the following description will discuss only the first calculation circuit 331C and the second calculation circuit 332C that carry out calculations for the image data C.

The above-mentioned first calculation circuit 331C uses the image data C from the line memory 101C as an input, and calculates the maximum value, the minimum value and the maximum density difference with respect to the first area with 7 pixels×7 pixels and the second area with 7 pixels×31 pixels that are centered on the target pixel, so as to output these to the sum calculation circuit 336 as a first edge information signal S331C with 32 bits.

The above-mentioned second calculation circuit 332C, which uses the image data C from the line memory 101C as an input, calculates the standard deviation with respect to the first area A1 with 7 pixels×7 pixels centered on the target pixel, and outputs this to the sum calculation circuit 336 as a second edge information signal S332C with 14 bits.

The above-mentioned sum calculation circuit 336 finds the sum of the first edge information signals S331C, S331M, S331Y (maximum value, minimum value, maximum density difference) and the second edge information signals S332C, S332M, S332Y (standard deviation) that have been calculated in the first calculation circuits 331C, 331M, 331Y and the second calculation circuits 332C, 332M, 332Y for the respective colors, and outputs this to the edge judgment circuit 337.

Here, the above-mentioned sum calculation circuit 336 is constituted by a 7×31 maximum value sum circuit 333a, a 7×31 minimum value sum circuit 333b, a 7×31 maximum density difference sum circuit 333c, a 7×7 maximum value sum circuit 334a, a 7×7 minimum value sum circuit 334b, a 7×7 maximum density difference sum circuit 334c and a 7×7 standard deviation sum circuit 335.

The above-mentioned 7×31 maximum value sum circuit 333a, 7×31 minimum value sum circuit 333b and 7×31 maximum density difference sum circuit 333c, which use as inputs the maximum value, the minimum value and the maximum density difference within the second area A2 with 7 pixels×31 pixels centered on the target pixel that have been calculated by the first calculation circuits 331C, 331M, 331Y for the respective image data C, M, Y, calculates sums of the respective values, and outputs these to the edge judgment circuit 337 as a 7×31 maximum value sum signal p1, a 7×31 minimum value sum signal p2, and a 7×31 maximum density difference sum signal p3.

In the same manner, the above-mentioned 7×7 maximum value sum circuit 334a, 7×7 minimum value sum circuit 334b and 7×7 maximum density difference sum circuit 334c, which use as inputs the maximum value, the minimum value and the maximum density difference within the first area A1 with 7 pixels×7 pixels centered on the target pixel that have been calculated by the first calculation circuits 331C, 331M, 331Y for the respective image data C, M, Y, calculates sums of the respective values, and outputs these to the edge judgment circuit 337 as a 7×7 maximum value sum signal p4, a 7×7 minimum value sum signal p5, and a 7×7 maximum density difference sum signal p6.

The above-mentioned 7×7 standard deviation sum circuit 335, which uses as an input the standard deviation within the first area A1 with 7 pixels×7 pixels centered on the target pixel that has been calculated by the second calculation circuits 332C, 332M, 332Y for the respective image data C, M, Y, calculates the sum thereof, and outputs this to the edge judgment circuit 337 as a 7×7 standard deviation sum signal p7.

The above-mentioned edge judgment circuit 337, which uses as inputs the respective sum signals p1 to p7 that serve as edge information from the sum calculation circuit 336 and the main edge threshold selection signal S135 calculated by the second edge threshold selection circuit 135 (FIG. 28) which will be described later, compares the respective sum signals p1 to p7 with edge threshold values that have been selected from predetermined edge threshold values and the main edge threshold selection signal S135 so as to find an edge discrimination signal S136, thereby outputting this to the judgment processing circuit 104 as the result of the edge discrimination circuit 103.

The above-mentioned edge judgment circuit 337 is constituted by a selection circuit 341, six comparators 342a, 342b, 343a, 343b, 344, 345, two AND circuits 346, 347 and an OR circuit 348.

The above-mentioned selection circuit 341, which uses as inputs the sum signals p1 to p3 that are the respective sums of the maximum value, minimum value and maximum density difference within the second area A2 with 7 pixels× 31 pixels centered on the target pixel and that have been calculated by the respective sum circuits 333a to 333c in the sum calculation circuit 336, compares the respective sum signals p1 to p3 with an edge threshold value selected by the main edge threshold selection signal S135 so as to find signals S341a, S341b, S341c, and outputs these to an OR circuit 348.

Figure 27:
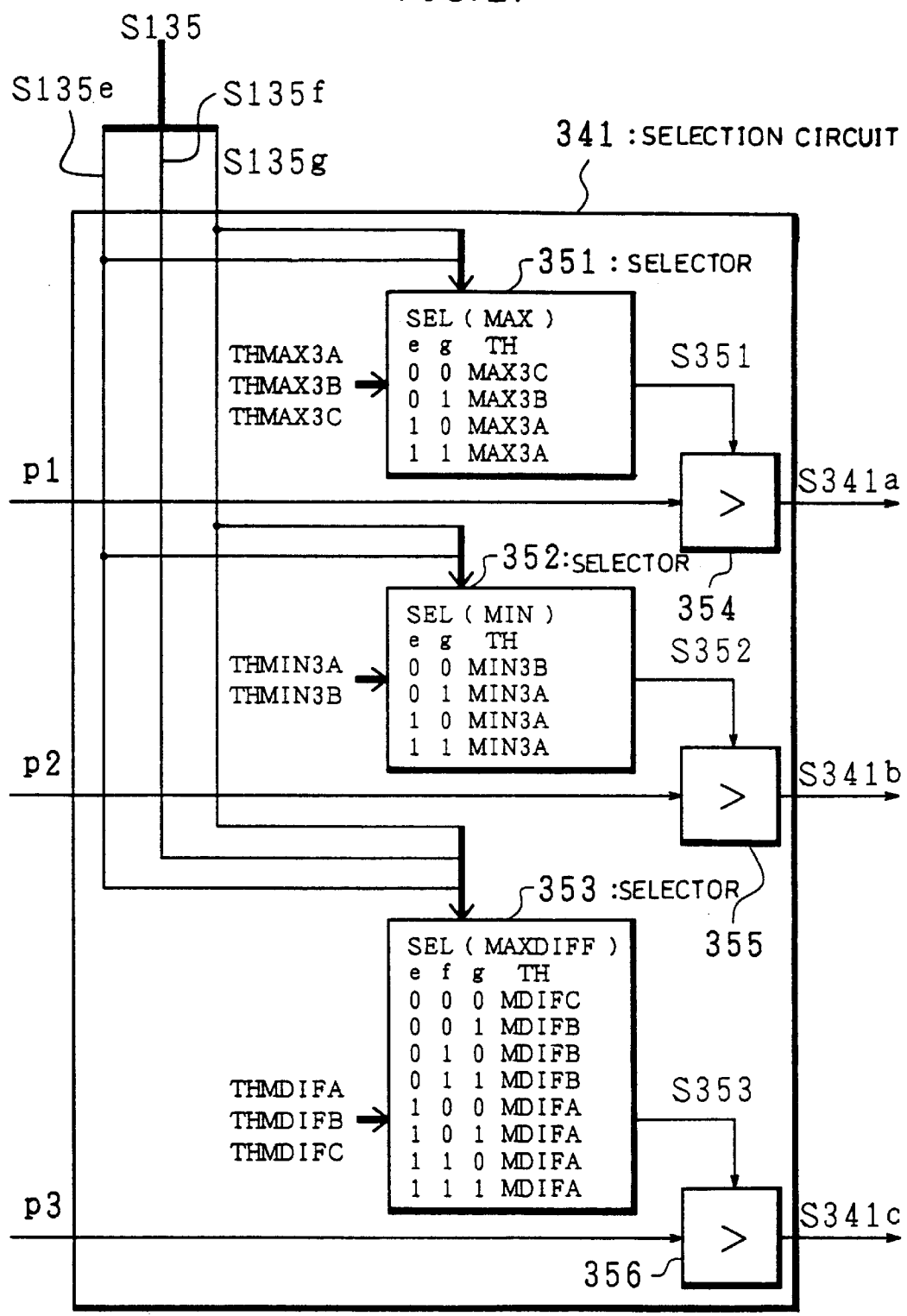
FIG. 27 is a block diagram that schematically shows the construction of a selection circuit installed in an edge judgment circuit in the edge feature amount extraction circuit shown in FIG. 26.

As illustrated in FIG. 27, the above-mentioned selection circuit 341 is constituted by three selectors 351 to 353 and three comparators 354 to 356. Here, the main edge threshold selection signal S135 is a signal containing selection signals S135*e*, S135*f*, S135*g*, which are respectively separated in the selection circuit 341 so as to be transmitted.

The above-mentioned selector 351 selects one of the three edge threshold values THMAX3A, THMAX3B and THMAX3C that are input signals, and outputs it to the comparator 354 as a signal S351, in accordance with the combination of the selection signals S135*e* and S135*g*. Then, the comparator 354 compares the 7×31 maximum value sum signal p1 from the 7×31 maximum value sum circuit 333*a* with the signal S351 from the selector 351 (edge threshold value THMAX3A to 3C), and if the 7×31 maximum value sum signal p1 is smaller than the signal S351, outputs "0", and in the other cases, outputs "1" to the OR circuit 348 as a signal S341*a*.

The above-mentioned selector 352 selects one of the two edge threshold values THMIN3A and THMIN3B that are input signals, and outputs it to the comparator 355 as a signal S352, in accordance with the combination of the selection signals S135*e* and S135*g*. Then, the comparator 355 compares the 7×31 minimum value sum signal p2 from the 7×31 minimum value sum circuit 333*b* with the signal S352 from the selector 352 (edge threshold values THMIN3A, 3B), and if the 7×31 minimum value sum signal p2 is greater than the signal S352, outputs "0", and in the other cases, outputs "1" to the OR circuit 348 as a signal S341*b*.

The above-mentioned selector 353 selects one of the three edge threshold values THMDIFA, THMDIFB and THMDIFC, and outputs it to the comparator 356 as a signal S353, in accordance with the combination of the selection signals S135*e*, S135*f* and S135*g*. Then, the comparator 356 compares the 7×31 maximum density difference sum signal p3 from the 7×31 maximum density difference sum circuit 333*c* with the signal S353 (edge threshold values THMDIFA to C) from the selector 353, and if the 7×31 maximum density difference sum signal p3 is smaller than the signal S353, outputs "0", and in the other cases, outputs "1" to the OR circuit 348 as a signal S341*c*.

With this arrangement, signals S342*a* to S342*c*, which indicates "0" when the target pixel is included within the character area in the 7×31 area and also indicates "1" in the other case, are outputted from the selection circuit 341. For this reason, the edge threshold values THMAX3A to 3C are set to values used for edge judgement from the maximum density of the 7×31 area. The edge threshold values THMIN3A and 3B are set to values used for edge judgement from the minimum density value of the 7×31 area. The edge threshold values THMDIFA to C are set to values used for edge judgement from the maximum density difference of the 7×31 area.

The above-mentioned comparator 342*a* compares the 7×7 maximum value sum signal p4 from the 7×7 maximum value sum circuit 334*a* with an edge threshold value THMAX1 that has been preliminarily set, and if the 7×7 maximum value sum signal p4 is smaller than the edge threshold value THMAX1, outputs "0", and in the other cases, outputs "1" to the AND circuit 347 as a signal S342*a*.

The above-mentioned comparator 343*a* compares the 7×7 minimum value sum signal p5 from the 7×7 minimum value sum circuit 334*b* with an edge threshold value THMIN1 that has been preliminarily set, and if the 7×7 minimum value sum signal p5 is greater than the edge threshold value THMIN1, outputs "0", and in the other cases, outputs "1" to the AND circuit 347 as a signal S343*a*.

Then, the above-mentioned AND circuit 347, which uses the signals S342*a* and S343*a* from the comparators 342*a* and 343*a* as inputs, calculates a logical product of these, and outputs it to the OR circuit 348 as a signal S347.

In the same manner, the above-mentioned comparator 342*b* compares the 7×7 maximum value sum signal p4 from the 7×7 maximum value sum circuit 334*a* with an edge threshold value THMAX2 that has been preliminarily set, and if the 7×7 maximum value sum signal p4 is smaller than the edge threshold value THMAX2, outputs "0", and in the other cases, outputs "1" to the AND circuit 346 as a signal S342*b*.

The above-mentioned comparator 343*b* compares the 7×7 minimum value sum signal p5 from the 7×7 minimum value sum circuit 334*b* with an edge threshold THMIN2 that has been preliminarily set, and if the 7×7 minimum value sum signal p5 is greater than the edge threshold value THMIN2, outputs "0", and in the other cases, outputs "1" to the AND circuit 346 as a signal S343*b*.

The above-mentioned comparator 344 compares the 7×7 maximum density difference sum signal p6 from the 7×7 maximum density difference sum circuit 334*c* with an edge threshold THMD that has been preliminarily set, and if the 7×7 maximum density difference sum signal p6 is smaller than the edge threshold value THMD, outputs "0", and in the other cases, outputs "1" to the AND circuit 346 as a signal S344.

The above-mentioned comparator 345 compares the 7×7 standard deviation sum signal p7 from the 7×7 standard deviation sum circuit 335 with an edge threshold THSD that has been preliminarily set, and if the 7×7 standard deviation sum signal p7 is smaller than the edge threshold THSD that has been preliminarily set, outputs "0", and in the other cases, outputs "1" to the AND circuit 346 as a signal S345.

Then, the above-mentioned AND circuit 346, which uses the signal S342*b*, S343*b*, S344, S345 from the comparators 342*b*, 343*b*, 344, 345 as inputs, calculates a logical product of these and outputs it to the OR circuit 348 as a signal S346.

With this arrangement, signals S346, 347, which indicate "0" when the target pixel is included within the character area in the 7×7 area and also indicate "1" in the other cases, are outputted from the AND circuits 346, 347. For this reason, the edge threshold values THMAX1, 2 are set to values used for edge judgement from the maximum density value of the 7×7 area. The edge threshold values THMIN1, 2 are set to values used for edge judgement from the minimum density value of the 7×7 area. The edge threshold value THMD is set to a value used for edge judgement from the maximum density difference of the 7×7 area. The edge threshold value THSD is set to a value for edge judgement from the standard deviation value of the 7×7 area.

The above-mentioned OR circuit 348, which uses signals S341*a* to S341*c* from the selection circuit 341 and signals S346, S347 from the AND circuits 346, 347 as inputs, calculates a logical OR, and outputs it to the judgement processing circuit 104 as an edge discrimination signal S136 that is the result of output of the edge feature amount extraction circuit 136.

With this arrangement, the OR circuit 348 outputs to the judgement processing circuit 104 a 1 bit signal that becomes "0" when the target pixel is within the character area, and becomes "1" when the target pixel is located within the non-character area.

The following description will discuss optimal values of the respective threshold values that are set in the edge judgement circuit 337: Here, all the values are based upon the decimal notation. Moreover, with respect to the range, etc. of the numerical values, they can be all set within 10 bits (0 to 1023) except the THSD that is a signal with 16 bits. The standard of the setting varies depending on conditions (CCD, etc.) of the image-processing apparatus.

THMIN1=330,THMIN2=45,THMAX1=432,THMAX2=339,THMD=330,THSD=1800,THMAX3A=147,THMAX3B=210,THMAX3C=420,THMIN3A=330,THMIN3B=135,THMDIFA=135,THMDIFB=210,THMDIFC=225

Next, as illustrated in FIG. 23, the main edge threshold selection signal S135, inputted to the edge feature amount extraction circuit 136, is calculated by the first edge threshold selection circuits 132C, 132M, 132Y of the edge discrimination pretreatment circuits 130C, 130M, 130Y, and the second edge threshold selection circuit 135.

The above-mentioned first edge threshold selection circuits 132C, 132M, 132Y have the same construction and are respectively installed in the edge discrimination pretreatment circuits 130C, 130M, 130Y. Therefore, an explanation will be given only of the first edge threshold section circuit 132C that calculate image data C.

The first edge threshold selection circuit 132C, which uses image data C with 7 lines and 8 bits from the line memory 101C, binarizes the image data C within the 7 pixel×31 pixel area (second area A2) centered on the target pixel by using the average value of the image data C within the 7 pixel×7 pixel area (first area A1) centered on the target pixel, as a binarizing threshold value.

Figure 28:
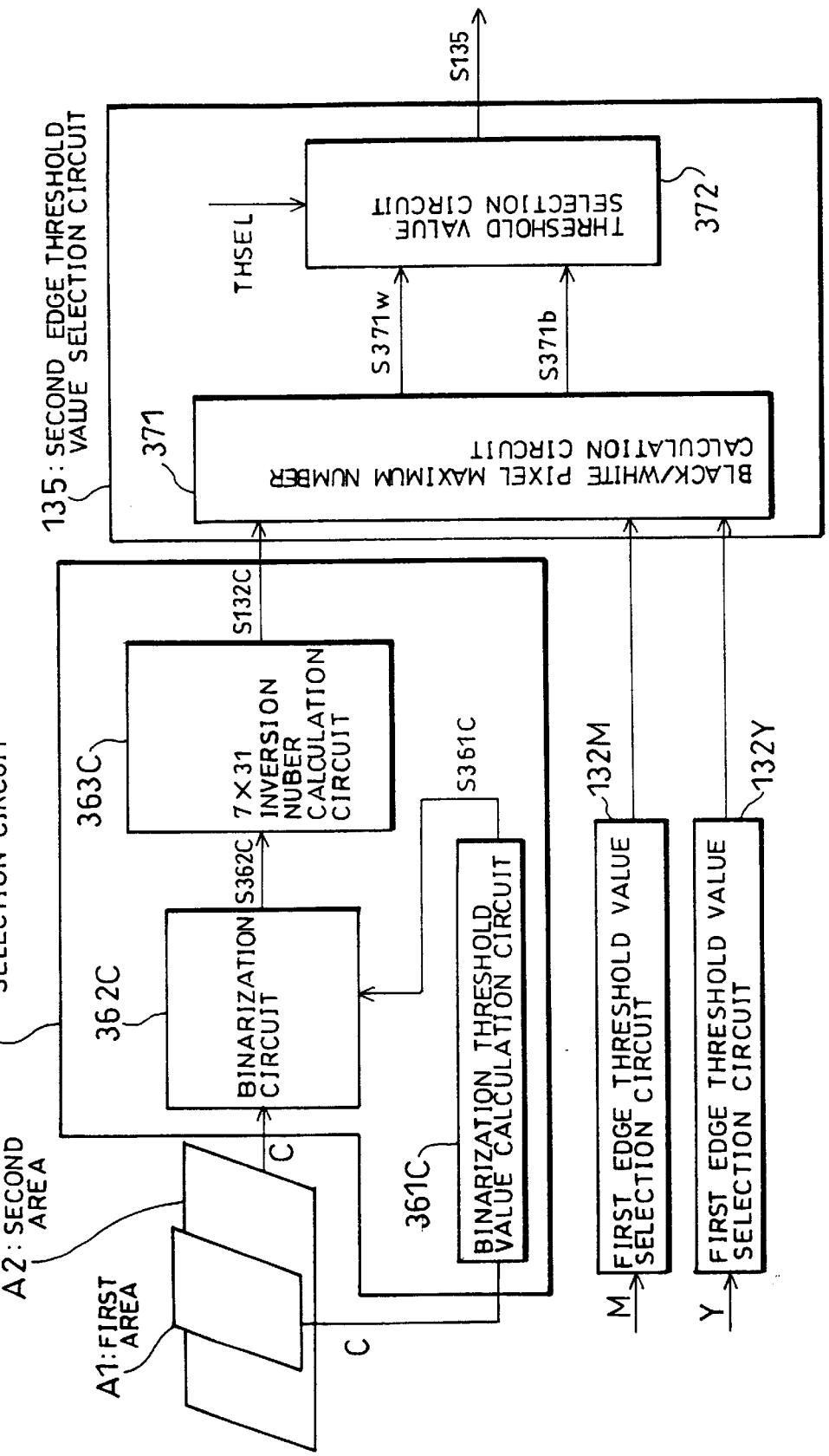
FIG. 28 is a block diagram that schematically shows the constructions of a first edge threshold selection circuit and a second edge threshold selection circuit installed in the edge discrimination circuit shown in FIG. 23.
Figure 30:
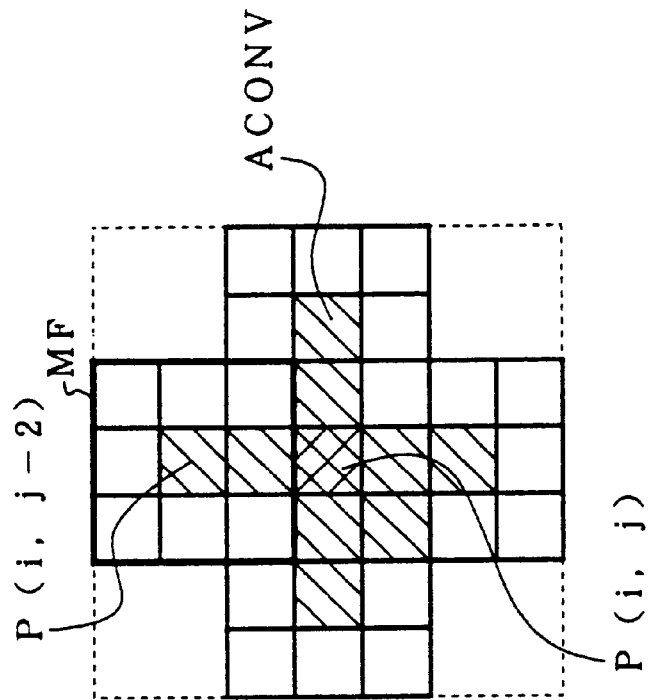
FIG. 30(a) is an explanatory drawing that shows a cross-shaped area corresponding to a processing range of the second edge detection circuit shown in FIG. 25.
FIG. 30(b) is an explanatory drawing that shows the convolution of a mask filter in the first edge detection circuit shown in FIG. 24.
Figure 30:
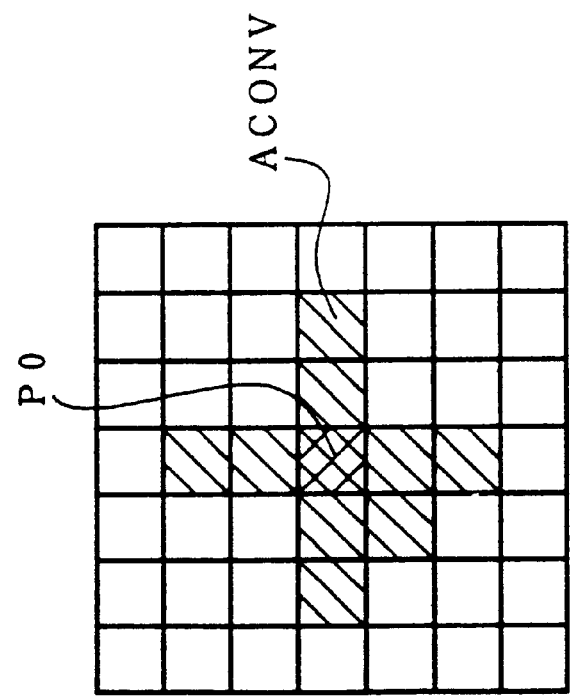

As illustrated in FIG. 28, the first edge threshold selection circuit 132C is constituted by a binarizing threshold calculation circuit 361C, a binarizing circuit 362C and a 7×31 inversion number calculation circuit 363C.

The above-mentioned binarizing threshold calculation circuit 361C, which uses image data C from the line memory 101C as an input, calculates an average of the image data C within the first area Al, and outputs this to the binarizing circuit 362C as a binarizing threshold signal S361C.

The above-mentioned binarizing circuit 362C, which uses image data C from the line memory 101C as an input, compares the image data C within the second area A2 with the binarizing threshold signal S361C from the binarizing threshold calculation circuit 361C, and if the image data C within the second area A2 is smaller than the binarizing threshold signal S361C, binarizes it to "1", and in the other cases, binarizes it to "0", and outputs this to the 7×31 inversion number calculation circuit 363C as a binarizing signal S362C.

The above-mentioned 7×31 inversion number calculation circuit 363C, which uses a binarizing signal S362C from the binarizing circuit 362C as an input, calculates the number of inversions of "0" and "1" for each main scanning and sub-scanning line of the binarized image data C within the second area A2, and outputs this to the second edge threshold selection circuit 135 as an inversion number signal S132C that is the result output of the first edge threshold selection circuit 132C.

The above-mentioned second edge threshold selection circuit 135, which uses the inversion number signals S132C, S132M, S132Y from the first edge threshold selection circuits 132C, 132M, 132Y as inputs, calculates a main edge threshold selection signal S135, and outputs this to the edge feature amount extraction circuit 136.

As illustrated in FIG. 28, the second edge threshold selection circuit 135 is constituted by a black-white pixel maximum number calculation circuit 371 and a threshold selection circuit 372.

The above-mentioned black-white pixel maximum number calculation circuit 371, which uses as inputs the inversion number signals S132C, S132M, S132Y that are obtained by calculating, for each of the main scanning and sub-scanning lines, the number of inversions of image data binarized for each color within the second area A2, and that are outputted from the first edge threshold selection circuits 132C, 132M, 132Y, finds a maximum value of the number of white pixels and a maximum value of the number of black pixels for each color after having been binarized within the second area A2, and outputs these to the threshold selection circuit 372 as a white pixel number maximum value signal S371w and a black pixel number maximum value signal S371b.

The above-mentioned threshold selection circuit 372, which uses the white pixel number maximum value signal S371w and the black pixel number maximum value signal S371b from the black-white pixel maximum number calculation circuit 371 as inputs, calculates a main edge threshold selection signal S135 based upon a threshold value THSEL that has been preliminarily set, and outputs this to the edge feature amount extraction circuit 136 as the result output of the second edge threshold selection circuit 135. Here, the main edge threshold selection signal S135 is a signal containing three selection signals S135e, S135f, S135g. Moreover, the threshold value THSEL contains four threshold values (TP1, TP30, TP31, TME).

The specific contents of processing in the threshold selection circuit 372 are explained as follows: The results of comparison carried out by comparing the number of inversions in the 5×5 area with a threshold value TP1 so as to define "1" if greater ("0" in the other case) and the results of comparison carried out by comparing the number of inversions in the 7×7 area so as to define "1" if greater ("0" in the other case) are combinedly calculated so as to find a logical product, and this is outputted as a selection signal S135e. The product of the number of inversions within the 31×7 area and the threshold value TP31 is compared with the maximum value of the number of white pixels within the 31×7 area of CMY (the white pixel number maximum value signal S371w), and outputs "1" if greater ("0" in the other case) as a selection signal S135f. The product of the number of inversions within the 31×7 area and the threshold value TP30 is compared with the maximum value of the number of black pixels within the 31×7 area of CMY (the black pixel number maximum value signal S371b), and outputs "1" if greater ("0" in the other case), as a selection signal S135g.

With this arrangement, a main edge threshold selection signal S135 for selecting the threshold values (THMAX3A to 3C, THMIN3A, 3B, THMDIFA to C) within the selection circuit 341 in accordance with the combination of inputs, is outputted from the threshold selection circuit 372. For this reason, the threshold values THSEL (TP1, TP30, TP31, TME) are set to values for determining optimal values so as to discriminate edges from each of the image areas of C, M, Y.

More specifically, the threshold value TP1 can be set within 4 bits, and more preferably in the range of 1 to 10, and the optimal value is 4. The threshold value TP30 can be set within 8 bits, and more preferably in the range of 30 to 70, and the optimal value is 40. The threshold value TP31 can be set within 8 bits, and more preferably in the range of 30 to 70, and the optimal value is 50. The threshold value TME can be set within 8 bits, and more preferably, in the range of 20 to 50, and the optimal value is 38. Here, all the values are based upon the decimal notation. The standard of the setting varies depending on conditions (CCD, etc.) of the image-processing apparatus.

As described above, the first edge threshold selection circuits 132C, 132M, 132Y, the second edge threshold selection circuit 135 and the edge feature amount extraction circuit 136 combinedly detect whether or not the target pixel (center pixel) belongs to the character area, thereby making it possible to output to a judgement processing circuit 104 an edge discrimination signal S136 that represents "0" if the target pixel belongs to the character area, and represents "1" if it belongs to the non-character area.

Here, the first area A1 is provided as a comparatively narrow range with the target pixel centered thereon. In contrast, the second area A2 is provided as a wider range as compared with the first area A1. Here, a 7 pixel×7 pixel area with the target pixel centered thereon and a 7 pixel×31 pixel area with the target pixel centered thereon are respectively optimal areas for the first area A1 and the second area A2 in terms of the discrimination precision and the circuit scale.

As shown in FIG. 18, the above-mentioned judgment processing circuit 104 uses the edge detection signal S134 and the edge discrimination signal S136 from the edge discrimination circuit 103 as inputs, and based upon the combination of these, outputs to the color judgement circuit 102 an edge discrimination result EDGE for indicating whether or not the target value is subject to a drastic color change. Then, the color judgement circuit 102 carries out a unification processing including the edge discrimination result EDGE so as to detect black color.

Figure 29:
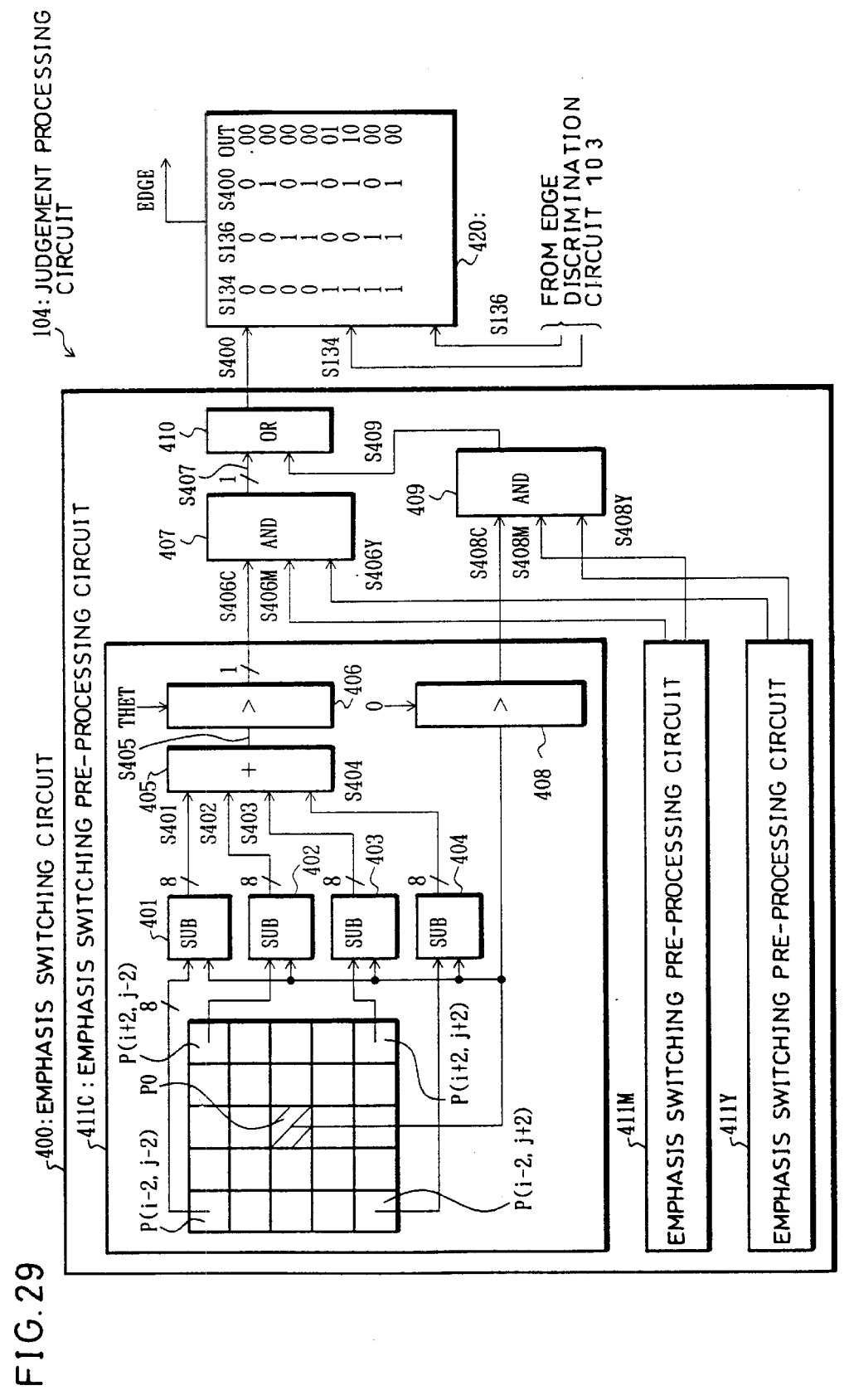

As shown in FIG. 29, the above-mentioned judgment processing circuit 104 is constituted by an emphasis switching circuit 400 and a third LUT 420.

The above-mentioned emphasis switching circuit 400 is a circuit for discriminating whether or not the target pixel P0 requires an emphasizing process within a 5×5 area with the target pixel P0 (i, j) centered thereon. More specifically, the emphasis switching circuit 400 is constituted by emphasis switching pre-processing circuits 411C, 411M, 411Y installed for C, M, Y respectively, two AND circuits 407, 409 and an OR circuit 410.

Since the above-mentioned emphasis switching pre-processing circuits 411C, 411M, 411Y have an identical construction, the following description will exemplify only the emphasis switch pre-processing circuit 411C.

The above-mentioned emphasis switch pre-processing circuit 411C is constituted by four subtracters 401 to 404, an adder 405 and two comparators 406, 408.

The above-mentioned subtracter 401 calculates the absolute difference value of the target pixel P (i, j) and a pixel P (i−2, j−2) within a 5×5 area with the target pixel centered thereon separately for each of cyan tables, and outputs this to the adder 405 as a signal S401. In the same manner, the subtracters 402, 403, 404 respectively calculate the absolute difference values of the target pixel P0 and a pixel P(i+2, j−2), the target pixel P0 and a pixel P (i+2, j+2), and the target pixel P0 and a pixel P(i−2, j+2), and outputs these to the adder 405 respectively as signals S402, S403, S404.

The above-mentioned adder 405, which uses the signals S401 to S404 as inputs from the subtracters 401 to 404, calculates the sum of these, and outputs them to the comparator 406 as a signal S405.

The above-mentioned comparator 406 compares the signal S405 that is the sum of the absolute difference values centered on the target pixel P0 with a threshold value THET, and if the signal S405 is smaller than the threshold value THET, outputs "1", and in the other cases, outputs "0" to the AND circuit 407 as a signal S406C (1 bit) that is the result of the emphasis switching pre-processing circuit 411C. Here, the threshold value THET is preferably set at a value in the range of 10 to 50, and the optimal value is 15 (all based on decimal notation).

Moreover, the above-mentioned comparator 408 compares the target pixel P0 with 0 that is a threshold value, and if the target pixel P0 is smaller, outputs "1", and in the other cases, outputs "0" to the AND circuit 409 as a signal S408C (1 bit) that represents the result of the emphasis switching pre-processing circuit 411C.

As described above, the emphasis switching pre-processing circuits 411C, 411M, 411Y, installed for C, M, Y respectively, output two signals respectively. In other words, signals S406C, S406M, S406Y are outputted to the AND circuit 407. Moreover, signals S408C, S408M, S408Y are outputted to the AND circuit 409.

Next, the AND circuit 407 calculates the logical product of the input signals S406C, S406M, S406Y, and outputs this to the OR circuit 41 as a signal S407 (1 bit)

The above-mentioned AND circuit 409 calculates the logical product of the input signals S408C, S408M, S408Y, and outputs this to the OR circuit 410 as a signal S409 (1 bit).

The above-mentioned OR circuit 410 calculates the logical OR of the signals S407, S409 inputted from the AND circuits 407, 409, and outputs this to the third LUT 420 as an emphasis changing signal S400 that is the result of the emphasis switching circuit 400.

The third LUT 420, which uses as inputs the emphasis switching signal S400 from the emphasis switching circuit 400, the edge detection signal S134 and the edge detection signal S136 from the edge discrimination circuit 103 (FIG. 18), extracts a value ("00", "01" or "10" of two bits) from a numeric value table that has been preliminarily set and stored in a RAM, etc., based upon the combination of these signals, and outputs this to the color judgement circuit 102 as an edge discrimination result EDGE. Here, the edge discrimination result of "01" represents "edge area (that is, emphasis processing is required), that of "10" represents "edge area (although no emphasis processing is required), and that of "00" represents "area other than the edge area.

As described above, in accordance with the present embodiment, upon discriminating whether or not each of the pixels on the image belongs to a black character area from multi-value image data of each of C, M, Y obtained by scanning a document, the image-processing apparatus, based upon all image data within a specific area including a target pixel to be discriminated and a plurality of adjacent pixels located on the periphery of the target pixel, extracts the amount of feature that indicates the characteristic of the area to which the target pixel belongs, and based upon the amount of feature, discriminates the area to which the target pixel belongs.

With this arrangement, with respect to multi-value image data of each of C, M, Y obtained by scanning a document by using a CCD sensor etc., the image-processing apparatus outputs the amount of feature from the specific area consisting of the target pixel and the adjacent pixels in the vicinity thereof as a discriminating signal, and based upon the results, it is possible to carry out an optimal image processing on the area to which the target pixel belongs on the image, and consequently to achieve high image quality.

Moreover, the above-mentioned image-processing apparatus is provided with a color judgement circuit for discriminating whether each pixel on the image is black or not from the multi-value image data of each of C, M, Y obtained by scanning a document.

With this arrangement, in the above-mentioned image-processing apparatus, the color judgement circuit discriminates whether or not each pixel on the image is black, with respect to the multi-value image data of each of C, M, Y inputted thereto, thereby making it possible to carry out an optimal image processing as a black area, and consequently to achieve higher image quality.

Moreover, the above-mentioned image-processing apparatus is provided with an edge discrimination circuit for discriminating whether or not each area on the image belongs to the black character edge area (black characters, edge portions of black line drawings, etc.) from the multi-value image data of each of C, M, Y obtained by scanning a document.

With this arrangement, in the above-mentioned image-processing apparatus, the edge discrimination circuit discriminates whether or not the target pixel on an image belongs to the black character edge area, thereby making it possible to carry out an optimal image processing as an edge portion of black characters, black line drawing, etc, and consequently to achieve higher image quality.

Furthermore, in the above-mentioned image-processing apparatus, the above-mentioned color judgment circuit is provided with a color feature amount extraction circuit which extracts the amount of color feature of the area to which the target pixel belongs based upon the results of the following circuits: respective calculation circuits for calculating the maximum value, the minimum value and the maximum density difference of the density level of all the pixels within the specific area centered on the target pixel with respect to image data of each of C, M, Y; a density average value calculation circuit for calculating an average value of the density levels of all the pixels within the specific area; and a density difference sum calculation circuit for calculating the addition of the sum of absolute values of the density level differences between pixels adjacent in the main scanning direction and the sum of absolute values of the density level differences between the pixels adjacent in the sub scanning direction within the specific area; thus, based upon the amount of color feature, the result of color judgement is obtained. Thus, it is possible to further improve the black-color discrimination precision in the image-processing apparatus.

The above-mentioned image-processing apparatus is provided with a color detection circuit for outputting the result of color discrimination on the target pixel based upon a predetermined threshold value with respect to the results found in the above-mentioned color feature amount extraction circuit. With this arrangement, the above-mentioned image-processing apparatus can carry out a highly accurate black-color judgement.

Furthermore, in the above-mentioned image-processing apparatus, the edge discrimination circuit is provided with: an edge detection circuit which performs an edge detection by carrying out an convolution operation of filters on each pixel within the specific area for each of image data C, M, Y; respective calculation circuits for calculating the maximum value and the minimum value of the density levels and their comparison difference value of all the pixels within one or a plurality of specific areas centered on the target pixel; a standard deviation calculation circuit for calculating the standard deviation between the average value of the density levels of all the pixels within the specific area and the respective image data; and an edge discrimination circuit for finding the result of edge discrimination from the threshold value found by a binarizing circuit.

With this arrangement, the image-processing apparatus makes it possible to find the results of the black-character edge discrimination based upon the results of calculations and the above-mentioned results of color judgement. Therefore, it is possible to extract the black-letter edge portions with high precision, to carry out an optimal image processing with respect to the black-character edge area, and consequently to achieve higher image quality.

Moreover, in the above-mentioned image-processing apparatus, the above-mentioned binarizing circuit binarizes the value of each pixel within one or a plurality of the specific areas by using a predetermined threshold value, and an inversion number calculation circuit for finding the number of inversions of the binary signals for each of the main-scanning and sub-scanning lines is provided. Thus, the above-mentioned image-processing apparatus can carry out an edge portion detection with higher precision.

Furthermore, the above-mentioned image-processing apparatus is provided with a white pixel number maximum value calculation circuit for finding the maximum value of the number of white pixels after having been binarized in the binarizing circuit, and a black pixel number maximum value calculation circuit for finding the maximum value of the number of black pixels after having been binarized therein. Thus, it is possible to improve the detection precision in the image-processing apparatus by preventing erroneous recognition with respect to the edge portion.

The image-processing apparatus of the present invention may be preferably provided with: a color detection means for detecting black-color portions with respect to pixels within the first area consisting of a target pixel and pixels in the vicinity of the target pixel of image data for each color component; a count means for counting the respective numbers of the black pixels and pixels having colors other than black with respect to the pixels in the first area; and an edge discrimination means for detecting whether or not an abrupt color change occurs at the target pixel, and also provided with a black color detection means which, based upon the results of outputs from these color detection means, count means and edge discrimination means, detects which area the target pixel belongs to, the black-letter area or the line-drawing area.

With the above-mentioned arrangement, since the color judgment means discriminates whether or not the target pixel on the image is black with respect to the first area consisting of the target pixel and pixels in the vicinity thereof of image data for each color component, it is possible to carry out an optimal image processing with respect to the black area. Moreover, since the edge discrimination means discriminates whether or not the target pixel on the image belongs to a black edge area, it is possible to carry out an optimal image processing with respect to edge portions such as black characters, black line drawing, etc. Then, based upon the results of these and the respective numbers of the black pixels and pixels having colors other than black within the first area found by the count means, a discrimination operation between the black-character area and line-drawing area can be carried out with high precision.

Therefore, it is possible to carry out an optimal image processing on the area to which the target pixel belongs on the image, and consequently to achieve high image quality. Therefore, different from conventional apparatuses, even when an edge extraction-emphasis process is carried out on colored characters, it is possible to avoid color changes from the original colors in the edge portions.

Moreover, the image-processing apparatus of the present invention may be provided with a color feature amount extraction means for extracting the amount of feature representing the characteristic of the first area based on the image data within the first area, and based upon the results of the output of the feature amount extraction means, the above-mentioned color detection means and the count means may carry out processes.

With the above-mentioned arrangement, the amount of feature is extracted from the first area with respect to image data for each color component, and based upon the results, the area to which the target pixel on the image belongs is subjected to an optimal image processing, thereby making it possible to achieve high image quality.

Furthermore, in the image-processing apparatus of the present invention, the color feature amount extraction means may be provided with, with respect to the density levels of pixels within the first area, a maximum value calculation means for calculating the maximum value, a minimum value calculation means for calculating the minimum value, a maximum density calculation means for calculating the maximum density difference, a density average value calculation means for calculating the average value, and a density difference sum calculation means for calculating the addition of the sum of absolute values of the density level differences between pixels adjacent in the main scanning direction and the sum of absolute values of the density level differences between the pixels adjacent in the sub scanning direction.

With the above-mentioned arrangement, it is possible to obtain as the amount of color feature the maximum value, the minimum value, the maximum density difference, the average value and the addition of the sum of absolute values of the density level differences between pixels adjacent in the main scanning direction and the sum of absolute values of the density level differences between the pixels adjacent in the sub scanning direction.

Therefore, it becomes possible to easily calculate the amount of color feature and also to further improve the black-color discrimination precision.

Moreover, in the image-processing apparatus of the present invention, the above-mentioned edge discrimination means may be provided with an edge detection means which performs an edge detection for the target pixel by carrying out an convolution operation of mask filters for extracting edges with respect to the pixels within the first area.

With the above-mentioned arrangement, the edge detection means can extract black-character edge portions with higher precision, provide an optimal image processing with respect to the black-character edge portions, and achieve higher image quality.

Furthermore, in the image-processing apparatus of the present invention, the edge discrimination means may be provided with: an edge threshold selection means which binarizes pixels within the second area including the first area by using a predetermined threshold value of the density level, and which forms a main edge threshold selection signal based upon the number of inversions of the binarized pixels for each of the lines in the main-scanning and sub-scanning directions; and an edge feature amount extraction means which finds the maximum value, the minimum value and the maximum density difference of the density levels of pixels enclosed in the first area and the second area, as well as finding the standard deviation of the density levels of pixels in the first area, and which, based upon the results of these and the main edge threshold selection signal, forms an edge discrimination signal for evaluating the results of edge detection in the edge detection means.

With the above-mentioned arrangement, the edge feature amount extraction means is further allowed to form an edge discrimination signal for discriminating black-character edge portions, based upon the maximum value, the minimum value and the maximum density difference of the density levels of pixels enclosed in the first area and the second area, the standard deviation of the density levels of pixels in the first area and the main edge threshold selection signal obtained in the edge threshold selection means.

Thus, the edge detection result found by the edge detection means can be evaluated by the edge discrimination signal so that it becomes possible to prevent erroneous discrimination for the edge section, and consequently to improve the detection precision.

Therefore, it becomes possible to extract black-character edge portions with high precision, and also to carry out an optimal image processing on the black-character edge portions; consequently, it is possible to achieve higher image quality.

The image-processing method of the present invention may be preferably provided with: a color detection process for detecting black-color portions with respect to pixels within the first area consisting of a target pixel and pixels in the vicinity of the target pixel of image data for each color component; a count process for counting the respective numbers of the black pixels and pixels having colors other than black with respect to the pixels in the first area; an edge discrimination process for detecting whether or not an abrupt color change occurs at the target pixel, and also provided with: a black color detection process which, based upon the results of outputs from these color detection process, count process and edge discrimination process, detects which area the target pixel belongs to, the black-letter area or the line-drawing area.

With the above-mentioned arrangement, in the color judgment process, a discrimination is made as to whether or not the target pixel on the image is black with respect to the first area consisting of the target pixel and pixels in the vicinity thereof of image data for each color component; therefore, it is possible to carry out an optimal image processing with respect to the black area. Moreover, in the edge discrimination process, a discrimination is made as to whether or not the target pixel on the image belongs to a black edge area; therefore, it is possible to carry out an optimal image processing with respect to edge portions such as black characters, black line drawing, etc. Then, based upon the results of these and the respective numbers of the black pixels and pixels having colors other than black within the first area found by the count means, a discrimination operation between the black-character area and line-drawing area can be carried out with high precision.

Therefore, it is possible to carry out an optimal image processing on the area to which the target pixel belongs on the image, and consequently to achieve high image quality. Therefore, different from conventional apparatuses, even when an edge extraction-emphasis process is carried out on colored characters, it is possible to avoid color changes from the original colors in the edge portions.

Embodiment 3

Here, the scope of the present invention is not intended to be limited by the above-mentioned Embodiments 1 and 2, and various modifications may be made within the scope of the present invention. For example, the following arrangement may be proposed:

The present invention is may be applied to a system consisting of a plurality of apparatuses (for example, a host computer, terminal computers, interface apparatuses, network apparatuses, readers and printers, etc.), or may be applied to a machine consisting of an apparatus (for example, a copying machine, a facsimile machine, etc).

Moreover, the objective of the present invention may be achieved by supplying a recording medium which includes program codes (execute form programs, intermediate code programs, source programs) for an image-processing program that is a piece of software for realizing the above-mentioned functions recorded so as to be read by a computer, to a system or an apparatus, and allowing the computer (or CPU and MPU) of the system or the apparatus to read the program codes recorded in the recording medium and execute the program. In this case, the program codes themselves, read out from the recording medium, realize the above-mentioned functions, and the recording medium in which the program codes are recorded constitutes the present invention.

In this case, the recording medium for supplying the above-mentioned program codes may be designed so as to be separated from the system or the apparatus. Moreover, the recording medium may be provided as a medium for holding the program codes in a fixed manner so as to be ready to supply. Furthermore, the above-mentioned recording medium may be loaded to the system or the apparatus so as to allow the computer directly read the recorded program codes, or may be loaded to a program reading device connected to the system or the apparatus as an external storage device so as to be read therefrom.

For example, with respect to the above-mentioned recording medium, the following media may be listed: tape media such as magnetic tapes and cassette tapes, disk media including magnetic disks, such as floppy disks/hard disks, and optical disks, such as CD-ROM/MO/MD/DVD/CD-R, card media such as IC cards (including memory cards) /optical cards, and semiconductor memory media such as mask ROM/EPROM/EEPROM/flash ROM.

Moreover, the above-mentioned program codes may be recorded so as to be directly read by the computer from the recording medium and to be executed, or may be recorded in a such manner that, after they have been transferred from the recording medium to the program storage area of the main memory, the computer can read from the main memory and execute them.

Furthermore, the above-mentioned recording medium may be provided as a medium for temporarily holding the program codes so as to supply them through a communication net work, etc. In this case, the system or the apparatus is constituted so as to be connected to the communication network (including the Internet, etc.), and the program codes may be supplied by downloading them through the communication network.

Here, the program for reading the program codes from the recording medium and for storing the main memory and the program for downloading the program codes through the communication net work are supposed to be preliminarily stored in the system or the apparatus by the computer in an executable state.

The above-mentioned functions are realized not only by executing the above-mentioned program codes read by the computer, but also by allowing the OS, etc. running on the computer to execute one portion or the entire portions of the actual process based upon instructions from the program codes.

Moreover, the above-mentioned functions are also realized as follows: After the above-mentioned program codes, read out from the recording medium, have been written in a memory provided in a function extension board attached to a computer or in a function extension unit connected to a computer, the CPU, etc. provided in the function extension board or in the function extension unit may execute one portion or the entire portions of the actual process based upon instructions from the program codes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing apparatus comprising:

maximum-minimum pixel calculation means which, with respect to image data within a specific area consisting of a target pixel and pixels in a vicinity thereof for each color component, calculates an average density value of pixels located within the specific area, a sum of density differences, that is, a sum of absolute values of differences between the target pixel and peripheral pixels extracted within the specific area, and a number of density coincident pixels that is the number of the peripheral pixels having the same density value as the target pixel, so as to judge whether the density value of the target pixel is a maximum value or a minimum value; and dot area discrimination means for discriminating whether or not the target pixel is in a dot area in accordance with a result of judgment made by the maximum-minimum pixel calculation means.

2. The image-processing apparatus as defined in claim 1, further comprising:

maximum-minimum pixel peripheral information detection means which calculates a run-length that is a maximum value of the number of pixels that continue in a main scanning direction or in a sub scanning direction with respect to pixels having not less than the standard value or not more than the standard value, the standard value being defined based upon the average density value, and which also finds a degree of busy that is the sum of absolute values of differences between respective pixels having the run-length and the target pixel, from the target pixel having the maximum value or the minimum value among the density values within the specific area, obtained by the maximum-minimum pixel calculation means.

3. The image-processing apparatus as defined in claim 2, further comprising:

pixel weight switching signal calculation means which extracts a pixel weight switching signal for each of the color components, based upon the run-length and the degree of busy of the target pixel having the maximum value or the minimum value of the density values within the specific area, obtained by the maximum-minimum pixel calculation means and the maximum-minimum pixel peripheral information detection means; and periodicity calculation means which detects periodicity of meshes of the image data by counting pixels not less than the standard value or not more than the standard value based on the pixel weight switching signal within a predetermined counting area.

4. The image-processing apparatus as defined in claim 3, further comprising:

pixel weight-applying means for composing the pixel weight switching signals obtained from the pixel weight switching signal calculation means, and for outputting a resulting signal to the periodicity calculation means.

5. The image-processing apparatus as defined in claim 1, wherein the maximum-minimum pixel calculation means calculates a feature parameter for high density that indicates how many color dots are located within the specific area based-upon density values of pixels.

6. The image-processing apparatus as defined in claim 5, wherein the maximum-minimum pixel peripheral information detection means detects a run-length and a degree of busy and calculates a feature parameter for granulation that indicates whether the color dots belong to a point, a line or a face.

7. The image-processing apparatus as defined in claim 6, further comprising:

first periodicity calculation means for calculating a first feature parameter for periodicity that indicates a period in which the color dots exist within a narrow area.

8. The image-processing apparatus as defined in claim 7, further comprising:

second periodicity calculation means for calculating a second feature parameter for periodicity that indicates a period in which the color dots exist within a wide area.

9. The image-processing apparatus as defined in claim 8, further comprising:

correction means for correcting discriminations made by the feature parameter for high density, the feature parameter for granulation and the first and second feature parameters for periodicity.

10. The image-processing apparatus as defined in claim 1, which is installed in a digital copying machine.

11. The image-processing apparatus as defined in claim 1, which is installed in a scanner.

12. The image-processing apparatus as defined in claim 1, which is installed in a facsimile.

13. An image-processing method comprising:

a first step for, with respect to density values of pixels within a specific area consisting of a target pixel and pixels in a vicinity thereof in image data for each color component, calculating an average density value of the pixels within the specific area;

a second step for calculating a sum of density differences which is a sum of absolute values of differences between the target pixel and peripheral pixels extracted within the specific area;

a third step for calculating a number of density coincident pixels that is the number of the peripheral pixels having the same density value as the target pixel;

a fourth step for judging, from the average density value, the sum of density differences, and the number of density coincident pixels, whether or not the density value of the target pixel is a maximum value or a minimum value; and a fifth step for discriminating whether or not the target pixel is in a dot area in accordance with a result of the judgment.

14. The image-processing method as defined in claim 13, further comprising:

a maximum-minimum pixel peripheral information detection step for calculating a run-length that is a maximum value of the number of pixels that continue in a main scanning direction or in a sub scanning direction with respect to pixels having not less than a standard value or not more than the standard value, the standard value defined based upon the average density value, and for finding a degree of busy that is the sum of absolute values of differences between respective pixels having the run-length and the target pixel, from the target pixel having the maximum value or the minimum value among the density values within the specific area, obtained by the fourth step.

15. The image-processing method as defined in claim 14, further comprising:

a pixel weight switching signal calculation step for extracting a pixel weight switching signal for each of the color components, based upon the run-length and the degree of busy of the target pixel having the maximum value or the minimum value of the density values within the specific area, obtained by the fourth step and the maximum-minimum pixel peripheral information detection step; and a periodicity calculation step for detecting the periodicity of dots of the image data by counting pixels not less than the standard value or not more than the standard value based on the pixel weight switching signal within a predetermined counting area.

16. The image-processing method as defined in claim 13, further comprising:

a correction step for correcting the discrimination made by the dot area discrimination step.

* * * * *